US009906031B2

(12) United States Patent
Ramsay et al.

(10) Patent No.: US 9,906,031 B2
(45) Date of Patent: Feb. 27, 2018

(54) POWER LINE REACTANCE MODULE AND APPLICATIONS

(71) Applicant: Smart Wires Inc., San Francisco, CA (US)

(72) Inventors: Stewart Ramsay, Walnut Creek, CA (US); Frances Bell, Somerville, MA (US)

(73) Assignee: SMART WIRES INC., Union City, CA (US)

( * ) Notice: Subject to any disclaimer, the term of this patent is extended or adjusted under 35 U.S.C. 154(b) by 311 days.

(21) Appl. No.: 14/630,829

(22) Filed: Feb. 25, 2015

(65) Prior Publication Data

US 2016/0036231 A1 Feb. 4, 2016

Related U.S. Application Data

(63) Continuation of application No. PCT/US2013/056622, filed on Aug. 26, 2013.
(Continued)

(51) Int. Cl.
*H02J 3/24* (2006.01)
*H02J 3/20* (2006.01)
(Continued)

(52) U.S. Cl.
CPC .......... *H02J 3/20* (2013.01); *G05F 1/70* (2013.01); *H02J 3/1828* (2013.01); *H02J 3/24* (2013.01); *Y02E 40/30* (2013.01)

(58) Field of Classification Search
CPC ... H02J 3/20; H02J 3/24; H02J 3/1828; G05F 1/70; Y02E 40/30
(Continued)

(56) References Cited

U.S. PATENT DOCUMENTS 5,309,346 A * 5/1994 Gyugyi ................. H02J 3/1814
307/102
5,754,035 A * 5/1998 Sen ....................... H02J 3/1814
323/207
(Continued)

FOREIGN PATENT DOCUMENTS

JP 2009112137 5/2009
WO 2004042889 A1 5/2004

OTHER PUBLICATIONS

Johal, Harjeet, Distributed Series Reactance: A New Approach to Realize Grid Power Flow Control [online]; Published by Georgia Institute of Technology (available on Jan. 22, 2009: Retrieved on Aug. 21, 2017; Retrieved from https://smartech.gatech.edu/handle/1853/26713.

*Primary Examiner* — Dinh T Le
(74) *Attorney, Agent, or Firm* — Marsh Fischmann & Breyfogle LLP

(57) ABSTRACT

The disclosure is generally directed to reactance modules or DSRs (30) that may be mounted on a power transmission line (16) of a power transmission system (400). A DSR (30) may be configured in a bypass mode or in an injection mode (where reactance is injected into the corresponding line (16)). Multiple DSRs (30) installed on a power line section (18) define an array (410) and have a dedicated controller (440). Such an array (410) and controller (440) may be installed on a number of different power line sections (18). The controller (440) for each array (410) may communicate with a DSR server (420), which in turn may communicate with a utility-side control system (430). Each DSR (30) may incorporate one or more features directed to core (50) configurations and assembly, communications, modal configuration control, fault protection, EMI shielding, DSR (30) assembly, and DSR (30) installation.

27 Claims, 41 Drawing Sheets

Related U.S. Application Data

(60) Provisional application No. 61/693,814, filed on Aug. 28, 2012, provisional application No. 61/700,226, filed on Sep. 12, 2012, provisional application No. 61/700,238, filed on Sep. 12, 2012, provisional application No. 61/700,246, filed on Sep. 12, 2012, provisional application No. 61/700,261, filed on Sep. 12, 2012, provisional application No. 61/700,271, filed on Sep. 12, 2012, provisional application No. 61/700,277, filed on Sep. 12, 2012, provisional application No. 61/700,284, filed on Sep. 12, 2012, provisional application No. 61/700,298, filed on Sep. 12, 2012.

(51) Int. Cl.
*H02J 3/18* (2006.01)
*G05F 1/70* (2006.01)

(58) Field of Classification Search
USPC .............. 307/10, 112, 102; 361/93, 268, 58
See application file for complete search history.

(56) References Cited

U.S. PATENT DOCUMENTS

| | | | |
|---|---|---|---|
| 7,105,952 B2* | 9/2006 | Divan | H01F 30/16 307/98 |
| 7,378,821 B2* | 5/2008 | Simpson | H02J 3/1892 323/205 |
| 7,835,128 B2* | 11/2010 | Divan | H02J 3/1807 361/93.9 |
| 7,920,392 B2* | 4/2011 | Schneider | H02J 3/1814 307/105 |
| 2005/0073200 A1 | 4/2005 | Divan et al. | |
| 2008/0157728 A1 | 7/2008 | Toki | |
| 2008/0310069 A1 | 12/2008 | Divan et al. | |

* cited by examiner

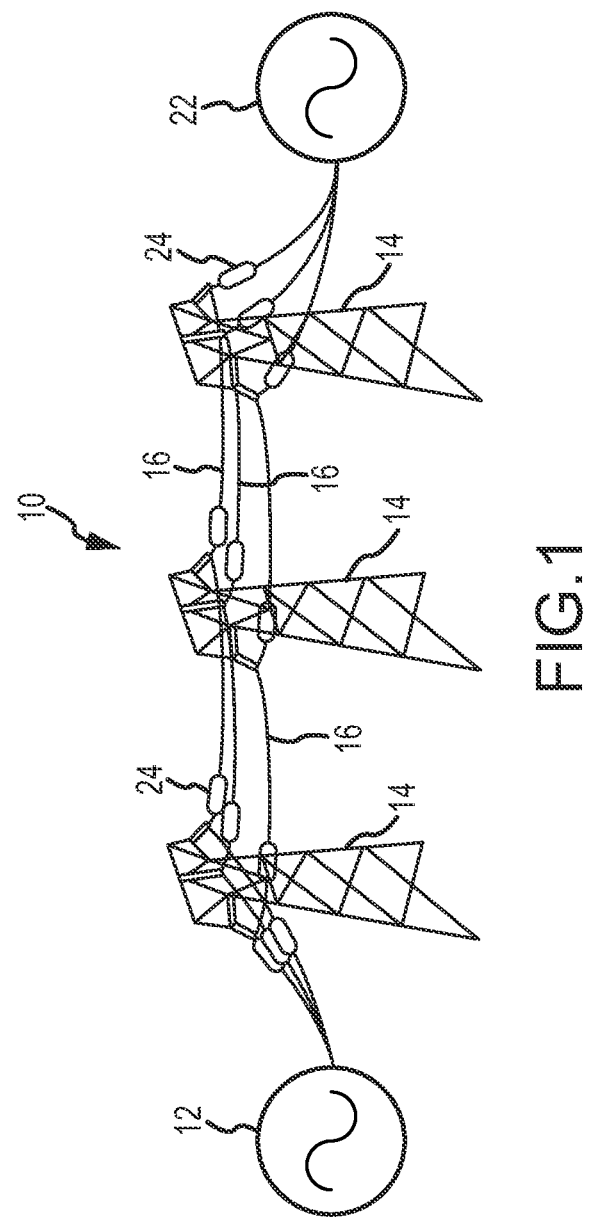

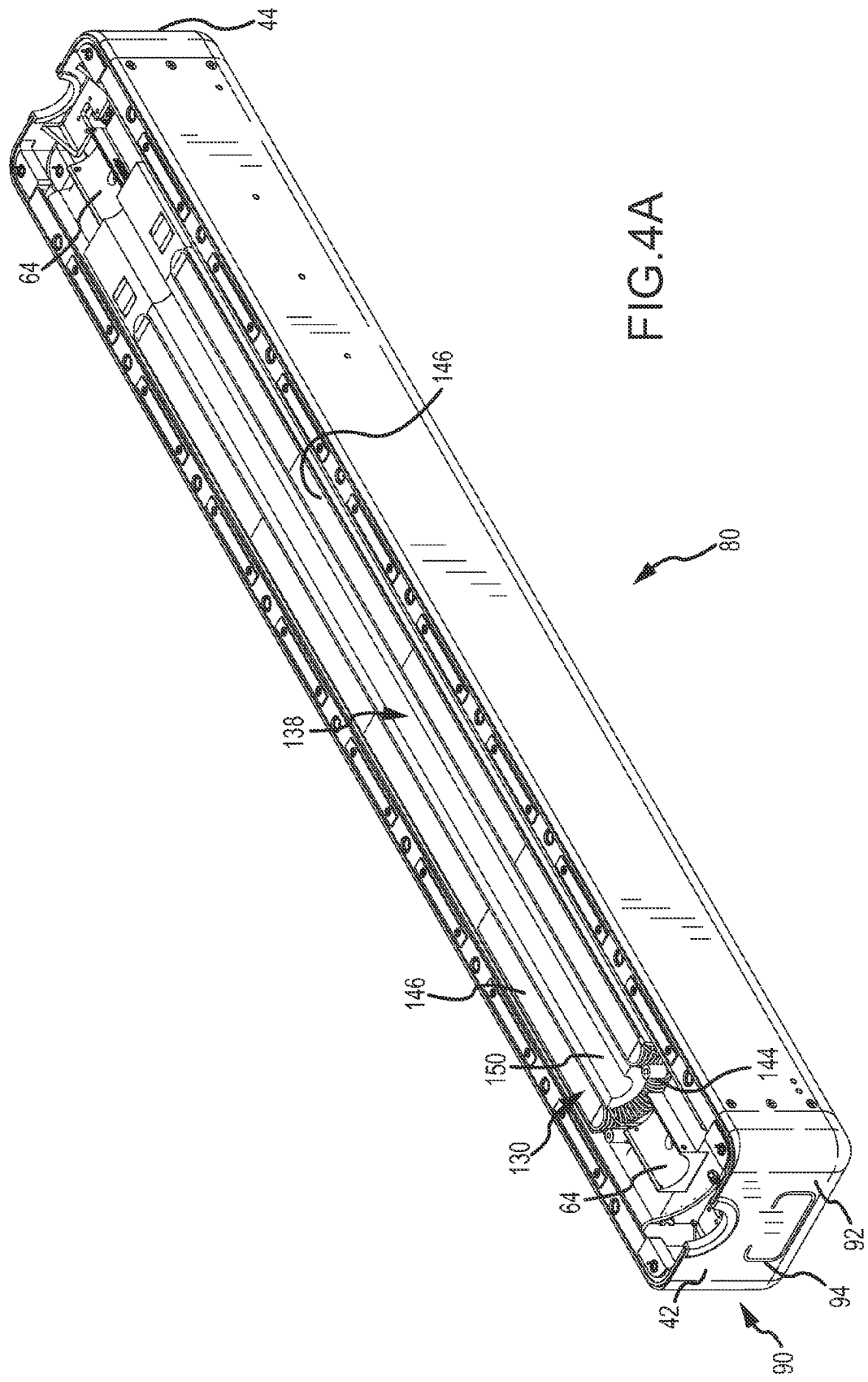

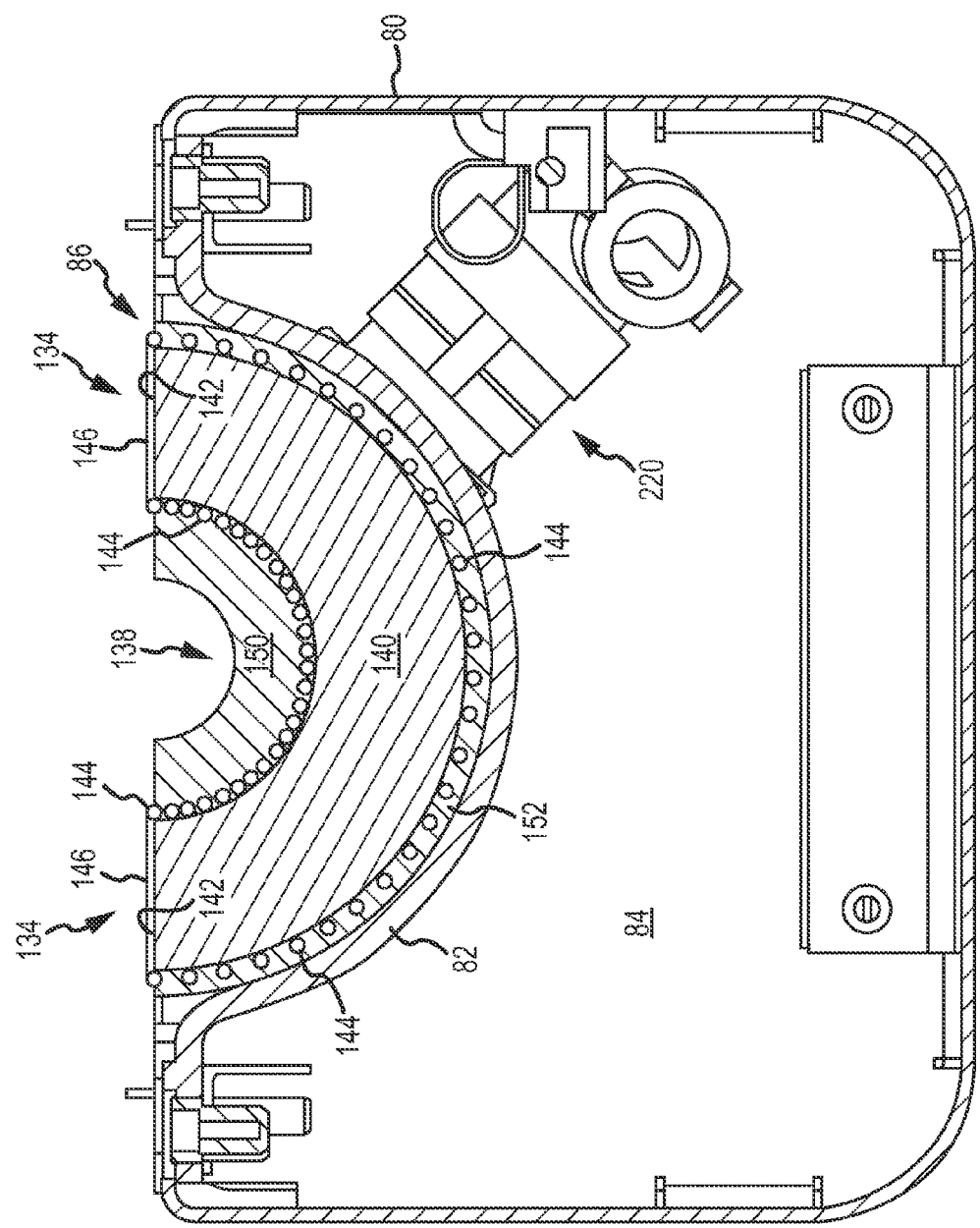

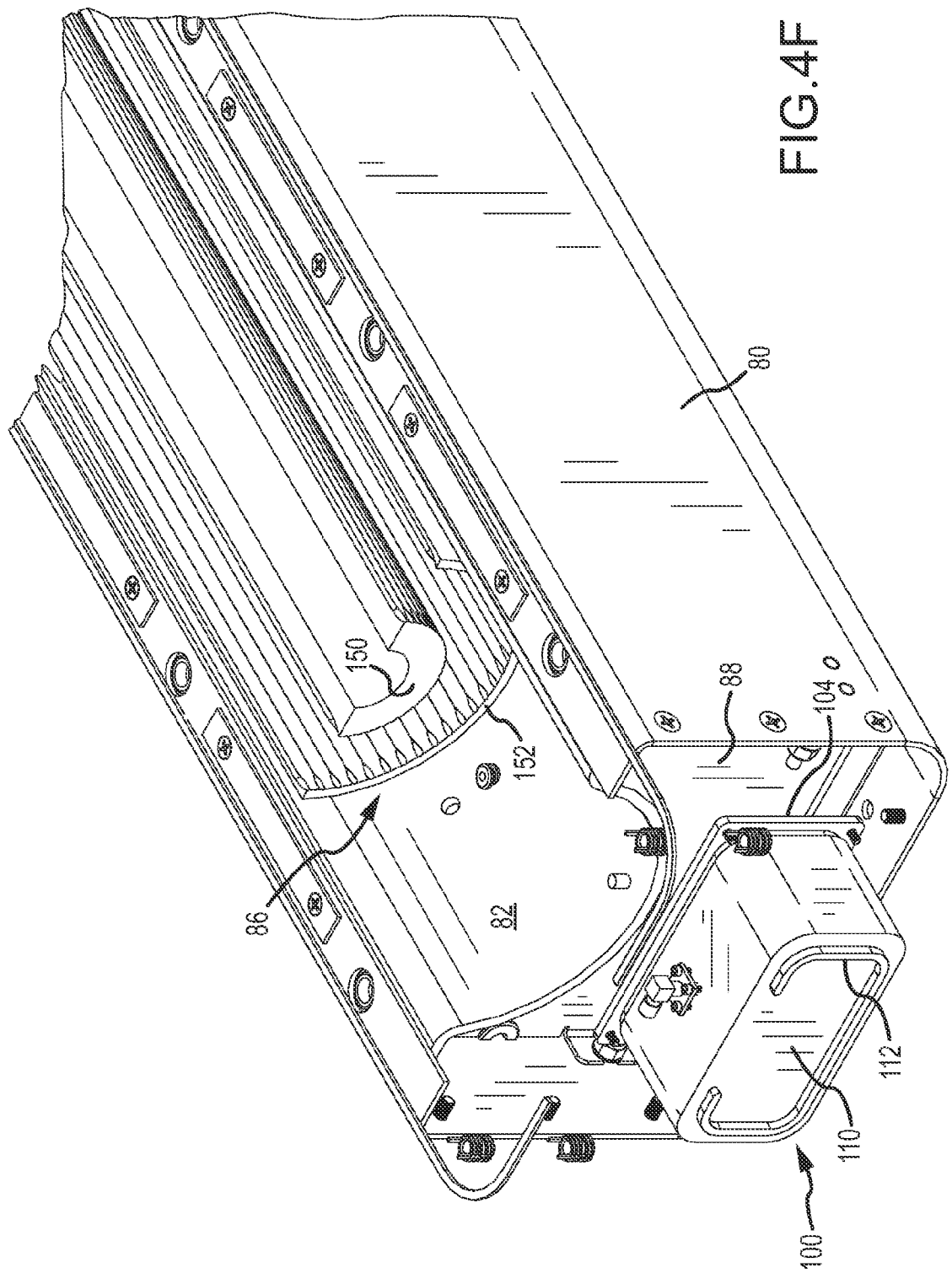

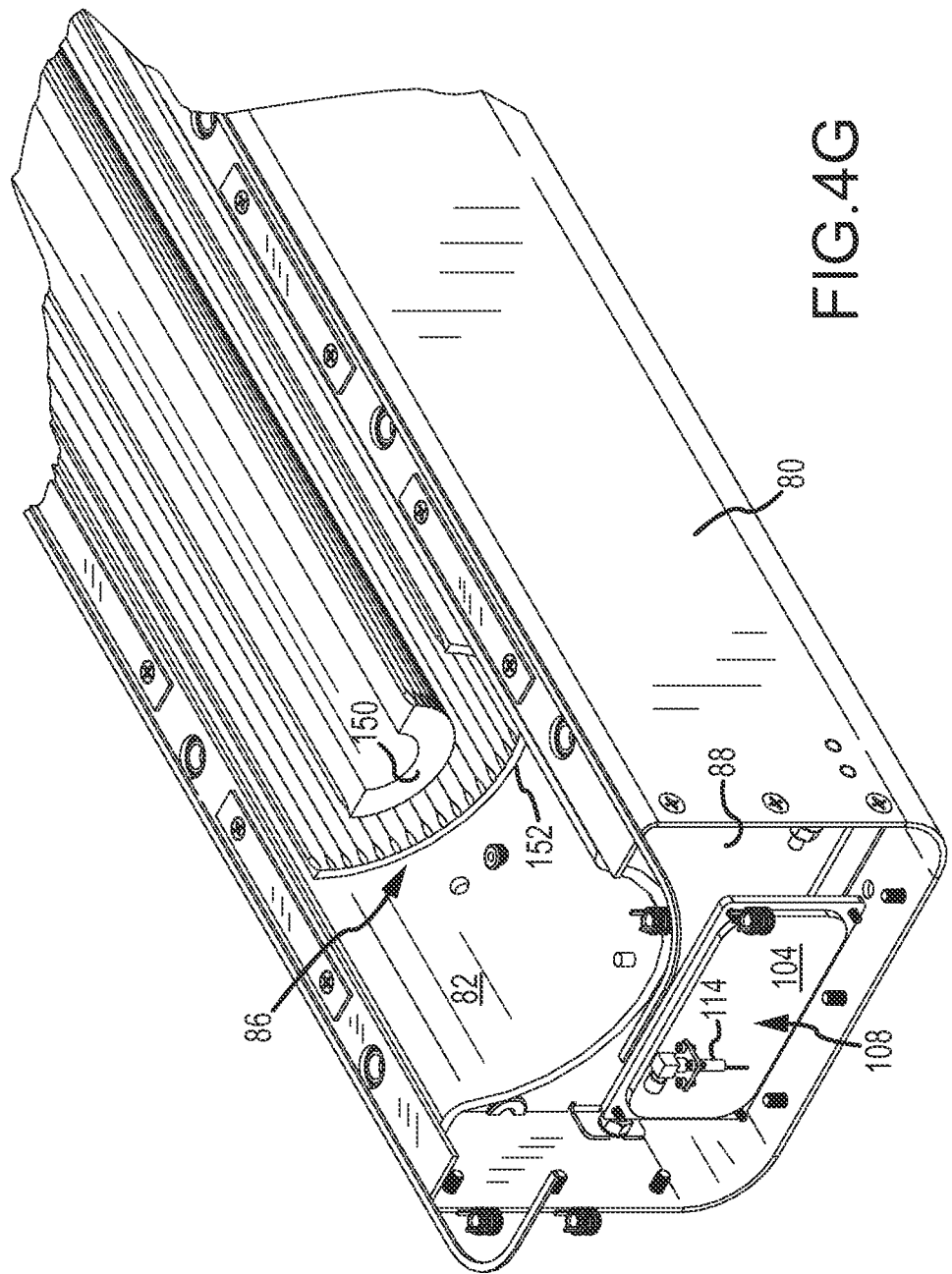

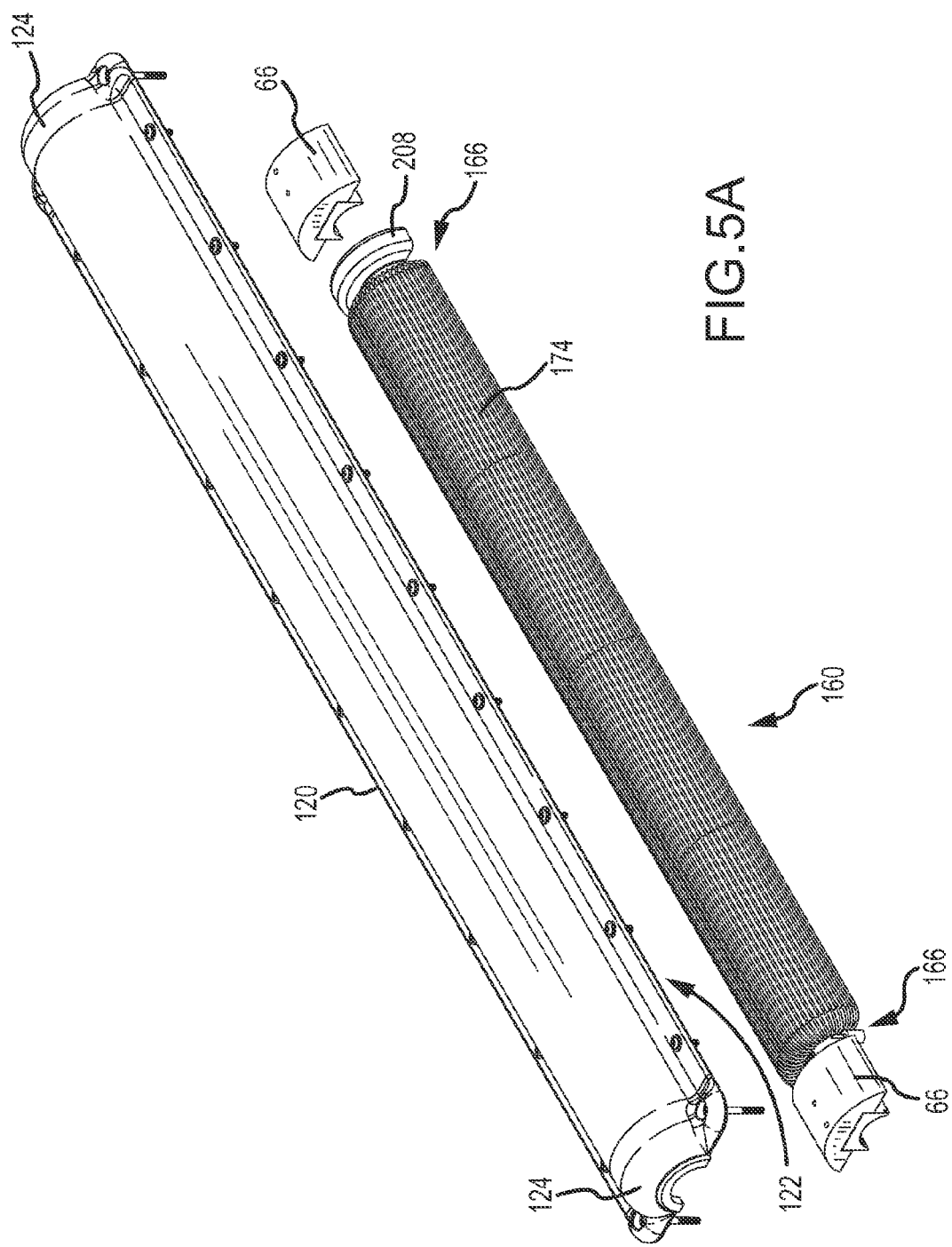

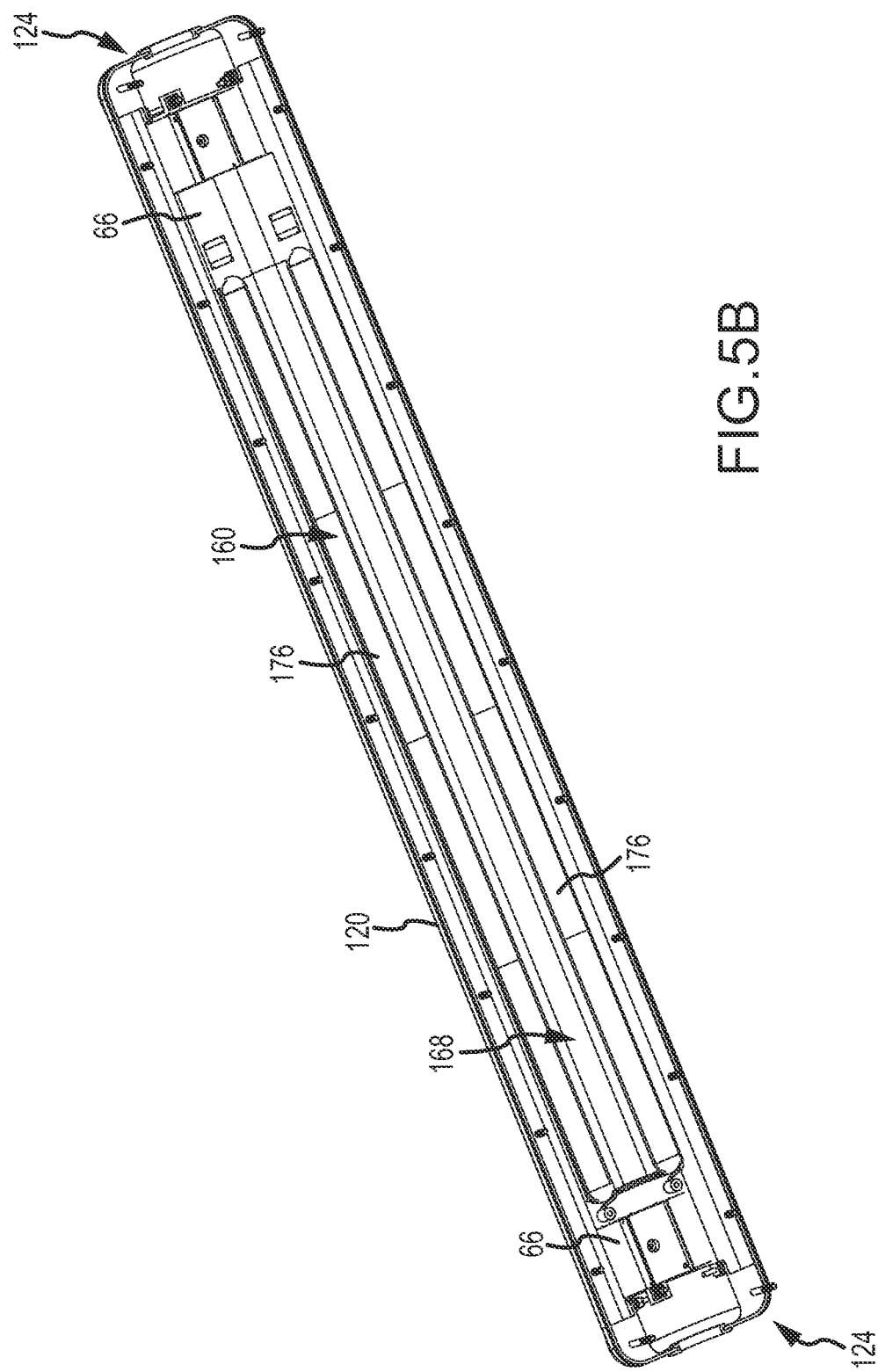

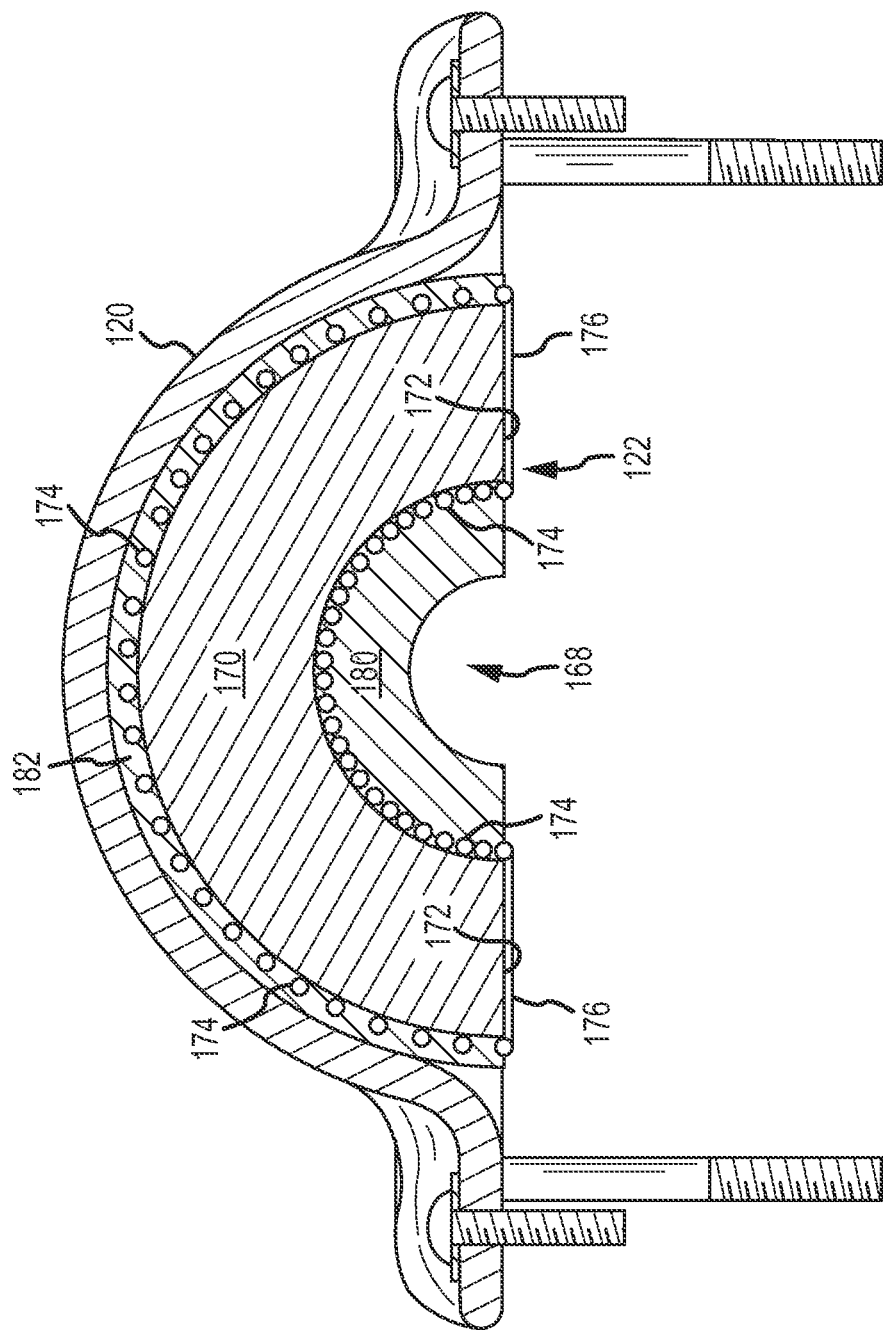

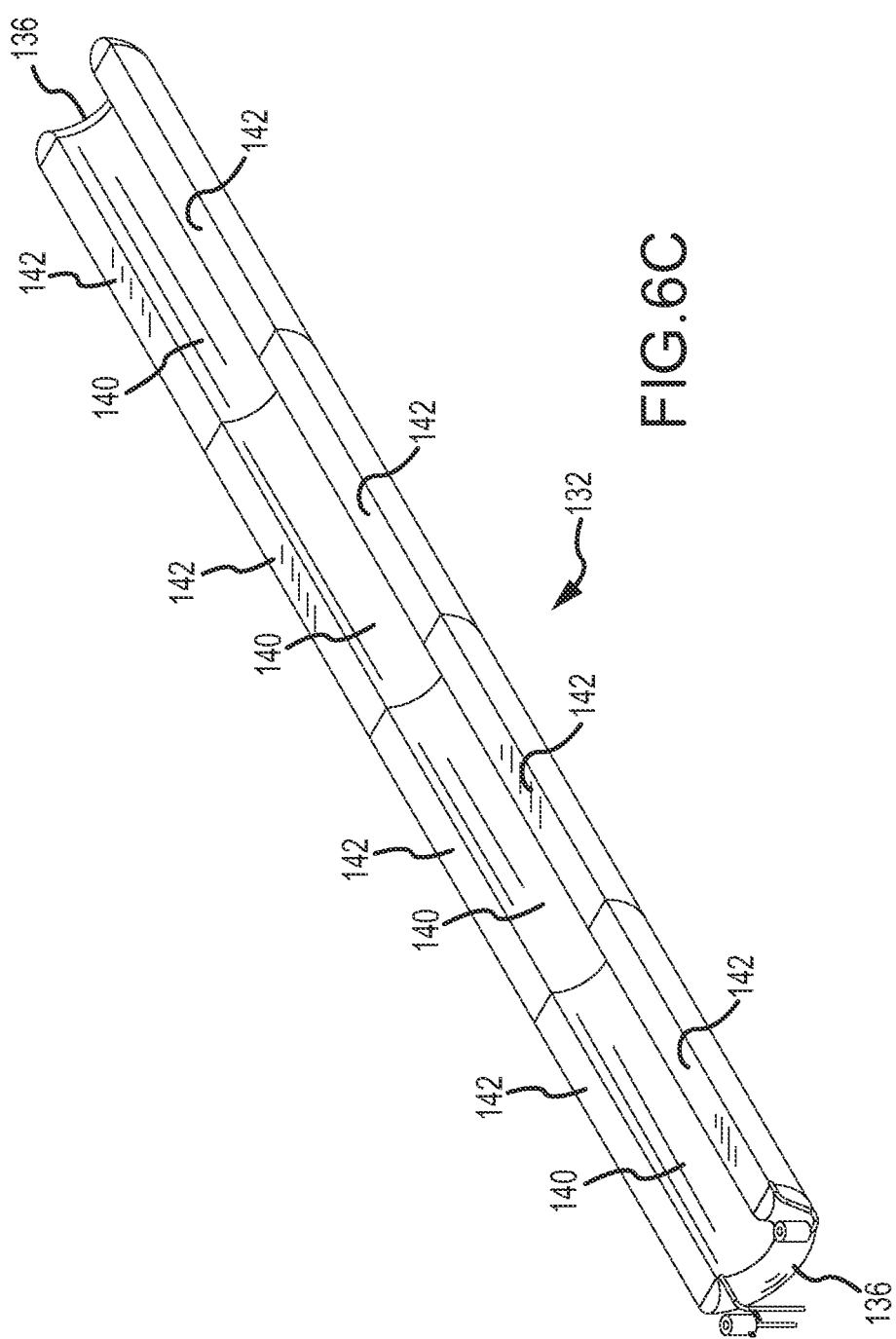

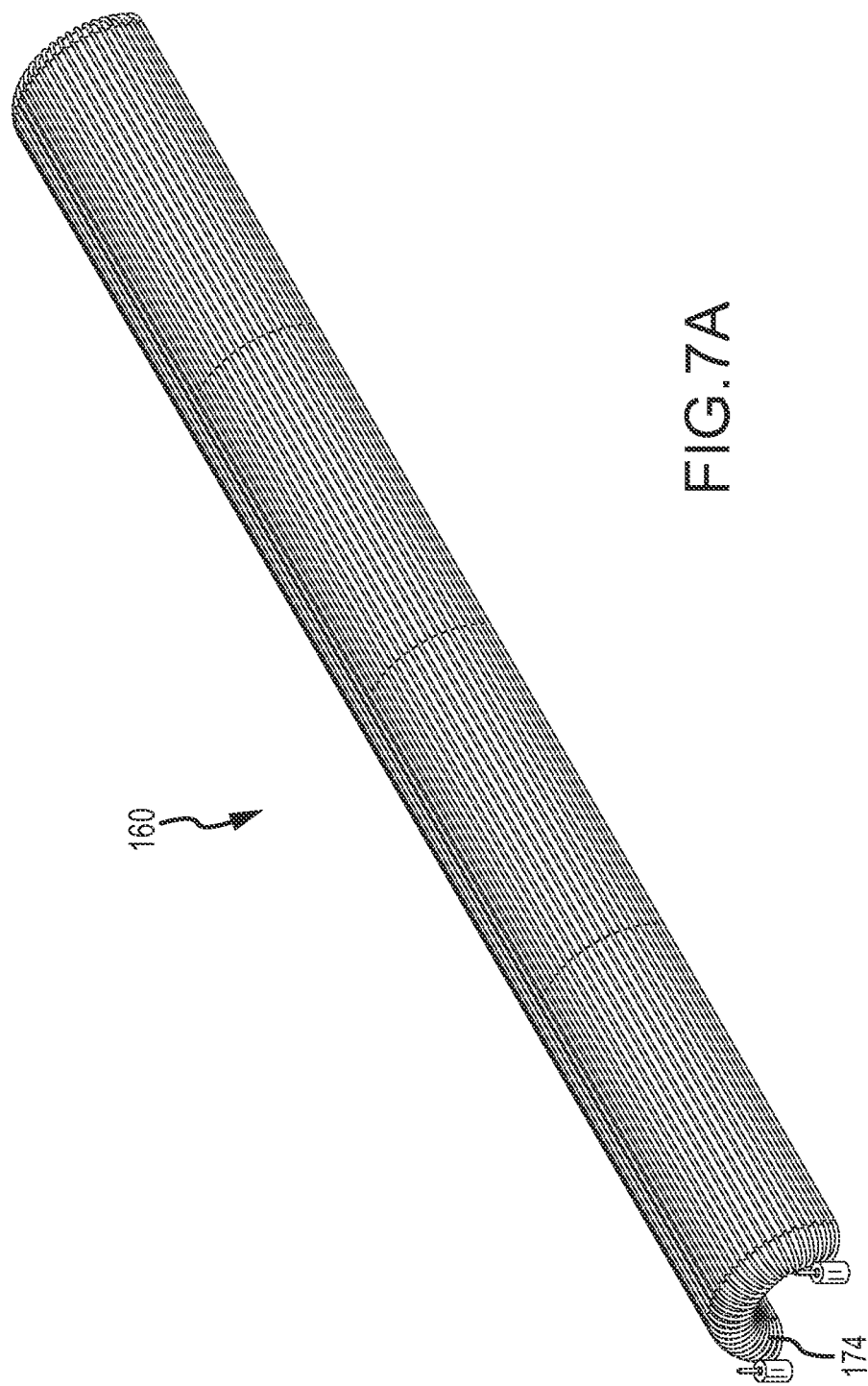

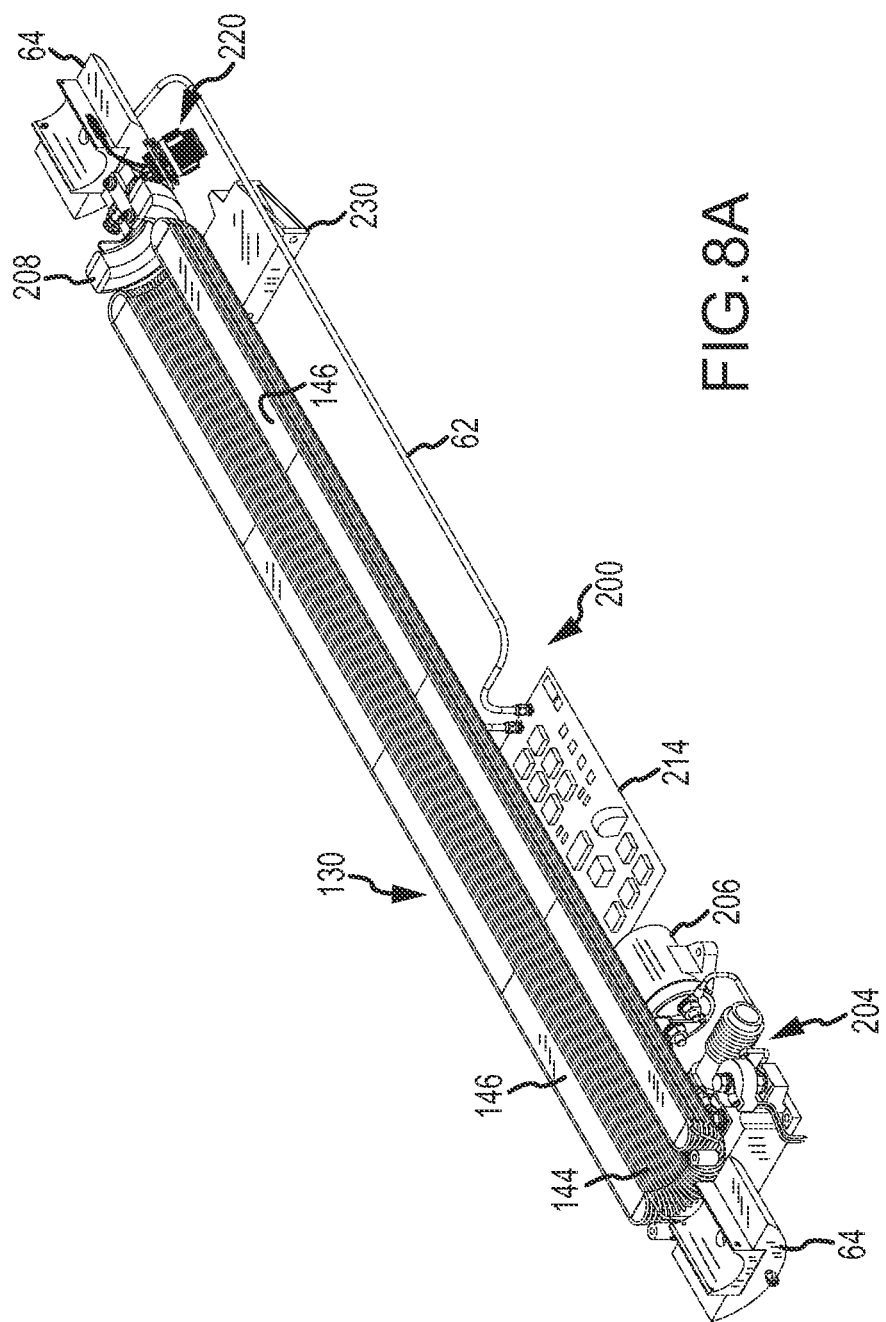

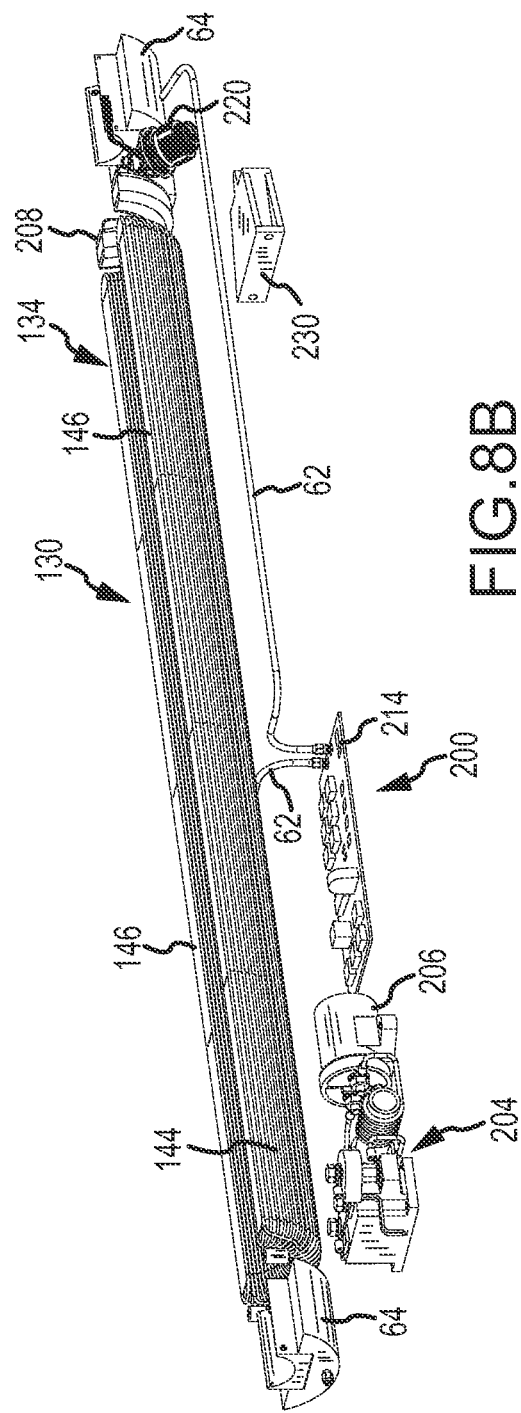

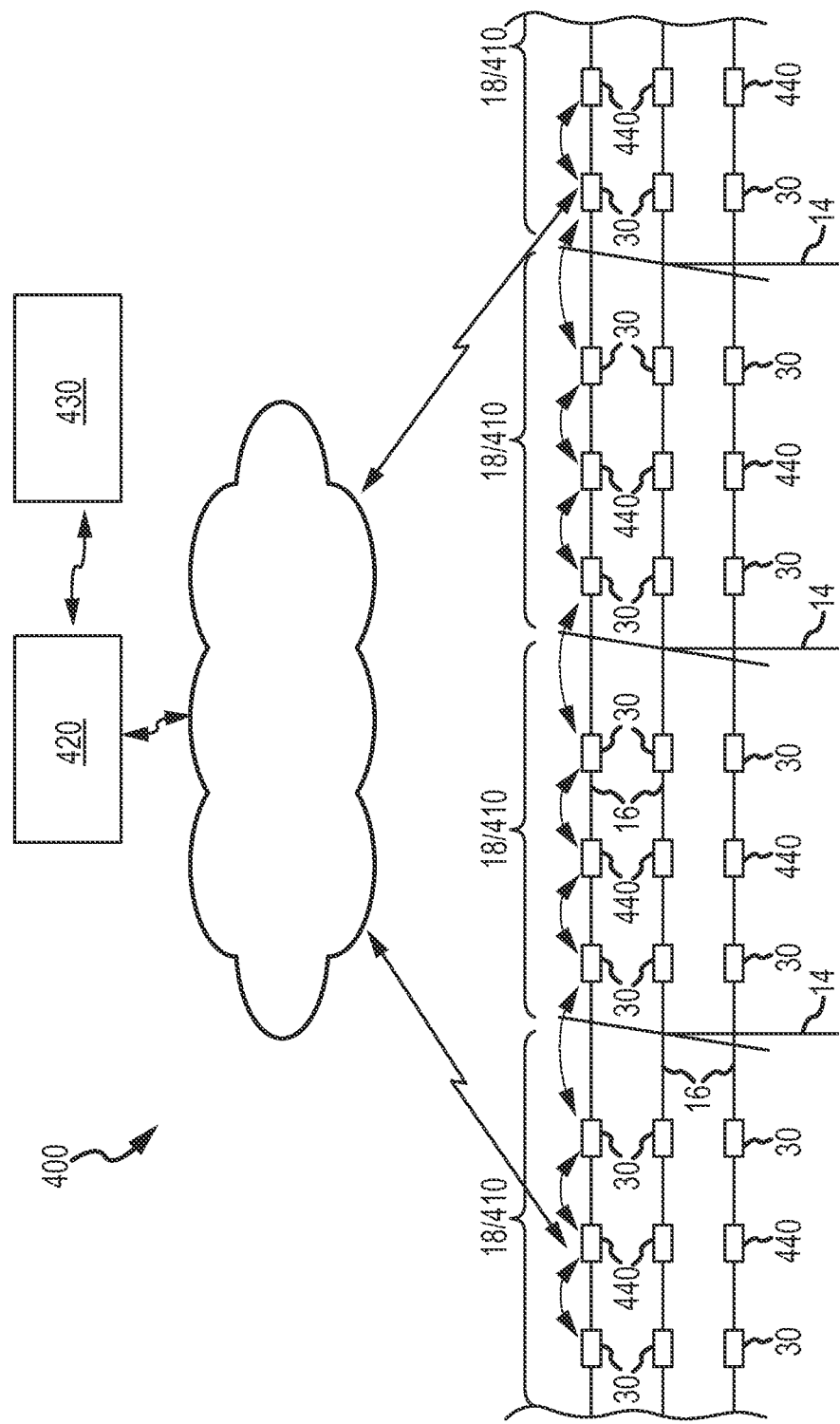

| SYSTEM CONDITION | DSR 30 | | | | | | |
|---|---|---|---|---|---|---|---|
| | PFC MC | LFOC MC | PFC MC | LFOC MC | PFC MC | LFOC MC |
| 482 | 484 | 486 | 484 | 486 | 484 | 486 |
| 482 | 484 | 486 | 484 | 486 | 484 | 486 |
| 482 | 484 | 486 | 484 | 486 | 484 | 486 |
| 482 | 484 | 486 | 484 | 486 | 484 | 486 |
| 482 | 484 | 486 | 484 | 486 | 484 | 486 |
| 482 | 484 | 486 | 484 | 486 | 484 | 486 |
| 482 | 484 | 486 | 484 | 486 | 484 | 486 |

FIG. 13D

POWER LINE REACTANCE MODULE AND APPLICATIONS

CROSS-REFERENCE TO RELATED APPLICATIONS

This patent application is a continuation of co-pending PCT/US2013/056622, filed on Aug. 26, 2013, which is a non-provisional patent application of, and claims priority to, each of the following U.S. provisional patent applications: 1) Ser. No. 61/693,814, filed on Aug. 28, 2012; 2) Ser. No. 61/700,226, filed on Sep. 12, 2012; 3) Ser. No. 61/700,238, filed on Sep. 12, 2012; 4) Ser. No. 61/700,246, filed on Sep. 12, 2012; 5) Ser. No. 61/700,261, filed on Sep. 12, 2012; 6) Ser. No. 61/700,271, filed on Sep. 12, 2012; 7) Ser. No. 61/700,277, filed on Sep. 12, 2012; 8) Ser. No. 61/700,284, filed on Sep. 12, 2012; and 9) Ser. No. 61/700,298, filed on Sep. 12, 2012. The entire disclosure of each patent application set forth in this Related Applications section is hereby incorporated by reference in their entirety herein.

FIELD OF THE INVENTION

The present invention generally relates to the field of controlling the flow of current and power in a power transmission system.

BACKGROUND

Power transmission systems are formed of a complex interconnected system of generating plants, substations, and transmission and distribution lines. A significant issue currently plaguing power transmission systems may be characterized as active power flow control. Controlling power flow may include altering the impedance of the power lines or changing the angle of the voltage applied across the lines. At least some prior art techniques for controlling power flow may require a high bandwidth communications infrastructure and may result in transmission line congestion, fault protection coordination problems, poor utilization of both generation and transmission assets, significant costs, and increased complexity for the power transmission system.

SUMMARY

The present invention pertains in at least some respect to a reactance module that may be mounted on a power line. The present invention will be described with regard to nine different invention groups. Each invention group presents at least one aspect of the present invention.

Group 1 of the present invention at least generally pertains to power transmission system control, including using a local controller (e.g., a reactance module array controller) having a data structure that equates a given system condition with modal configurations for one or more reactance modules in its corresponding reactance module array. There are multiple aspects of the present invention within Group 1, and that will now be addressed.

A first aspect of the present invention (Group 1) is embodied by a power transmission system that includes a power line section, a reactance module array, and a reactance module array controller. The reactance module array is mounted on the power line section and includes a plurality of reactance modules that are each disposable in first and second modes (e.g., the individual reactance modules being mounted on the power line section). Switching a particular reactance module from its first mode to its second mode increases the amount of reactance that the module injects into the power line section. The reactance module array controller is configured to control each reactance module of the reactance module array (e.g., by the reactance module array controller communicating, directly or indirectly, with each reactance module of its corresponding reactance module array), and also includes a first data structure. This first data structure includes a plurality of system conditions. For each of these system conditions, the first data structure also includes a corresponding modal configuration (e.g., the noted first or second mode) for each reactance module of the relevant reactance module array.

A number of feature refinements and additional features are applicable to the first aspect of the present invention within Group 1. These feature refinements and additional features may be used individually or in any combination. The following discussion is applicable to at least the first aspect (Group 1), up to the start of the discussion of a second aspect of the present invention within Group 1. Initially, it should be appreciated that the power transmission system may include a plurality of power line sections, each of which may include a reactance module array of the type described in relation to this first aspect, along with one or more reactance module array controllers (of the type described in relation to this first aspect) for each such reactance module array (e.g., a primary reactance module array controller for each reactance module array, and optionally one or more backup reactance module array controllers for each such reactance module array).

The first data structure may be of any appropriate configuration, may utilize any appropriate data storage architecture, and may exist within memory of any appropriate type (e.g., a computer readable storage medium). For each system condition within the first data structure of a given reaction module array controller, the first data structure may include at least one modal configuration for each reactance module of its corresponding reaction module array (e.g., when the system condition is "x", the modal configuration for a given reactance module should be "y", and such is set forth in the first data structure). There may be multiple modal configurations within the first data structure for each reactance module, and in association with each system condition within the first data structure. Consider the case where the first data structure includes a first system condition. There may a specified modal configuration for each reactance module that is associated with both the first system condition and a first control objective, and there may a specified modal configuration for each reactance module that is associated with both the first system condition and a second control objective (and that is different from the first control objective). Representative control objectives include without limitation power flow control, low frequency oscillation control, and the like. As such and for a first system condition within the first data structure, the first data structure may include an associated modal configuration for a first reactance module to provide power flow control, and the first data structure may also include an associated modal configuration for this same first reactance module to provide low frequency oscillation control (the modal configurations for the first reactance module may be the same or different for these two different control objectives in this instance).

The reactance module array controller may be configured to receive a system condition communication. The reactance module array controller may be configured to identify the system condition within its first data structure that corresponds with such a system condition communication. From this identification, the reactance module array controller may be configured to retrieve a corresponding modal configuration from the first data structure for each reactance module of its reactance module array, and to then send a modal communication (e.g., which embodies information as to whether the corresponding reactance module should be in the first mode or the second mode) to one or more reactance modules of its reactance module array (including where the reactance module array controller sends a modal communication to each reactance module of its reactance module array). In one embodiment, a utility-side control system (e.g., an energy management system, a supervisory control and data acquisition system, a market management system, or other similar system) generates a system condition communication, and which may be sent directly or indirectly to the reactance module array controller. In any case, the reactance module array controller may be further configured to share information with other reactance module array controllers in the power transmission system upon failing to receive a system condition communication of the noted type, the system condition then may be derived from this shared information, and the derived system condition then may be used by one or more of the reactance module array controllers to determine the modal configuration for each of their corresponding reactance modules (e.g., by retrieving the modal configuration from their corresponding first data structure).

System condition information may be used by the reactance module array controller to control operation of the reactance modules of its reactance module array. The reactance module array controller may include at least one other control option. For instance, the reactance module array controller may be configured to receive a first communication (e.g., in the form of a communication directed to something other than system condition data, for instance an operations objective communication or an operational command). From this first communication, the reactance module array controller may be configured to determine or derive the modal configuration for each reactance module of its reactance module array (e.g., the reactance module array controller may incorporate at least a certain level of intelligence). The determined modal configuration may then be sent to one or more reactance modules of the corresponding reactance module array (including to each reactance module in its reactance module array).

A first communication of the noted type, and received by the reactance module array controller, may originate from a utility-side control system of the above-noted type. Target operating condition data for the power line section associated with the reactance module array controller may be embodied in this first communication (e.g., the first communication may be specific to a given power line section, or at least a power transmission line that incorporates this power line section). Representative target operating condition data for the first communication includes without limitation a target current, a target power, a maximum line temperature, and like, and including any combination of one or more of these objectives.

The first communication to the reactance module array controller may be of a type that does not itself identify the modal configuration for each reactance module of its reactance module array. However, the reactance module array controller may be configured to be able to use information embodied by the first communication to derive the modal configuration for each reactance module of its reactance module array. For instance, the reactance module array controller may use one or more processors or microprocessors (of any appropriate type and utilizing any appropriate processing architecture) to determine or derive the modal configuration of each associated reactance module from or based upon the first communication (e.g., from data embodied by the first communication).

Other control options regarding the modal configuration of the reactance modules of a given reactance module array may be incorporated by the power transmission system. The reactance module array controller, the reactance module array (e.g., each of the individual reactance modules of the reactance module array that is assigned to this reactance module controller), or both, may be configured to inject inductance (or initiate the injection of inductance in the case of the reactance module array controller) into the power line section upon identification of an excessive temperature condition (e.g., when the temperature of the power line section reaches or exceeds a specified value). Monitoring of the power line section for an excessive temperature condition may be undertaken in any appropriate manner and on any appropriate basis, for instance by monitoring the current flow on the power line section, by monitoring the temperature of the power line section (e.g., by the reactance module array controller including an appropriate temperature sensor(s), by the reactance modules of the reactance module array including an appropriate temperature sensor(s), or both), by monitoring the angle of sag of the power line section, and the like.

Any appropriate control hierarchy may be used where multiple options exist for establishing/determining the modal configuration of the reactance modules of a corresponding reactance module array. For instance, a system condition communication/a non-system condition communication (e.g., a first communication) received by the reactance module array controller could be used to control the modal configuration of the reactance modules of the corresponding reactance module array, except if an excessive temperature condition develops on the power line section, in which case the modal configuration of at least some of the reactance modules on this power line section may be based upon such an excessive temperature condition. A system condition communication received by the reactance module array controller could be used to control the modal configuration of the reactance modules of the corresponding reactance module array, except if a non-system condition communication (e.g., a first communication) is received by the reactance module array controller, in which case the modal configuration of the reactance modules of the corresponding reactance module array may be based upon the non-system condition communication. A non-system condition communication (e.g., a first communication) received by the reactance module array controller could be used to control the modal configuration of the reactance modules of the corresponding reactance module array, except if a system condition communication is received by the reactance module array controller, in which case the modal configuration of the reactance modules of the corresponding reactance module array may be based upon the system condition communication.

A second aspect of the present invention (Group 1) is embodied by a power transmission system that includes a plurality of power line sections, a separate reactance module array for each power line section (e.g., a power line section in accordance with the present invention may be characterized as that portion of a power transmission line that incorporates a reactance module array), and at least one reactance module array controller for each reactance module array. Each reactance module array is mounted on its corresponding power line section and includes a plurality of reactance modules that may be disposed in each of first and second modes (e.g., the individual reactance modules may be mounted on the power line section). Switching a particular reactance module from its first mode to its second mode increases the reactance that the module injects into its power line section. Each reactance module array controller is configured to control each reactance module of its corresponding/assigned reactance module array (e.g., by a given reactance module array controller communicating, directly or indirectly, with each reactance module of its corresponding reactance module array), and also includes a first data structure. This first data structure includes a plurality of system conditions. For each of these system conditions, the first data structure also includes a corresponding modal configuration (e.g., the noted first or second mode) for each reactance module of the corresponding reactance module array.

A number of feature refinements and additional features are applicable to the second aspect of the present invention within Group 1. These feature refinements and additional features may be used individually or in any combination. The following discussion is applicable to at least the second aspect (Group 1), up to the start of the discussion of a third aspect of the present invention within Group 1. Initially, each of the features discussed above in relation to the first aspect (Group 1) may be used (but are not required to be used) by this second aspect (Group 1), individually and in any combination.

The power transmission system may include at least one reactance module server (e.g., a primary reactance module server, along with one or more backup reactance module servers) for a plurality of reactance module array controllers (a set or group of reactance module array controllers). This reactance module server may be operatively connected with (e.g., able to communicate, directly or indirectly) each reactance module array controller within its group. A utility-side control system (e.g., of the type discussed above in relation to the first aspect for Group 1) may be operatively connected with the reactance module server (e.g., able to communicate, directly or indirectly). Any appropriate communication link may be used between the utility-side control system and a given reactance module server. Similarly, any appropriate communication link may be used between a given reactance module server and the reactance module array controllers of its group.

The reactance module server may be characterized as providing an interface between the noted utility-side control system and each reactance module array controller that is associated with the reactance module server. The utility-side control system may send a communication (e.g., a system condition communication of the type discussed above in relation to the first aspect of Group 1; an operations objective communication or operational command of the type discussed above in relation to the first aspect of Group 1) to a reactance module server. The reactance module server may then translate and/or reformat this communication, if required, for transmission to each of its corresponding reactance module array controllers.

A third aspect of the present invention (Group 1) is embodied by a power transmission system that includes at least one power line section, a reactance module array for each such power line section, and at least one reactance module array controller for each such reactance module array. The reactance module array is mounted on its corresponding power line section and includes a plurality of reactance modules that are each disposable in first and second modes (e.g., the individual reactance modules may be mounted on the corresponding power line section). Switching a particular reactance module from its first mode to its second mode increases the reactance that the reactance module injects into the corresponding power line section. The reactance module array controller is configured to control each reactance module of its corresponding reactance module array (e.g., by the reactance module array controller communicating, directly or indirectly, with each reactance module of its corresponding reactance module array). In this regard, the reactance module array controller is configured to determine a modal configuration for each of its reactance modules (e.g., whether a given reactance module should be disposed in its first mode or in its second mode) in response to and/or based upon a first communication (in the form of an operations objective or an operational command). The reactance module array controller is also configured to determine a modal configuration for each of its reactance modules in response to and/or based upon a second communication (in the form of system condition data). Each of the features discussed above in relation to the first and/or second aspects (Group 1) may be used (but are not required to be used) by this third aspect (Group 1), individually and in any combination.

A fourth aspect of the present invention (Group 1) is embodied by a method of operation for a power transmission system. This power transmission system includes a plurality of reactance module arrays, each being associated with its own power line section. Each reactance module array in turn includes a plurality of reactance modules. A present state system condition communication is transmitted to at least one reactance module array controller for each reactance module array (e.g., each reactance module array controller may be associated with a particular reactance module array; one or more reactance module array controllers (e.g., a primary reactance module array controller and one or more backup reactance module array controllers) may be assigned to each reactance module array). At least one reactance module array controller for a given reactance module array that receives a present state system condition communication will retrieve a modal configuration for each reactance module of its corresponding reactance module array, and will then transmit the modal configuration to one or more of the reactance modules of its corresponding reactance module array (thereby encompassing transmitting a retrieved modal configuration to each reactance module of its corresponding reactance module array).

A number of feature refinements and additional features are applicable to the fourth aspect of the present invention within Group 1. These feature refinements and additional features may be used individually or in any combination. The following discussion is applicable to at least the fourth aspect (Group 1), up to the start of the discussion of a fifth aspect of the present invention within Group 1. The modal configuration for a given reactance module may be in the form of a first mode or a second mode in accordance with the first aspect (Group 1). One modal configuration for a reactance module may be characterized as a bypass mode (e.g., where little or no reactance is injected into the corresponding power line section). Another modal configuration for a reactance module may be characterized as a reactance injection mode. Reactance modules that receive a modal communication from a corresponding reactance module array controller may be operated in accordance with this modal communication.

The present state system condition communication may originate with a utility-side control system of the type addressed above in relation to the first through the third aspects (Group 1). Such a utility-side control system may transmit a present state system condition communication to a reactance module server(s), which in turn may transmit a corresponding present state system condition communication to each of a plurality of reactance module array controllers. Those features discussed above with regard to a utility-side control system and/or a reactance module server may be incorporated by this fourth aspect (Group 1), individually and in any combination.

Each reactance module array controller may incorporate memory of any appropriate type. In response to receipt of a present state system condition communication, a reactance module array controller may retrieve, from its memory, a modal configuration for each reactance module of its corresponding reactance module array.

Each reactance module array controller may include a lookup table. This lookup table may be in accordance with the first data structure addressed above. In response to receipt of a present state system condition communication, a reactance module array controller may retrieve, from its lookup table, a modal configuration for each reactance module of its corresponding reactance module array.

Reactance module array controllers may derive the present state system condition in at least certain circumstances. Such a derivation may be triggered based upon a predetermined number of reactance module array controllers losing communication with the present state system condition communication source (e.g., a reactance module server; a utility-side control system), based upon a predetermined number of reactance module array controllers failing to receive a present state system condition communication at an expected time or times (or otherwise in accordance with some standard), or the like. In any case and upon the development of a triggering condition, at least some of the reactance module array controllers may share information with one another, and a derived present state system condition may be generated from this shared information. This derived present state system condition may then be transmitted to at least some of the reactance module array controllers (e.g., in the form of a derived present state system condition communication). Reactance module array controllers that receive a derived present state system condition communication may then retrieve a modal configuration for each reactance module of its corresponding reactance module array in the same general manner discussed above with regard to receipt of a present state system condition communication.

Operation of a given reactance module array in accordance with a system condition-based condition may be suspended or overridden by the development of an excessive temperature condition on the associated power line section. An excessive temperature condition may be triggered in any appropriate manner, such as based upon the current flow through the power line section, the temperature of the power line section, and/or the angle of sag of the power line section. The line temperature of a given power line section may be monitored in any appropriate manner. When the line temperature of a given power line section reaches and/or exceeds a certain value (or more generally when an excessive temperature condition has been identified), one or more of the reactance modules on this power line section may be activated to inject inductance into this power line section. The logic for implementing this excessive temperature override may be incorporated by the reactance module array controllers. The logic for implementing this excessive temperature override could also be incorporated by the individual reactance modules.

A fifth aspect of the present invention (Group 1) is embodied by a method of operation for a power transmission system. A reactance module array controller of the power transmission system receives a first communication. Based upon this receipt of a first communication, a first protocol is executed for determining the modal configuration for each reactance module of a reactance module array associated with this reactance module array controller. This same reactance module array controller of the power transmission system may receive a second communication. Based upon this receipt of this second communication, a second protocol is executed for determining the modal configuration for each reactance module of its associated reactance module array, and where the second protocol differs from the first protocol.

A number of feature refinements and additional features are applicable to the fifth aspect of the present invention within Group 1. These feature refinements and additional features may be used individually or in any combination in relation to this fifth aspect. The first communication may include operations objective data or may be in the form of an operational command. Those features discussed above in relation to a reactance module array controller receiving such a communication may also be utilized by this fifth aspect (Group 1), alone and in any combination. The second communication may embody or may be directed to system condition data (e.g., a present state system condition communication from a utility-side control system; a derived present state system condition communication). Those features discussed above in relation to a reactance module array controller receiving such a communication may also be utilized by this fifth aspect (Group 1), alone and in any combination.

A number of feature refinements and additional features are separately applicable to each of above-noted aspects of the present invention within Group 1. These feature refinements and additional features may be used individually or in any combination in relation to each of the various aspects within Group 1.

Any appropriate communication link (or communication architecture) may be used between a given reactance module array controller and each reactance module of its corresponding reactance module array. Each reactance module may communicate directly with its corresponding reactance module array controller(s), or a relay-type communication architecture could be utilized to provide indirect communication between each reactance module and its corresponding reactance module array controller(s) (e.g., where communications are relayed from reactance module to reactance module (within a reaction module array) until reaching the target reactance module array controller(s), and vice versa). Each reactance module may incorporate one or more antennas to enable wireless communications (directly or indirectly) with at least one other reactance module in its corresponding reactance module array, with its corresponding reactance module array controller(s), or both.

A reactance module array controller may be integrated in any appropriate manner by a power transmission system. A reactance module array controller may be mounted on a power line (including on the same power line section as its corresponding reactance module array). A reactance module array controller may be configured so as to be mountable on a power transmission line without requiring a break in the power transmission line (e.g., using detachably connectable first and second housing sections). A reactance module array controller could also be mounted on a tower that supports one or more power transmission lines.

Any appropriate communication link (or communication architecture) may be used between a given reactance module array controller and any corresponding reactance module server(s). Each reactance module array controller may communicate directly with its corresponding reactance module server(s), or a relay-type communication architecture could be utilized to provide indirect communication between each reactance module array controller and its corresponding reactance module server(s). Communications could be relayed from reactance module array controller to reactance module array controller until reaching the target reactance module server(s), and vice versa. Each reactance module array controller may incorporate one or more antennas to enable wireless communications (directly or indirectly), with at least one other reactance module array controller, with its corresponding reactance module server(s), or both. Each reactance module array controller could use one interface for communicating with its corresponding reactance modules, and a different interface for communicating with its corresponding reactance module server(s).

Group 2 of the present invention pertains to a reactance module that includes one or more bypass sequences to protect the reactance module from overcurrent and/or fault conditions, where such a reactance module may be mounted on a power line. There are multiple aspects of the present invention within Group 2, and that will now be addressed.

A first aspect of the present invention (Group 2) is directed to a method of adjusting power line reactance. A first device is mounted on a power line and may be switched from a first mode to a second mode to increase an injected reactance being input to the power line by the first device. A first bypass sequence may be executed for the first device in a first circumstance. A second bypass sequence may be executed for the first device in a second circumstance. The first and second bypass sequences may be different. However, execution of each of the first and second bypass sequences includes shorting the first device.

A number of feature refinements and additional features are applicable to the first aspect of the present invention within Group 2. These feature refinements and additional features may be used individually or in any combination. The following discussion is applicable to the first aspect (Group 2), up to the start of the discussion of a second aspect of the present invention within Group 2.

Switching the first device from a first mode to a second mode may include opening a switching circuit operably connected to the first device, which in turn may limit the current flowing through the corresponding power line (e.g., the first device being in the second mode providing an increase in an injected reactance being input to the power line by the first device). Limiting the current flowing through the power line by this modal change of the reactance module may result in an increased current flow through one or more other power lines (e.g., an increased current flow in at least one of second and third power lines, where the power lines include a three-phase transmission system). The first device may be an open circuit when the switching circuit is open (e.g., an injection mode). The first device may be shorted when the switching circuit is closed (e.g., a bypass or monitoring mode). In one example, the switching circuit may be in the form of a contact relay.

The first bypass sequence may include monitoring a current of the power line, determining that the current of the power line satisfies a first predetermined threshold, and shorting the first device. The first device may be shorted in response to determining that the current of the power line satisfies a first predetermined threshold. Determining that the current of the power line satisfies a first predetermined threshold may include measuring the current of the power line via an analog-to-digital converter.

The second bypass sequence may include monitoring a current of the power line, determining that the current of the power line satisfies a second predetermined threshold, sending an interrupt signal to a controller operably connected with the first device, and shorting the first device. The first device may be shorted in response to determining that the current of the power line satisfies a second predetermined threshold. Determining that the current of the power line satisfies a second predetermined threshold may include measuring the current of the power line via a comparator. For example, a voltage input to the comparator may be measured.

The third bypass sequence may include monitoring a voltage of the first device, determining that the voltage of the first device satisfies a third predetermined threshold, and shorting the first device. The first device may be shorted in response to determining that the voltage of the first device satisfies a third predetermined threshold. Shorting the first device may include activating an electrical switch. For example, activating the electrical switch may include outputting a voltage of the first device from a voltage detection circuit to an input of the electrical switch. Shorting the first device may result in at least reducing the potential for damage to the first device.

The second bypass sequence may be executed when the first bypass sequence has not been executed. The third bypass sequence may be executed when neither the first bypass sequence nor the second bypass sequence has been executed. Circumstances when the first bypass sequence may not be executed include when the current from the power line has not been measured by the analog-to-digital converter and/or when a second response time (second bypass sequence) is faster. When neither the first bypass sequence nor the second bypass sequence have been executed and/or when a third response time (third bypass sequence) is faster than both a first response time (first bypass sequence) and a second response time (second bypass sequence), the third bypass sequence may be executed.

A second aspect of the present invention (Group 2) is embodied by a reactance module that is mountable on a power line, and that includes a first device, an electrical switch, a current monitor, a controller, and a plurality of different bypass sequences. The first device may be disposed in first and second modes. Switching the first device from its first mode to its second mode may increase an amount of reactance that the module injects into the power line. The electrical switch may be operable to pass an overcurrent. The controller may be operably connected with the first device to switch the first device between its first and second modes (e.g., using one or more processors/microprocessors; using any appropriate processing architecture). The controller may be operably connected with the current monitor. The plurality of different bypass sequences may be separately executable to activate the electrical switch to short the first device.

A number of feature refinements and additional features are applicable to the second aspect of the present invention within Group 2. These feature refinements and additional features may be used individually or in any combination. The following discussion is applicable to the second aspect (Group 2), up to the start of the discussion of a third aspect of the present invention within Group 2.

The plurality of different bypass sequences may include first, second, and third bypass sequences. The first bypass sequence may include the controller activating the electrical switch to short the first device based upon the controller determining that an output from the current monitor satisfies a first predetermined threshold (e.g., using one or more processors/microprocessors; using any appropriate processing architecture). For example, the output from the current monitor may indicate that the current of the power line satisfies the first predetermined threshold. The second bypass sequence may include a comparator sending a communication to the controller that the output from the current monitor satisfies a second predetermined threshold. For example, the output from the current monitor may indicate that the current of the power line satisfies the second predetermined threshold. The second bypass sequence may further include the controller activating the electrical switch to short the first device in response to a communication from the comparator. The third bypass sequence may include a voltage detection circuit activating the electrical switch to short the first device when a detected voltage satisfies a third predetermined threshold.

As noted above, the first bypass sequence may have a first response time, the second bypass sequence may have a second response time, and the third bypass sequence may have a third response time. The first response time may be the amount of time it takes for the controller to determine that the output from the current monitor satisfies the first predetermined threshold. The second response time may be the amount of time it takes for the comparator to determine that the output from the differential amplifier satisfies the second predetermined threshold. The third response time may be the amount of time it takes for the voltage detection circuit to determine that the detected voltage satisfies the third predetermined threshold. One embodiment has the first response time being faster than each of the second response time and the third response time, and the second response time being faster than the third response time (e.g., for one or more circumstances). Another embodiment has the second response time being faster than both the first response time and the third response time (e.g., for one or more circumstances). Yet another embodiment has the third response time being faster than both the first response time and the second response time (e.g., for one or more circumstances).

A third aspect of the present invention (Group 2) is embodied by a reactance module that is mountable on a power line, and that includes a first device, a first electrical switch, a controller, a second electrical switch, and a first monitor. The first device may be disposed in first and second modes. Switching the first device from its first mode to its second mode may increase an amount of reactance that the module injects into the power line. The first electrical switch may be operable to pass an overcurrent, and furthermore may be activated to short the first device based upon an output of the first monitor. The controller may be operably connected with the first device to switch the first device between its first and second modes. The second electrical switch may be operably connected to the first device and the controller. In this regard, the controller may switch the second electrical switch between an open position and a closed position when the first device is switched between the first and second modes. When the first electrical switch is activated, the second electrical switch may remain in either the open position or the closed position.

A number of feature refinements and additional features are applicable to the third aspect of the present invention within Group 2. These feature refinements and additional features may be used individually or in any combination. The following discussion is applicable to the third aspect (Group 2), up to the start of the discussion of a fourth aspect of the present invention within Group 2.

The reactance module may further include a current monitor operably connected to the controller. The second electrical switch may be a contact relay. Switching the first device from the first mode to the second mode may include opening the second electrical switch. In one embodiment, the first monitor may utilize the controller. The controller in this instance may be configured to execute a first bypass sequence (e.g., using one or more processors/microprocessors; using any appropriate processing architecture). Executing the first bypass sequence may include the controller activating the first electrical switch to short the first device when an output from the current monitor satisfies a first predetermined threshold. In another embodiment, the first monitor may utilize a comparator. The comparator may be configured to execute a second bypass sequence. The second bypass sequence may include the comparator sending a communication to the controller that an output from the current monitor satisfies a second predetermined threshold. The second bypass sequence may further include the controller activating the first electrical switch to short the first device in response to the communication from the comparator. In another embodiment, the first monitor may utilize a voltage detection circuit. The voltage detection circuit may be configured to execute a third bypass sequence. The third bypass sequence may include the voltage detection circuit activating the first electrical switch to short the first device when a detected voltage satisfies a third predetermined threshold.

A fourth aspect of the present invention (Group 2) is embodied by a reactance module that is mountable on a power line, and that includes a first device, a first electrical switch, a current monitor, a controller, and a second electrical switch. The first device may be disposed in first and second modes. Switching the first device from its first mode to its second mode may increase an amount of reactance that the module injects into the power line. The first electrical switch may be operable to pass an overcurrent. The controller may be operably connected with the first device to switch the first device between its first and second modes. The controller may also be operably connected with the current monitor. In this regard, the controller may activate the first electrical switch to short the first device based upon the controller determining that an output from the current monitor satisfies a first predetermined threshold. The second electrical switch may be operably connected to the first device and the controller. In this regard, the controller may switch the second electrical switch between an open position and a closed position when the first device is switched between the first and second modes. When the first electrical switch is activated, the second electrical switch may remain in either the open position or the closed position.

A number of feature refinements and additional features are applicable to the fourth aspect of the present invention within Group 2. These feature refinements and additional features may be used individually or in any combination. The following discussion is applicable to the fourth aspect (Group 2), up to the start of the discussion of a fifth aspect of the present invention within Group 2.

Activating the first electrical switch to short the first device based upon the controller determining that an output from the current monitor satisfies a first predetermined threshold may be characterized as a first bypass sequence.

The controller may be configured to execute the first bypass sequence when the controller is processing the output from the current monitor. In one embodiment, the first predetermined threshold is about 1100 Amps. The reactance module may further include a comparator operably connected to the controller and the current monitor. The comparator may be configured to execute a second bypass sequence. Executing the second bypass sequence may include the comparator sending a communication to the controller that an output from the current monitor satisfies a second predetermined threshold. Executing the second bypass sequence may further include the controller activating the first electrical switch to short the first device in response to the communication from the comparator. In one embodiment, the second predetermined threshold is about 1800 Amps.

The reactance module may further include a voltage detection circuit operably connected to the first device and the first electrical switch. In one embodiment, the voltage detection circuit may be configured to execute a third bypass sequence. Executing the third bypass sequence may include the voltage detection circuit activating the first electrical switch to short the first device when a detected voltage satisfies a third predetermined threshold. The third predetermined threshold may be about 1800 volts. The detected voltage may be a voltage of the first device.

A fifth aspect of the present invention (Group 2) is embodied by a reactance module that is mountable on a power line, and that includes a first device, an electrical switch, a current monitor, a comparator, and a controller. The first device may be disposed in first and second modes. Switching the first device from its first mode to its second mode may increase an amount of reactance that the module injects into the power line. The electrical switch may be operable to pass an overcurrent. The comparator may be operably connected with the current monitor. The controller may be operably connected with the first device to switch the first device between its first and second modes. The controller may also be operably connected with the comparator. In this regard, the controller may activate the electrical switch to short the first device based upon the comparator sending a communication to the controller that an output from the current monitor satisfies a first predetermined threshold.

A number of feature refinements and additional features are applicable to the fifth aspect of the present invention within Group 2. These feature refinements and additional features may be used individually or in any combination. The following discussion is applicable to the fifth aspect (Group 2), up to the start of the discussion of a sixth aspect of the present invention within Group 2.

Activating the electrical switch to short the first device based upon the comparator sending a communication to the controller that an output from the current monitor satisfies a first predetermined threshold may be characterized as a first bypass sequence. The output from the current monitor may be an analog signal indicating a measured current value. The first predetermined threshold may be about 1800 Amps. The controller may be configured to execute a second bypass sequence. Executing the second bypass sequence may include the controller determining that an output from the current monitor satisfies a second predetermined threshold. Executing the second bypass sequence may further include the controller activating the electrical switch to short the first device when the controller determines that the output from the current monitor satisfies the second predetermined threshold. The controller may include an analog-to-digital converter. The analog-to-digital converter may determine that the output from the current monitor satisfies the second predetermined threshold. The first bypass sequence may be executed when the second bypass sequence has not been executed. The second bypass sequence may not be executed when the output from the current monitor has not been processed by the controller. The second predetermined threshold may be about 1100 Amps.

The reactance module may further include a voltage detection circuit operably connected to the first device and the electrical switch. In one embodiment, the voltage detection circuit may be configured to execute a third bypass sequence. Executing the third bypass sequence may include the voltage detection circuit activating the electrical switch to short the first device when a detected voltage satisfies a third predetermined threshold. The third predetermined threshold may be about 1800 volts. The detected voltage may be a voltage of the first device. The third bypass sequence may be executed if neither the first bypass sequence nor the second bypass sequence has been executed.

A sixth aspect of the present invention (Group 2) is embodied by a reactance module that is mountable on a power line, and that includes a first device, an electrical switch, a controller, and a voltage detection circuit. The first device may be disposed in first and second modes. Switching the first device from its first mode to its second mode may increase an amount of reactance that the module injects into the power line. The electrical switch may be operable to pass an overcurrent. The controller may be operably connected with the first device to switch the first device between its first and second modes. The voltage detection circuit may activate the electrical switch to short the first device when a detected voltage satisfies a first predetermined threshold.

A number of feature refinements and additional features are applicable to the sixth aspect of the present invention within Group 2. These feature refinements and additional features may be used individually or in any combination. The following discussion is applicable to at least the sixth aspect (Group 2).

Activating the electrical switch to short the first device when a detected voltage satisfies a first predetermined threshold may be characterized as a first bypass sequence. The first predetermined threshold may be about 1800 volts. The reactance module may further include a current monitor and comparator. The comparator may be operably connected to the controller and the current monitor. In one embodiment, the comparator may be configured to execute a second bypass sequence. Executing the second bypass sequence may include the comparator sending a communication to the controller that an output from the current monitor satisfies a second predetermined threshold. The second predetermined threshold may be about 1800 amps. Executing the second bypass sequence may further include the controller activating the electrical switch to short the first device in response to the communication from the comparator. The output from the current monitor may be an analog signal indicating a measured current value. The first bypass sequence may be executed when the second bypass sequence has not been executed.

In one embodiment, the controller may be configured to execute a third bypass sequence. Executing the third bypass sequence may include the controller determining that an output from the current monitor satisfies a third predetermined threshold. Executing the third bypass sequence may further include the controller activating the electrical switch to short the first device when the controller determines that the output from the current monitor satisfies the third predetermined threshold. For example, the controller may include an analog-to-digital converter that may determine that the output from the current monitor satisfies the third predetermined threshold. The third predetermined threshold may be about 1100 amps.

The first bypass sequence could be used in combination with the second bypass sequence, in combination with the third bypass sequence, or in combination with each of the second and third bypass sequences. The first bypass sequence may be executed if the second bypass sequence has not been executed. The first bypass sequence may be executed if the third bypass sequence has not been executed. The first bypass sequence may be executed if neither the second bypass sequence nor the third bypass sequence have been executed.

A number of feature refinements and additional features are applicable to each aspect of the present invention within Group 2, unless otherwise noted to the contrary. These feature refinements and additional features may be used individually or in any combination. The following discussion is applicable to the present invention within Group 2, up to the start of the discussion on Group 3 of the present invention.

For purposes of the present invention within Group 2, the electrical switch and the first electrical switch may be the same and/or interchangeable in the discussion of the various aspects. In other words, any discussion in relation to the electrical switch may also apply to the first electrical switch in the case of Group 2. The first device may be a reactance injecting circuit. For example, the first device may be in the form of a single turn transformer. The injected reactance being input to the power line may be one of inductance or capacitance. As discussed above, the first device may be disposed in first and second modes. When the first device is disposed in the first mode, the injected reactance by the first device may be substantially zero or only minimal.

The current monitor may be one of a differential amplifier or an analog-to-digital converter. For example, both the differential amplifier and the analog-to-digital converter may be configured to monitor a current of the power line. As discussed above, the comparator may send a communication to the controller that an output from the current monitor satisfies a certain predetermined threshold. The communication from the comparator may be an interrupt signal. The interrupt signal may prompt the controller to activate the electrical switch. Activating the electrical switch may include the controller sending a series of electrical pulses to the electrical switch such that the electrical switch begins conducting. The electrical switch may be a solid-state semiconductor device. For example, the electrical switch may be a thyristor pair. As discussed above, the voltage detection circuit may activate the electrical switch to short the first device when a detected voltage satisfies a certain predetermined threshold. The detected voltage may be a voltage of the first device. The voltage detection circuit may be a crow bar circuit.

Details regarding a bypass sequence in one aspect within Group 2 may be applicable to the corresponding bypass sequence in another aspect within Group 2. However, it should be appreciated that the "first bypass sequence" or the like in relation to one aspect within Group 2 may not necessarily coincide with the "first bypass sequence" in another aspect within Group 2 (e.g., the terms first, second, and third in relation to the bypass sequences are merely labels and may be used to address the order in which a particular bypass sequence is being addressed in the corresponding aspect).

Group 3 of the present invention pertains to controlling operation of reactance modules that may be mounted on one or more power lines. There are multiple aspects of the present invention within Group 3, and that will now be addressed.

A first aspect of the present invention (Group 3) is embodied by a power transmission system having at least one power line section, at least one reactance module array controller, and at least one reactance module array. Each reactance module array is mounted on a different power line section. Multiple reactance modules define each reactance module array. A given reactance module array controller may be dedicated to a particular reactance module array, or stated another way each reactance module array may be associated with a different reactance module array controller.

Each reactance module of each reactance module array may be disposed in first and second modes in the case of the first aspect (Group 3). Switching a particular reactance module from its first mode to its second mode increases the amount of reactance that the module injects into its corresponding power line section. Each reactance module array controller is configured to: 1) receive a first communication; 2) to thereafter determine a modal configuration for each reactance module of its corresponding reactance module array, where this modal configuration is based upon the first communication; and 3) to thereafter send a modal communication to one or more reactance modules within its corresponding reactance module array.

A second aspect of the present invention (Group 3) is embodied by a power transmission system having multiple power line sections. Each of these power line sections has a plurality of reactance modules that are mounted thereon and that collectively define a reactance module array for the power line section. Each reactance module of each reactance module array may be disposed in first and second modes. Switching a particular reactance module from its first mode to its second mode increases the amount of reactance that the reactance module injects into its corresponding power line section.

The power transmission system further includes a plurality of reactance module array controllers, a reactance module server, and a utility-side control system in the case of the second aspect (Group 3). There is at least one reactance module array controller for each reactance module array of the power transmission system, and a given reactance module array controller communicates with and controls its corresponding reactance module array. A given reactance module array controller may be dedicated to a particular reactance module array, or stated another way each reactance module array may be associated with a different reactance module array controller. The reactance module server is configured to communicate with multiple reactance module array controllers. The utility-side control system communicates with the reactance module server.

A third aspect of the present invention (Group 3) is embodied by a power transmission system having multiple power line sections. Each of these power line sections has a plurality of reactance modules that are mounted thereon and that collectively define a reactance module array for the power line section. Each reactance module of each reactance module array may be disposed in first and second modes. Switching a particular reactance module from its first mode to its second mode increases the amount of reactance that the reactance module injects into its corresponding power line section.

The power transmission system further includes a plurality of reactance module array controllers and a master controller in the case of the third aspect (Group 3). There is at least one reactance module array controller for each reactance module array of the power transmission system, and a given reactance module array controller communicates with and controls its corresponding reactance module array. A given reactance module array controller may be dedicated to a particular reactance module array, or stated another way each reactance module array may be associated with a different reactance module array controller. The master controller is configured to communicate with multiple reactance module array controllers.

A number of feature refinements and additional features are applicable to each aspect of the present invention within Group 3, unless otherwise noted to the contrary. These feature refinements and additional features may be used individually or in any combination. The following discussion is applicable to the present invention within Group 3, up to the start of the discussion on Group 4 of the present invention.

The power transmission system may include any appropriate number of power line sections (and thereby any appropriate number of reactance module arrays), including multiple power line sections. A given pair of power line sections for the power transmission system may be different portions of a common power line, or may be portions of entirely different power lines.

Multiple reactance module array controllers may be configured to: 1) receive a first communication; 2) to thereafter determine a modal configuration for each reactance module of its corresponding reactance module array, where this modal configuration is based upon the first communication; and 3) to thereafter send a modal communication to one or more reactance modules within its corresponding reactance module array. A first communication that is received by a particular reactance module array controller may be applicable to (or specific to) the power line section of its corresponding reactance module array. This first communication may be of any appropriate form, such as a target operating condition (e.g., a target current, a target power, a maximum line temperature, or any combination thereof).

As noted, each reactance module array controller is configured to determine the modal configuration for each reactance module of its corresponding reactance module array based upon a first communication. In one embodiment, this first communication does not itself identify the modal configuration for each reactance module for the corresponding reactance module array—a reactance module array controller receiving such a first communication may independently determine (e.g., using one or more processors/microprocessors; using any appropriate processing architecture) the modal configuration for each reactance module of its corresponding reactance module array based upon the content of the first communication. In one embodiment, each reactance module array controller is mounted on its corresponding power line section.

A modal communication that is sent by a given reactance module array controller to a reactance module in its corresponding reactance module array may specify whether this particular reactance module should be in its first mode or in its second mode. In response to receipt of a first communication, a reactance module array controller could be configured to send a modal communication to each reactance module of its corresponding reactance module array. Another option would be for a reactance module array controller to be configured to send a modal communication to only those reactance modules of its corresponding reactance module array that require a change in their modal configuration (to switch from the first mode to the second mode, or to switch from the second mode to the first mode).

Consider the case where the power transmission system includes first and second power line sections, first and second reactance module array controllers for these first and second power line sections, respectively, and first and second reactance module arrays that are mounted on the first and second power line sections, respectively. Such a power transmission system may include a reactance module server (e.g. configured to provide one or more functions, such as receiving status information from each reactance module array controller regarding its corresponding reactance modules, receiving line condition data from each reactance module array controller, and sending commands to one or more reactance module array controllers) and a utility-side control system (e.g., an energy management system; a supervisory control and data acquisition system or a SCADA unit; a market management system). The reactance module server may be configured to communicate with each of the first and second reactance module array controllers (or any appropriate number of reactance module array controllers). The utility-side control system may be in communication with the reactance module server. One communication format may be used for communications between the reactance module server and the utility-side control system. Another communication format (e.g., a different communication format) may be used for communications between the reactance module server and each of the first and second reactance module array controllers.

The power transmission system may include a central module or master controller that is configured to communicate with the above-noted first and second reactance module array controllers. The first and second reactance module array controllers may also be configured to communicate with one another. One embodiment has the central module being in the form of the above-noted utility-side control system. Another embodiment has the central module being in the form of the above-noted reactance module server. In any case, the first and second reactance module array controllers may be configured to communicate with one another upon losing communication with the central module. For instance, the first and second reactance module array controllers may be configured to receive operating instructions from the central module. If these operating instructions are not received, the first and second reactance module array controllers may be configured to communicate with one another to share information and determine the modal configuration for each reactance module of their respective reactance module arrays (e.g., based upon the shared information).

The power transmission system may include any appropriate number of power line sections, including any appropriate number of multiple power line sections (such that the power transmission system would then include multiple reactance module array controllers and reactance module arrays, where there is at least one reactance module array controller per reactance module array (e.g., one or more reactance module arrays could have a dedicated primary reactance module array controller and at least one dedicated backup reactance module array controller)). The above-noted central module or master controller may be configured to communicate with any appropriate number of reactance module array controllers, including two or more reactance module array controllers. Each reactance module array controller may be configured to communicate with at least one other reactance module array controller. Similar to the foregoing, multiple reactance module array controllers may be configured to receive operating instructions from the central module or master controller. If at least one reactance module array controller fails to receive operating instructions from the central module or master controller, one or more reactance module array controllers (e.g., a reactance module array controller that failed to receive operating instructions) may communicate with one or more other reactance module array controllers to share information and determine the modal configurations for their corresponding reactance module array (e.g., based upon the shared information).

One or more reactance module array controllers of the power transmission system may incorporate a first data structure. The first data structure for a given reactance module array controller may include a plurality of system conditions. The first data structure of a given reactance module array controller may relate each system condition to a modal configuration for each reactance module of its corresponding reactance module array. At least one control objective may be associated with each system condition that is included in the first data structure of a given reactance module array controller. Representative control objectives include without limitation power flow control and low frequency oscillation control (e.g., damping frequencies within a range of about 0.1 Hz to about 5 Hz). As such and for a given system condition within the first data structure, there could be multiple control objectives that are associated with this same system condition in the first data structure. Each of these control objectives may be associated in the data structure with a modal configuration for each reactance module of the corresponding reactance module array. It should be appreciated that for a given system condition within the first data structure, a given reactance module could have one modal configuration for a first control objective for this system condition and could have a different modal configuration for a second control objective for this same system condition. However, it should also be appreciated that for a given system condition in the first data structure, a given reactance module could have one modal configuration for a first control objective for this system condition and could have the same modal configuration for a second control objective for this same system condition. The modal configuration for a particular reactance module within the first data structure in relation to a first control objective in a first system condition may be independent of the modal configuration for this same reactance module within the first data structure in relation to a different second control objective in the same first system condition.

One or more reactance module array controllers of the power transmission system may be configured to receive a system condition communication. Such a reactance module array controller may be configured to use this system condition communication to identify the corresponding system condition in its first data structure, and may send or transmit a modal communication to at least one reactance module in its corresponding reactance module array in accordance with the first data structure (e.g., based upon the modal configuration that is set forth in the first data structure for the particular reactance module and the particular system condition). In one embodiment, such a system communication signal may be sent or transmitted by the above-noted central module or master controller (e.g., the noted utility-side control system). If a reactance module array controller fails to receive a system condition communication from the central module, one or more reactance module array controllers (e.g., a reactance module array controller that failed to receive a system condition communication) may communicate with one or more other reactance module array controllers to share information and determine the current system condition. The determined current system condition may then be used by a reactance module array controller to identify the corresponding system condition in its first data structure, and to thereafter send or transmit a modal communication to at least one reactance module in its corresponding reactance module array in accordance with the first data structure (e.g., based upon the modal configuration that is set forth in the first data structure for the particular reactance module and the particular system condition).

A temperature override protocol may be used by the power transmission system. This functionality may be incorporated by each of the reactance modules, by the reactance module array controllers, or both. For instance, each reactance module of a given reactance module array may include a temperature override protocol that is configured to dispose the reactance module in its second mode in response to identification of an excessive temperature condition on its corresponding power line section. A given reactance module array controller may include a temperature override protocol that is configured to dispose at least some reactance module modules in its corresponding reactance module array in their respective second mode in response to identification of an excessive temperature condition on its corresponding power line section. An excessive temperature condition could be identified in any appropriate manner, for instance based upon monitoring of the power line section by one or more of the corresponding reactance modules. An excessive temperature condition may be triggered in any appropriate manner, such as based upon the current flow through the power line section (e.g., a current override signal), the temperature of the power line section (a temperature override signal), and/or the angle of sag of the power line section (e.g., a sag angle override signal).

Group 4 of the present invention pertains at least in part to a power line reactance module having the combined capability of supplying power to the power line reactance module and measuring a power line current (e.g., to protect the reactance module from overcurrent and/or fault conditions). There are multiple aspects of the present invention within Group 4, and that will now be addressed.

A first aspect of the present invention (Group 4) is directed to a reactance module that is mountable on a power line, and that includes a first device, a current transformer, a power supply, and a controller. The first device may be disposed in first and second modes. Switching the first device from its first mode to its second mode may increase an amount of reactance that the module injects into the power line. The current transformer may be configured to receive a first current and output a second current. The second current may be different than the first current and proportional to the first current. The power supply may be operably connected to the current transformer and may include a bridgeless power factor correction circuit. The current transformer may be part of the bridgeless power factor correction circuit. The controller may be operably connected to the first device and furthermore may be configured to switch the first device between the first and second modes (e.g., using one or more processors/microprocessors; using any appropriate processing architecture).

A number of feature refinements and additional features are applicable to the first aspect of the present invention within Group 4. These feature refinements and additional features may be used individually or in any combination.

The following discussion is applicable to the first aspect of the present invention within Group 4, up to the start of the discussion of a second aspect of the present invention within Group 4.

The bridgeless power factor correction circuit may include a first controllable switch and a second controllable switch. The bridgeless power factor correction circuit may further include a first rectifier operably connected to the first controllable switch, a second rectifier operably connected to the second controllable switch, and a capacitor operably connected to the first rectifier and the second rectifier. In this regard, the capacitor may receive an output current from the first rectifier and the second rectifier. The power supply may further include a regulator operably connected to the first controllable switch and the second controllable switch. The power supply may output a regulated voltage and this regulated voltage may power the controller. The regulator may be configured to switch the first controllable switch and the second controllable switch between a conducting state and a non-conducting state. For example, the regulator may switch the first controllable switch and the second controllable switch to the conducting state when the regulated voltage satisfies a predetermined threshold. In another example, the regulator may switch the first controllable switch and the second controllable switch to the non-conducting state when the regulated voltage drops below the predetermined threshold.

When the first controllable switch and the second controllable switch are in the conducting state, the output current from the first rectifier and the second rectifier may be shunted. When the output current from the first rectifier and the second rectifier is shunted, the capacitor may discharge. When the first controllable switch and the second controllable switch are in the non-conducting state, the capacitor may receive the output current from the first rectifier and the second rectifier. When the capacitor receives the output current from the first rectifier and the second rectifier, the capacitor may charge.

A second aspect of the present invention (Group 4) is directed to a reactance module that is mountable on a power line, and that includes a first device, a current transformer, a power supply, and a current monitor. The first device may be disposed in first and second modes. Switching the first device from its first mode to its second mode may increase an amount of reactance that the module injects into the power line. The current transformer may be configured to receive a first current and output a second current. The second current may be different than the first current and may be proportional to the first current. The power supply may be operably connected to the current transformer. The current monitor may be operably connected to the current transformer and may be configured to measure the second current. The current transformer may be operable to output the second current to the power supply through the current monitor.

A number of feature refinements and additional features are applicable to the second aspect (Group 4). These feature refinements and additional features may be used individually or in any combination. The following discussion is applicable to at least the second aspect of the present invention within Group 4.

The power supply may include a bridgeless power factor correction circuit including a first controllable switch and a second controllable switch. The reactance module may further include a controller operably connected to the first device, the power supply, and the current monitor. The controller may be configured to switch the current transformer from a first state to a second state. The current transformer may be part of the bridgeless power factor correction circuit. The first state of the current transformer may include the current transformer outputting the second current to the power supply. The second state of the current transformer may include the current monitor measuring the second current output by the current transformer. When the current transformer is in the first state, the power supply may output a regulated voltage. When the current transformer is in the second state, the first controllable switch and the second controllable switch may conduct, the power supply may be shunted, and the current monitor may measure the second current. When the current monitor measures the second current, the second current may have a signal-to-noise ratio of at least about 48 dB.

The current monitor may include an instrument or instrumental current transformer operably connected to the current transformer. The instrument current transformer may be different than the current transformer. For example, the instrument current transformer may be configured to receive the second current from the current transformer and output a third current. The third current may be different than the second current and proportional to the second current.

A number of feature refinements and additional features are applicable to each aspect of the present invention within Group 4, unless otherwise noted to the contrary. These feature refinements and additional features may be used individually or in any combination. The following discussion is applicable to the present invention within Group 4, up to the start of the discussion on Group 5 of the present invention.

The first device may include a reactance injecting circuit. The injected reactance being input to the power line may be one of inductance or capacitance. For example, the reactance injecting circuit may include a single turn transformer. The current transformer may be mounted on a power line when the reactance module is mounted on the power line. As discussed above, the current transformer may be configured to receive a first current and output a second current. The first current may be a power line current and may be greater than the second current. The second current may be based on the number of turns of a secondary winding of the current transformer.

The controller may further include a logical summing device. The logical summing device may be configured to output a control signal. In addition to the regulator being able to switch the first controllable switch and the second controllable switch to a conducting state, as discussed above, the logical summing device may control the state of the first controllable switch and the second controllable switch. For example, when the control signal output by the logical summing device is active, the first controllable switch and the second controllable switch may be in a conducting state.

Group 5 of the present invention pertains to a core (e.g., first and second core sections) that may be used by a reactance module, which in turn may be installed on a power line. There are multiple aspects of the present invention within Group 5. The reactance module of each of these aspects includes a housing having a first housing section (e.g., a lower housing section when the reactance module is mounted on a power line) and a second housing section (e.g., an upper housing section when the reactance module is mounted on a power line). These first and second housing sections may be detachably interconnected (e.g., to accommodate installation of the reactance module on a power line, and removal of the reactance module from the power line, all without "breaking" the power line). A power line may be captured between the first and second housing sections when detachably connected, and may extend between the first and second core sections.

The reactance module of each aspect of the present invention within Group 5 further includes a core and at least one winding that are each disposed within the housing. A bypass switch is disposed within the housing and is electrically interconnected with at least one winding. A controller is operatively interconnected with the bypass switch. Disposing the bypass switch in a first switch position is associated with a first mode for the reactance module, while disposing the bypass switch in a second switch position is associated with a second mode for the reactance module. Switching the reactance module from the first mode into its second mode increases an injected reactance being input to a power line when the reactance module is mounted on the power line. The various aspects of the present invention within Group 5 will now be addressed.

A first aspect of the present invention (Group 5) is directed to a reactance module that may be mounted on a power line. A first core section is disposed within the first housing section and includes a plurality first core segments that are disposed in end-to-end relation. These first core segments of the first core section collectively extend between a pair of first ends for the first core section (e.g., the first core section may have a pair of oppositely disposed ends). These first core segments may be electrically conductive, may be magnetically conductive, or both. A first winding is wrapped around the first core section between its pair of first ends. A second core section is disposed within the second housing section and includes a plurality second core segments that are also disposed in end-to-end relation. These second core segments may be electrically conductive, may be magnetically conductive, or both.

A second aspect of the present invention (Group 5) is directed to a reactance module that may be mounted on a power line. A first core section is disposed within the first housing section, is at least one of electrically and magnetically conductive, and has a pair of first ends (e.g., the first core section may have a pair of oppositely disposed ends). A first winding is wrapped around the first core section between its pair of first ends, and a first core assembly includes both the first core section and the first winding. A first encapsulating section is disposed between the first core assembly and the first housing section. A second core section is disposed within the second housing section, and is at least one of electrically and magnetically conductive. A third encapsulating section is disposed between the second core section and the second housing section.

A third aspect of the present invention (Group 5) is directed to a reactance module that may be mounted on a power line. A first core section is disposed within the first housing section, is at least one of electrically and magnetically conductive, has a pair of first ends (e.g., the first core section may have a pair of oppositely disposed ends), and has first and second face sections that extend between its pair of first ends. A second core section is disposed within the second housing section, is at least one of electrically and magnetically conductive, has a pair of second ends (e.g., the second core section may have a pair of oppositely disposed ends), and has third and fourth face sections that extend between its pair of second ends. At least one spacer is disposed between the first face section of the first core section and the third face section of the second core section. Similarly, at least one spacer is disposed between the second face section of the first core section and the fourth face section of the second core section. At least one of the first core section and the second core section includes a winding.

A number of feature refinements and additional features are applicable to each aspect of the present invention within Group 5, unless otherwise noted to the contrary. These feature refinements and additional features may be used individually or in any combination. The following invention is applicable to the present invention within Group 5, up to the start of the discussion on Group 6 of the present invention.

The first core section may include a plurality first core segments that are disposed in end-to-end relation. These first core segments of the first core section may collectively extend between a pair of first ends for the first core section (e.g., the first core section may have a pair of oppositely disposed ends). These first core segments may be electrically conductive, may be magnetically conductive, or both. Each first core segment of the first core section may be disposed in either closely spaced relation to or in contact with (e.g., disposed in abutting relation with) an adjacent first core segment of the first core section. In one embodiment, adjacent ends of each adjacent pair of first core segments are separated by a relatively small space. Other spacings may be appropriate.

A first winding may be wrapped around the first core section between its pair of first ends (e.g., the first winding may extend in the length dimension of the first core section; the portion of the first winding located between the first ends of the first core section may be at least generally parallel to the power line). The first winding may be fixed or attached to the first core section in any appropriate manner. The first winding may be fixed or attached to the first core section at multiple locations, including at locations that are spaced along the length dimension of the first core section. One embodiment has the first winding being fixed or attached to each first core segment of the first core section (e.g., the end-to-end disposition of the first core segments defining a length dimension for the first core section). A first core assembly may be characterized as including the first core section and the noted first winding.

The second core section may include a plurality second core segments that are disposed in end-to-end relation. These second core segments of the second core section may collectively extend between a pair of second ends for the second core section (e.g., the second core section may have a pair of oppositely disposed ends). These second core segments may be electrically conductive, may be magnetically conductive, or both. Each second core segment of the second core section may be disposed in either closely spaced relation to or in contact with (e.g., disposed in abutting relation with) an adjacent second core segment of the second core section. In one embodiment, adjacent ends of each adjacent pair of second core segments are separated by a relatively small space. Other spacings may be appropriate.

A second winding may be wrapped around the second core section between its pair of second ends (e.g., the second winding may extend in the length dimension of the second core section; the portion of the second winding located between the second ends of the second core section may be at least generally parallel to the power line). The second winding may be fixed or attached to the second core section in any appropriate manner. The second winding may be fixed or attached to the second core section at multiple locations, including at locations that are spaced along the length dimension of the second core section. One embodiment has the second winding being fixed or attached to each second core segment of the second core section (e.g., the end-to-end disposition of the second core segments defining a length dimension for the second core section). A second core assembly may be characterized as including the second core section and the noted second winding.

The reactance module may include at least one winding for a core defined by the first and second core sections. The first core section could include the noted first winding without the second core section including any associated winding. The second core section could include the noted second winding without the first core section including any associated winding. The first core section could include the noted first winding, the second core section could include the noted second winding, and the first and second windings could be electrically connected in any appropriate manner.

The first core section may be characterized as having first and second interfaces, interface surfaces, or face sections, while the second core section may be characterized as having third and fourth interfaces, interface surfaces, or face sections. One embodiment has the power line (when the reactance module is installed on the power line) being disposed at least generally between the first and second interfaces/first and second face sections of the first core section, and being disposed at least generally between the third and fourth interfaces/third and fourth face sections of the second core section. In any case, the first interface/first face section of the first core section may be aligned with the third interface/third face section of the second core section, while the second interface/second face section of the first core section may be aligned with the fourth interface/fourth face section of the second core section. At least one of the first interface/first face section (first core section) and the aligned third interface/third face section (second core section) may include at least one spacer. Similarly, at least one of the second interface/second face section (first core section) and the aligned fourth interface/fourth face section (second core section) may include at least one spacer. Each such spacer between the first and second core sections may be in the form of a dielectric, a polyimide film, or both.

Each separate first core segment for the first core section may be characterized as including first and second faces, while each second core segment for the second core section may be characterized as including third and fourth faces. One embodiment has the power line (when the reactance module is installed on the power line) being disposed or located at least generally between the first and second faces of each first core segment for the first core section (e.g., the length dimension of the power line and the length dimension for each of the first and second faces being least generally parallel to each other), and being disposed at least generally between the third and fourth faces of each second core segment for the second core section (e.g., the length dimension of the power line and the length dimension for each of the third and fourth faces being least generally parallel to each other).

The noted faces for the first and second core segments are subject to a number of characterizations. One is that the first and second faces (first core segments) and that the third and fourth faces (second core segments) each may be at least substantially planar or flat surfaces. The first and second faces for each of the first core segments may be at least substantially disposed in a common reference plane (e.g., disposed in coplanar relation). The third and fourth faces for each of the second core segments may be at least substantially disposed in a common reference plane (e.g., disposed in coplanar relation). The collective first and second faces of the first core segments for the first core section may be disposed in at least substantially parallel relation to the collective third and fourth faces of the second core segments for the second core section.

The first face of each first core segment may be aligned with a third face of a corresponding second core segment, while the second face of each first core segment may be aligned with a fourth face of a corresponding second core segment. The first face for each of the first core segments (first core section) and the third face for each of the second core segments (second core section) may be characterized as being disposed at least generally on a first side of a power line that extends through the reactance module, while the second face for each of the first core segments (first core section) and the fourth face for each of the second core segments (second core section) may be characterized as being disposed at least generally on a second side of a power line that extends through the reactance module, where the noted first and second power line sides are at least generally opposite of one another (e.g., the left and right side of a power line when the reactance module is mounted on the power line).

At least one spacer may exist between adjacently disposed portions of the first core section and the second core section, as previously noted. A separate spacer may be mounted in any appropriate manner to each first face and each second face of the first core segments that collectively define the first core section, while a separate spacer may be mounted in any appropriate manner to each third face and each fourth face of the second core segments that collectively define the second core section. Another option is for a single spacer to be mounted to the first core section and that extends along the first face of each of the first core segments for the first core section, for a single spacer to be mounted to the first core section and that extends along the second face of each of the first core segments for the first core section, for a single spacer to be mounted to the second core section and that extends along the third face of each of the second core segments for the second core section, and for a single spacer to be mounted to the second core section and that extends along the fourth face of each of the second core segments for the second core section, individually and in any combination.

One or more spacers may be attached to the first core section such that the first face of each first core segment is "covered" by at least one spacer (e.g., a single spacer could be disposed over the entirety of the first face of a given first core segment; part of the first face of a given first core segment could be "covered" by one spacer, and the remainder of the first face of this first core segment could be "covered" by another spacer). One or more spacers may be attached to the first core section such that the second face of each first core segment is "covered" by at least one spacer (e.g., a single spacer could be disposed over the entirety of the second face of a given first core segment; part of the second face of a given first core segment could be "covered" by one spacer, and the remainder of the second face of this first core segment could be "covered" by another spacer). One or more spacers may be attached to the second core section such that the third face of each second core segment is "covered" by at least one spacer (e.g., a single spacer could be disposed over the entirety of the third face of a given second core segment; part of the third face of a given second core segment could be "covered" by one spacer, and the remainder of the third face of this second core segment could be "covered" by another spacer). One or more spacers may be attached to the second core section such that the fourth face of each second core segment is "covered" by at least one spacer (e.g., a single spacer could be disposed over the entirety of the fourth face of a given second core segment; part of the fourth face of a given second core segment could be "covered" by one spacer, and the remainder of the fourth face of this second core segment could be "covered" by another spacer).

A first encapsulating section may be disposed between the first core section (and any first winding that is installed on the first core section) and the first housing section. This first encapsulating section may occupy the entirety of the space between the first core section and the first housing section. The first encapsulating section may maintain the first core section and the first housing section in spaced relation to one another. The first core section may include a first cavity, and the reactance module may include a second encapsulating section that is disposed within this first cavity. The second encapsulating section may be located between the first core section (and any first winding that is installed on the first core section) and a power line that extends through the reactance module. The second encapsulating section may maintain the first core section and the power line in spaced relation to one another.

A third encapsulating section may be disposed between the second core section (and any second winding that is installed on the second core section) and the second housing section. This third encapsulating section may occupy the entirety of the space between the second core section and the second housing section. The third encapsulating section may maintain the second core section and the second housing section in spaced relation to one another. The second core section may include a second cavity, and the reactance module may include a fourth encapsulating section that is disposed within this second cavity. The fourth encapsulating section may be located between the second core section (and any second winding that is installed on the second core section) and a power line that extends through the reactance module. The fourth encapsulating section may maintain the second core section and the power line in spaced relation to one another.

Group 6 of the present invention pertains to the installation of a reactance module on a power line. There are multiple aspects of the present invention within Group 6, and that will now be addressed.

A first aspect of the present invention (Group 6) is directed to a reactance module that may be mounted on a power line. The reactance module includes a housing having first and second housing sections, where the first housing section includes first and second installation hooks that are positioned to allow the first housing section to be suspended from a power line when mounting the reactance module on the power line. The first and second housing sections may be detachably interconnected.

The reactance module for the first aspect of the present invention (Group 6) further includes a first device that is located within the housing and that may be disposed in each of first and second modes. Switching the reactance module from the first mode into its second mode increases an injected reactance being input to a power line when the reactance module is mounted on the power line. A bypass switch is disposed within the housing and is operatively interconnected with the first device. A controller is operatively interconnected with the bypass switch.

A number of feature refinements and additional features are applicable to the first aspect of the present invention within Group 6. These feature refinements and additional features may be used individually or in any combination. The following discussion is applicable to the first aspect (Group 6), up to the start of the discussion of a second aspect of the present invention within Group 6.

The first device may include a core assembly having at least one winding. This core assembly may be in accordance with the first and second core sections discussed above with regard to the present invention of Group 5, including the discussion with regard to any associated winding. However, the core assembly for this first aspect (Group 6) could be in the form of a one-piece first core section and a separate one-piece second core section, where at least one of the one-piece first and second core sections includes a winding.

The first and second installation hooks may be characterized as being spaced along a length dimension of the reactance module (e.g., the first and second installation hooks may engage the power line (during installation of the reactance module) at locations that are spaced along the length dimension of the power line). One embodiment has the first and second installation hooks being located at least generally at oppositely disposed ends of the reactance module. More than two installation hooks could be utilized and may be spaced along the reactance module. In any case, end portions of the first and second installation hooks may "open" in a direction that is at least generally orthogonal to the length dimension of the reactance module (e.g., so that the power line may be directed into the end portion of each of the first and second installation hooks, and such that the end portion of each of the first and second installation hooks will then be positioned above a corresponding portion of the power line).

The first housing section may be the "lower" portion of the housing when the reactance module is mounted on a power line. For instance, the second housing section may be positioned above or in overlying relation to the first housing section when the reactance module is mounted on a power line. In this regard, the second housing section may include first and second installation hook pockets that are aligned with the first and second installation hooks, respectively, for the first housing section. The first installation hook pocket for the second housing section may be disposed above or in overlying relation to the first installation hook for the first housing section. Similarly, the second installation hook pocket for the second housing section may be disposed above or in overlying relation to the second installation hook for the first housing section. When the first housing section is hung from the power line using the first and second installation hooks, the second housing section may be positioned above the first housing section. As the first and second housing sections are thereafter detachably connected, the first housing section may be raised to direct the first and second installation hooks into (or further into) the corresponding installation hook pocket in the second housing section.

A second aspect of the present invention (Group 6) is directed a method of installing a reactance module on a power line. A first housing section for the reactance module may be suspended from a power line, where this first housing section includes a first core assembly. A second housing section for the reactance module may be positioned above both the power line and the first housing section. The second housing section includes a second core assembly. At least one of the first and second core assemblies incorporates a winding. Securing the second housing section to the first housing section raises the first housing section relative to the power line.

A number of feature refinements and additional features are applicable to the second aspect of the present invention within Group 6. These feature refinements and additional features may be used individually or in any combination. The following discussion is applicable to the second aspect (Group 6), up to the start of the discussion on Group 7 of the present invention.

The first and second core assemblies may be in accordance with the first and second core sections, respectively, discussed above with regard to the present invention of Group 5, including the discussion with regard to any associated winding. However, the first and second core assemblies for this second aspect (Group 6) could be in the form of a one-piece first core section and a separate one-piece second core section, where at least one of the one-piece first and second core sections includes an associated winding.

Securing the second housing section to the first housing section may be characterized as detachably connecting the first and second housings together at a plurality of spaced locations (e.g., using one or more threaded fasteners). When the first housing section is initially suspended from the power line, the second housing section may be positioned on and supported by the power line. One or more fasteners may be directed through the second housing section (when positioned above both the power line and the first housing section) and may be threaded into the first housing section, and activation of these fasteners may be used to both secure the second housing section to the first housing section and to raise the first housing section relative to the power line. More generally, one or more fasteners may be activated in any appropriate manner to both secure the second housing section to the first housing section and to raise the first housing section relative to the power line (e.g., the second housing section may remain at a substantially constant elevation relative to the power line as the first housing section is being raised relative to the power line).

The first housing section may include at least two installation hooks. Each installation hook may be spaced along the first housing section and may engage a different portion of the power line. When the first housing section is initially suspended from the power line (e.g., prior to securing the second housing section to the first housing section), contact between the first housing section and the power line may be limited to each installation hook incorporated by the first housing section. Securing the second housing section to the first housing section again raises the first housing section relative to the power line. Raising the first housing section relative to the power line while the second housing section is being secured to the first housing section may be characterized as disconnecting the first and second installation hooks from the power line. Another characterization is that raising the first housing section relative to the power line while the second housing section is being secured to the first housing section may be characterized as lifting the first and second installation hooks off of the power line.

The second housing section may include an installation hook pocket for each installation hook that is used by the first housing section. The raising of the first housing section relative to the power line as the first and second housing sections are secured together may direct each installation hook of the first housing section into a corresponding installation hook pocket of the second housing section. More generally, the second housing section may be configured to accommodate each installation hook from the first housing section as the first housing section is raised relative to the power line when securing the first and second housing sections together.

The securing of the second housing section to the first housing section may not only raise the first housing section relative to the power line, but it may clamp the power line between the first and second housing sections. This clamping action may be undertaken/generated at first and second locations, including at locations that are spaced along the length of the power line. Contact between the power line and first and second housing sections (when secured together) may be limited to these first and second locations. In one embodiment, the housing is electrically connected to the power line through the clamping action and at the first location, and the housing is electrically isolated from the power line at the second location. The clamping of the power line between the first and second housing sections may include disposing the power line and a housing for the reactance module (that includes the noted first and second housing sections) at an equal electrical potential while making the housing a non-electrically conductive path.

Group 7 of the present invention pertains to assembling a reactance module that may be mounted on a power line. In this regard, a first core section is disposed within a first housing section. This first core section includes what may be characterized as first and second interfaces or first and second face sections. The first core section is magnetically engaged to dispose the first and second interfaces in at least substantially coplanar relation and to maintain the first core section in spaced relation to the first housing section. A first potting material is injected between the first core section and the first housing section while magnetically maintaining the first core section in position relative to the first housing section. Similarly, a second core section is disposed within a second housing section. This second core section includes what may be characterized as third and fourth interfaces or third and fourth face sections. The second core section is magnetically engaged to dispose the third and fourth interfaces in at least substantially coplanar relation and to maintain the second core section in spaced relation to the second housing section. A second potting material is injected between the second core section and the second housing section while magnetically maintaining the second core section in position relative to the second housing section. The first and second core sections collectively define an elongated power line cavity when the first and second housing sections are detachably connected.

A number of feature refinements and additional features are applicable each aspect of the present invention within Group 7, unless otherwise noted to the contrary. These feature refinements and additional features may be used individually or in any combination. The following discussion is applicable to the present invention within Group 7, up to the start of the discussion on Group 8 of the present invention.

At least one of the first and second core sections may incorporate a winding prior to being disposed within its corresponding housing section. A winding for a given core section may be fixed or attached to its core section in any appropriate manner (e.g., using an epoxy). In one embodiment, a winding for a given core section is fixed or attached to its core section at each of a plurality of discrete locations that are spaced along the length dimension of the core section.

One option for providing a winding for at least one of the first and second core sections is to first form the winding and to thereafter install the same on the relevant core section before this core section is disposed its corresponding housing section. A first winding may be installed on the first core section before being disposed within the first housing section, where this first winding extends between opposing ends of first core section. A second winding may be installed on the second core section before being disposed within the second housing section, where this second winding extends between opposing ends of second core section. In each case, the winding may be a pre-formed structure, and thereafter may be positioned on the corresponding core section in the noted manner.

Another option for providing a winding for at least one of the first and second core sections is to define the winding "in place" relative to its corresponding core section. Wire may be wrapped around the first core section between opposing ends of the first core section to define a first winding. Similarly, wire may be wrapped around the second core section between opposing ends of the second core section to define a second winding. In each case, the core section and any associated winding thereafter may be collectively disposed in the corresponding housing section.

The first core section may be assembled prior to the first core section being disposed in the first housing section. In one embodiment, a plurality of first core segments are aligned in end-to-end relation to collectively define the first core section. A first winding may be associated with such a first core section in the manner described herein, and this first winding may be fixed or attached to each of the individual first core segments prior to positioning the first core section within the first housing section. The attachment of the first winding to the first core section in this manner may maintain a small space between each adjacent pair of first core segments.

The second core section may be assembled prior to the second core section being disposed in the second housing section. In one embodiment, a plurality of second core segments are aligned in end-to-end relation to collectively define the second core section. A second winding may be associated with such a second core section in the manner described herein, and this second winding may be fixed or attached to each of the individual second core segments prior to positioning the second core section within the second housing section. The attachment of the second winding to the second core section in this manner may maintain a small space between each adjacent pair of second core segments.

The first core segments for the first core section may each include first and second faces that collectively define the first and second interfaces or first and second face sections for the first core section. Similarly, the second core segments for the second core section may each include third and fourth faces that collectively define the third and fourth interfaces or third and fourth face sections for the second core section. Each of these first, second, third, and fourth faces may be at least substantially planar or flat (e.g., the first and second core sections with regard to present invention of Group 7 may be in accordance with the discussion presented above with regard to the present invention of Group 5). A separate spacer may be mounted on each of the faces of each of the core segments for the first and second core sections in the manner discussed above in relation to the present invention for Group 5.

The magnetic interaction with the first core section may include disposing the first and second faces of each of its first core segments in at least substantially coplanar relation (e.g., such that all of the first and second faces for each of the first core segments are disposed at least generally within a common reference plane). This may be done using at least one magnet, for instance where at least one magnet exerts a pulling force on one or more of the first core segments to dispose the first and second faces of all of the first core segments for the first core section at least substantially in a common plane. In one embodiment, the first and second faces of each of the first core segments for the first core section (or a corresponding and previously installed spacer) are disposed against a corresponding planar surface of at least one magnet.

The magnetic interaction with the second core section may include disposing the third and fourth faces of each of its second core segments in at least substantially coplanar relation (e.g., such that all of the third and fourth faces for each of the second core segments are disposed at least generally within a common reference plane). This may be done using at least one magnet, for instance where at least one magnet exerts a pulling force on one or more of the second core segments to dispose the third and fourth faces of all of the second core segments for the second core section at least substantially in a common plane. In one embodiment, the third and fourth faces of each of the second core segments for the second core section (or a corresponding and previously installed spacer) are disposed against a corresponding planar surface of at least one magnet.

The injection of the first potting material between the first core section and the first housing section may include encasing all but the first and second interfaces (or the first and second face sections) of the first core section within the first potting material. Similarly, the injection of the second potting material between the second core section and the second housing section may include encasing all but the third and fourth interfaces (or the third and fourth face sections) of the second core section within the second potting material. In one embodiment, the first and second potting materials are of a common type, for instance a silicone elastomer encapsulant.

The injected first potting material and the injected second potting material may be cured in any appropriate manner. The magnetic interactions with the first and second core sections may be maintained throughout the injection of the first and second potting materials, respectively. Moreover, the magnetic interactions with the first and second core sections may continue to be maintained until the first and second potting materials, respectively, have sufficiently cured. Any spacers used by the first and second core sections will typically be installed after the injection of the corresponding potting material (including after appropriate curing of the potting material).

A bypass switch and controller may be disposed in the first housing section, and may be isolated from the first core section by an appropriate barrier. The bypass switch may be electrically connected with a first winding for the first core section, and the controller may be operatively interconnected with the bypass switch. The bypass switch and controller may be in position within the first housing section during the injection of the first potting material into the first housing section, although the barrier should isolate the bypass switch and controller from the first potting material.

Group 8 of the present invention pertains to antennas for a reactance module that may be mounted on a power line. There are multiple aspects of the present invention within Group 8, and that will now be addressed.

A first aspect of the present invention (Group 8) is embodied by a reactance module that may be mounted on a power line. The reactance module includes a housing. A first device is located within this housing and may be disposed in each of first and second modes. Switching the first device from the first mode into its second mode increases an injected reactance being input to a power line when the reactance module is mounted on the power line. A bypass switch and a controller are each positioned within the housing, with the first bypass switch being operatively interconnected with the first device and with the controller being operatively interconnected with the bypass switch. The reactance module further includes a first antenna. No portion of this first antenna protrudes beyond an outer perimeter of the housing.

A second aspect of the present invention (Group 8) is embodied by a reactance module that may be mounted on a power line. The reactance module includes a housing. A first device is located within this housing and may be disposed in each of first and second modes. Switching the first device from the first mode into its second mode increases an injected reactance being input to a power line when the reactance module is mounted on the power line. A bypass switch and a controller are each positioned within the housing, with the first bypass switch being operatively interconnected with the first device and with the controller being operatively interconnected with the bypass switch. The reactance module further includes a first slot antenna, with the housing incorporating at least part of the first slot antenna.

A third aspect of the present invention (Group 8) is embodied by a reactance module that may be mounted on a power line. The reactance module includes a housing. A first device is located within this housing and may be disposed in each of first and second modes. Switching the first device from the first mode into its second mode increases an injected reactance being input to a power line when the reactance module is mounted on the power line. A bypass switch and a controller are each positioned within the housing, with the first bypass switch being operatively interconnected with the first device and with the controller being operatively interconnected with the bypass switch. The reactance module further includes at least two antennas (e.g., first and second antennas).

A number of feature refinements and additional features are applicable each aspect of the present invention within Group 8, unless otherwise noted to the contrary. These feature refinements and additional features may be used individually or in any combination. The following discussion is applicable to the present invention within Group 8, up to the start of the discussion on Group 9 of the present invention.

The reactance module may incorporate one or more antennas of any appropriate configuration (e.g., a transceiver), unless otherwise specified by a particular aspect. One antenna (e.g., a first antenna) may be positioned at least generally at a first end of the housing for the reactance module. Another antenna (e.g., a second antenna) may be positioned at least generally at a second end of the housing for the reactance module (including where the first and second ends of the housing are opposite of one another). Energy that is radiated by one antenna may have a primary component that is at least generally in a first direction, while energy that is radiated by another antenna may have a primary component that is at least generally in a second direction that is different from the first direction (including where the first and second directions are directly opposite of one another).

There are a number of characterizations that are applicable to one or more antennas that may be used by the reactance module. At least one antenna for the reactance module may be configured such that no portion thereof protrudes beyond an outer perimeter of the housing. The housing for the reactance module may include one or more slots, where each slot may be part of and/or used by a particular antenna for the reactance module. One or more antennas used by the reactance module may be in the form of a slot antenna, such as a cavity-backed slot antenna.

The housing may include a primary housing section. A core assembly may be disposed within this primary housing section. At least one end cap that is separate from and that is detachably connectable with the primary housing section may be used by the reactance module, where each such an end cap may define a corresponding end of the housing. An antenna may be associated with one or more end caps used by the reactance module. For instance, a first antenna may include a first slot that extends completely through an end wall of a first end cap. Such a first antenna may also include a first cavity that is disposed within the first end cap, along with a first exciter that is disposed within this first cavity. Similarly, a second antenna may include a second slot that extends completely through an end wall of a second end cap. Such a second antenna may also include a second cavity that is disposed within the second end cap, along with a second exciter that is disposed within this second cavity.

Group 9 of the present invention pertains to shielding for a reactance module that may be mounted on a power line. There are multiple aspects of the present invention within Group 9, and that will now be addressed.

A first aspect of the present invention (Group 9) is embodied by a reactance module that may be mounted on a power line. The reactance module includes a housing that defines a first space that is at least substantially enclosed. A partition separates this first space into first and second compartments. The second housing compartment contains a first device that may be disposed in each of first and second modes. Switching the first device from its first mode into its second mode increases an injected reactance being input to a power line when the reactance module is mounted on the power line. A bypass switch and a controller are each located within the first housing compartment, with the first bypass switch being operatively interconnected with the first device and with the controller being operatively interconnected with the bypass switch.

A second aspect of the present invention (Group 9) is embodied by a reactance module that may be mounted on a power line. The reactance module includes a housing having a first housing section (e.g., a lower housing section when the reactance module is mounted on a power line) and a second housing section (e.g., an upper housing section when the reactance module is mounted on a power line). These first and second housing sections may be detachably interconnected (e.g., to accommodate installation of the reactance module on a power line where the power line extends through the reactance module, as well as removal of the reactance module from the power line, all without "breaking" the power line). In any case, the first housing section includes a partition. A first housing compartment is defined by at least the partition and the first housing section, while a second housing compartment is defined by at least the partition and the second housing section. The first and second housing compartments are at least substantially isolated from one another. First and second core assemblies are disposed within the second housing compartment, with at least one of these first and second core assemblies including a winding. A bypass switch is disposed within the first housing compartment and is operatively interconnected with the winding. Changing the bypass switch from a first switch position to a second switch position increases an injected reactance being input to a power line when the reactance module is mounted on the power line. A controller is also disposed within the first housing compartment and is operatively interconnected with the bypass switch.

A number of feature refinements and additional features are applicable each aspect of the present invention within Group 9, unless otherwise noted to the contrary. These feature refinements and additional features may be used individually or in any combination. The following discussion is applicable to the present invention within Group 9.

The second housing compartment may be disposed at a higher elevation than the first housing compartment when the reactance module is mounted on a power line. For instance, the second housing compartment may be positioned above, or in at least partially overlying relation to, the first housing compartment when the reactance module is installed on a power line. The first housing compartment may be characterized as providing an at least substantially enclosed space for at least the bypass switch and controller (e.g., all "electronics" may be disposed within the first housing compartment). In one embodiment, the first compartment is at least substantially waterproof.

The second housing compartment may be characterized as providing an at least substantially enclosed space for a first device. One embodiment has this first device including a core and at least one winding. For instance, the first device may be in the form of separate first and second core assemblies, with at least one of these core assemblies including a winding. A "core assembly" may include at least a core section, but may also include a winding for the core section. As addressed herein, a given core section may be of a one-piece construction, or a given core section may be defined by a plurality of individual core segments as addressed above for the present invention within Group 5.

The partition may provide a physical barrier to physically isolate the first housing compartment (containing the bypass switch and controller) from the second housing compartment (containing the first and second core assemblies). Electromagnetic interference shielding may be provided by the partition. The partition may shield all components within the first housing compartment from power line emissions when the reactance module is mounted on this power line (e.g., the power line may extend through the second housing compartment when the reactance module is installed on a power line).

The reactance module housing may utilize a first housing section (e.g., a lower housing section when the reactance module is mounted on a power line) and a second housing section (e.g., an upper housing section when the reactance module is mounted on a power line). These first and second housing sections may be detachably interconnected (e.g., to accommodate installation of the reactance module on a power line where the power line extends through the reactance module, as well as removal of the reactance module from the power line, all without "breaking" the power line). In any case, the first housing section may include a partition. The first housing compartment may be defined by at least the partition and the first housing section, while a second housing compartment may be defined by at least the partition and the second housing section. Part of the second housing compartment may be defined by that portion of the first housing section that is on the side of the partition opposite of that which contains the bypass switch and controller. In this case, a first core assembly may be disposed within that portion of the second housing compartment defined by the partition and the first housing section, and a second core assembly may be disposed within the portion of the second housing compartment defined by the second housing section.

The reactance module may include at least one antenna. At least one reactance module antenna is located entirely outside of the first and second housing compartments. Each antenna that is utilized by the reactance module may be located entirely outside of the first and second housing compartments. Antenna electronics, however, may be disposed within the first housing compartment and may be operatively interconnected with one or more antennas. The antenna features discussed above with regard to the present invention of Group 8 may be used by the present invention of Group 9.

A number of feature refinements and additional features are separately applicable to each aspect of the present invention addressed herein for Groups 1-9. These feature refinements and additional features may be used individually or in any combination in relation to each of these individual aspects. Initially, each feature discussed in relation to one or more aspects for a given invention group of the present invention may be used with each aspect of the present invention within each invention group, unless otherwise noted to the contrary.

The reactance module may be configured so as to be mountable on a power transmission line without requiring a break in the power transmission line. In one embodiment, the reactance module includes first and second housing sections. These first and second housing sections may be detachably interconnected in any appropriate manner, for instance using one or more fasteners (e.g., threaded fasteners). As such, the first and second housing sections may be disconnected from one another, and thereafter may be reconnected together. The first and second housing sections may also be characterized as being movable between an open position, where the first and second housing sections may be installed on a power line, and a closed position where the first and second housing sections may be characterized as capturing a portion of the power line therebetween (e.g., the power line may be characterized as extending between the first and second housing sections when in the closed position, when detachably connected, or both).

A transformer may be defined when a reactance module is mounted on a power line (e.g., a single turn transformer). The primary of this transformer may be the power line itself. The secondary for this transformer may be one or more windings of a core for the reactance module (e.g., a first winding wrapped around a first core section of the reactance module, a second winding wrapped around a second core section of the reactance module, or both for the case when the first winding and second winding are electrically connected).

A given reactance module may be configured to selectively inject reactance into the corresponding power transmission line (the power transmission line on which the reactance module is mounted). Such a reactance module could be configured to selectively inject inductance into the corresponding power transmission line (e.g., to reduce the current or power flow through the power transmission line, or a current-decreasing modal configuration for the reactance module). Such a reactance module could be configured to inject capacitance into the corresponding power transmission line (e.g., to increase the current or power flow through the power transmission line, or a current-increasing modal configuration for the reactance module).

A reactance module may include any appropriate switch architecture for switching between two different modes of operation. A reactance module may include one or more processors disposed in any appropriate processing architecture to control operation of any such switch architecture. In a first mode, a reactance module may be configured to inject little or no reactance into the corresponding power transmission line (e.g., a bypass or monitoring mode). In a second mode, a reactance module may be configured to inject substantially more reactance into the corresponding power transmission line compared to the first mode (e.g., an injection mode).

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a reactance module includes "an antenna" alone does not mean that the reactance module includes only a single antenna). Moreover, any failure to use phrases such as "at least one" also does not limit the corresponding feature to the singular (e.g., indicating that a reactance module includes "an antenna" alone does not mean that the reactance module includes only a single antenna). Use of the phrase "at least generally" or the like in relation to a particular feature encompasses the corresponding characteristic and insubstantial variations thereof (e.g., indicating that faces of multiple core segments are at least generally coplanar encompasses these faces actually being coplanar). Finally, a reference of a feature in conjunction with the phrase "in one embodiment" does not limit the use of the feature to a single embodiment.

BRIEF DESCRIPTION OF THE FIGURES

FIG. 1 is a schematic of one embodiment of a power transmission system having line-mounted reactance modules.

FIG. 4A is a perspective view of a lower core assembly positioned within a lower housing section from the reactance module of FIGS. 2A/2B.

FIG. 4C is a cross-sectional view showing the lower core assembly seated within the lower housing section, and taken perpendicularly to the length dimension of the reactance module of FIGS. 2A/2B.

FIG. 4F is an enlarged, perspective view of an insert for an antenna disposed at one of the ends of the reactance module of FIGS. 2A/2B.

FIG. 4G is an enlarged, perspective view of an internal cavity for an antenna disposed at one of the ends of the reactance module of FIGS. 2A/2B, illustrating an exciter or probe of the antenna.

FIG. 5A is an exploded, perspective view of an upper core assembly and upper housing section from the reactance module of FIGS. 2A/2B.

FIG. 5B is a bottom view of the upper core assembly seated within the upper housing section from the reactance module of FIGS. 2A/2B.

FIG. 5C is a cross-sectional view showing the upper core assembly seated within the upper housing section, and taken perpendicularly to the length dimension of the reactance module of FIGS. 2A/2B.

FIG. 6C is a perspective view of the lower core section for the lower core assembly from the reactance module of FIGS. 2A/2B, illustrating the faces of the lower core segments that collectively define the lower core section (before installing the noted spacers).

FIG. 7A is a perspective view of the upper core assembly from the reactance module of FIGS. 2A/2B.

FIG. 8A is one perspective view of the lower core assembly and electronics from the reactance module of FIGS. 2A/2B.

FIG. 8B is another perspective view of the lower core assembly and electronics from the reactance module of FIGS. 2A/2B.

FIG. 13A is a schematic of an embodiment of a power transmission system with distributed control for multiple arrays of reactance modules of the type presented in FIGS. 2A/2B.

FIG. 13D is a diagram of a system condition/contingency data structure that may be incorporated by DSR array controllers from the power transmission system of FIG. 13A.

DETAILED DESCRIPTION

Figure 2A:
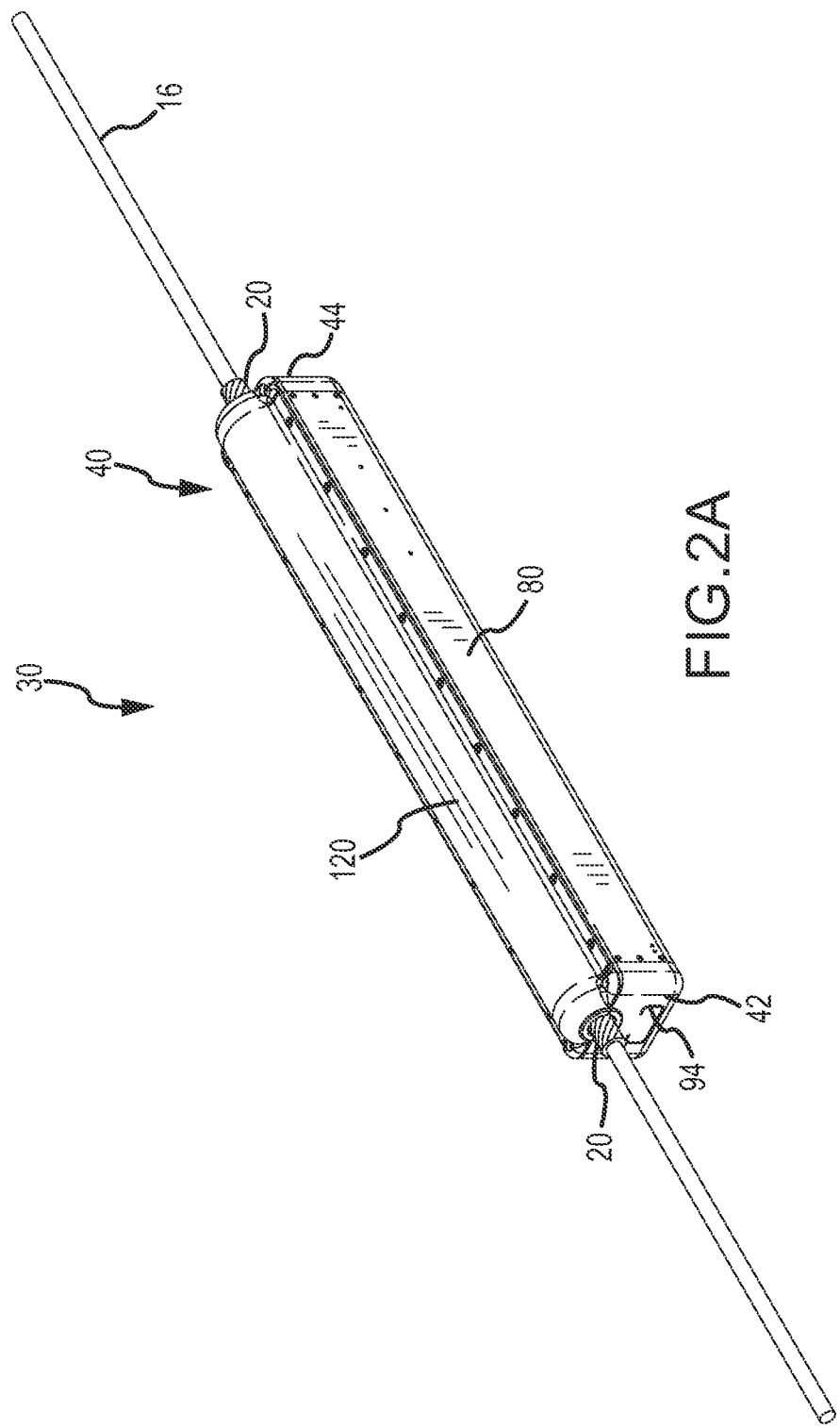
FIG. 2A is a perspective view of one end of an embodiment of a line-mountable reactance module.

One embodiment of a power transmission system is illustrated in FIG. 1 as identified by reference numeral 10. The power transmission system 10 includes a plurality of power lines 16 (three in the illustrated embodiment, for providing three-phase power) that extend between an electric power source 12 and a load 22. Any appropriate number of electrical power sources 12 and loads 22 may be associated with the power transmission system 10. A plurality of towers 14 of any appropriate size, shape, and/or configuration may support the various power lines 16 at appropriately spaced locations. The power lines 16 may be of any appropriate type, for instance power transmission lines (larger capacity) or distribution lines (lower capacity).

A plurality of distributed series reactors (DSRs) or "reactance modules" are installed on each of the power lines 16 of the power transmission system 10, and are identified by reference numeral 24. Any appropriate number of DSRs 24 may be installed on a given power line 16 and using any appropriate spacing. Each DSR 24 may be installed on a power line 16 at any appropriate location, including in proximity to an insulator. Generally, each DSR 24 may be configured/operated to inject reactance (e.g., inductance, capacitance) into the corresponding power line 16. That is, a given DSR 24 may be of a configuration so as to be able to inject inductance into the power line 16 on which it is mounted (e.g., the injected reactance may be an inductive reactance or inductance, which may reduce the flow of current through the power line 16 on which the DSR 24 is mounted). A given DSR 24 may also be of a configuration so as to be able to inject capacitance into the power line 16 on which it is mounted (e.g., the injected reactance may be a capacitive reactance or capacitance, which may increase the flow of current through the power line 16 on which the DSR 24 is mounted).

Figure 2B:
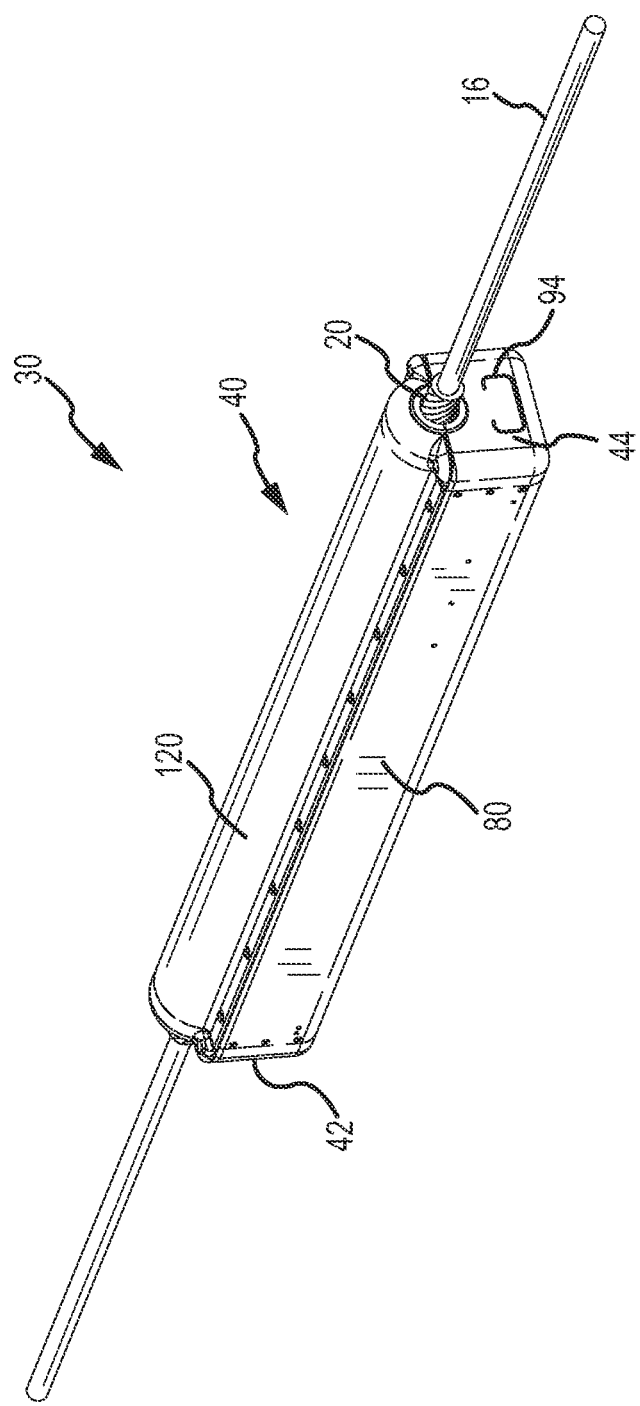
FIG. 2B is a perspective view of an opposite end of the reactance module of FIG. 2A.
Figure 3:
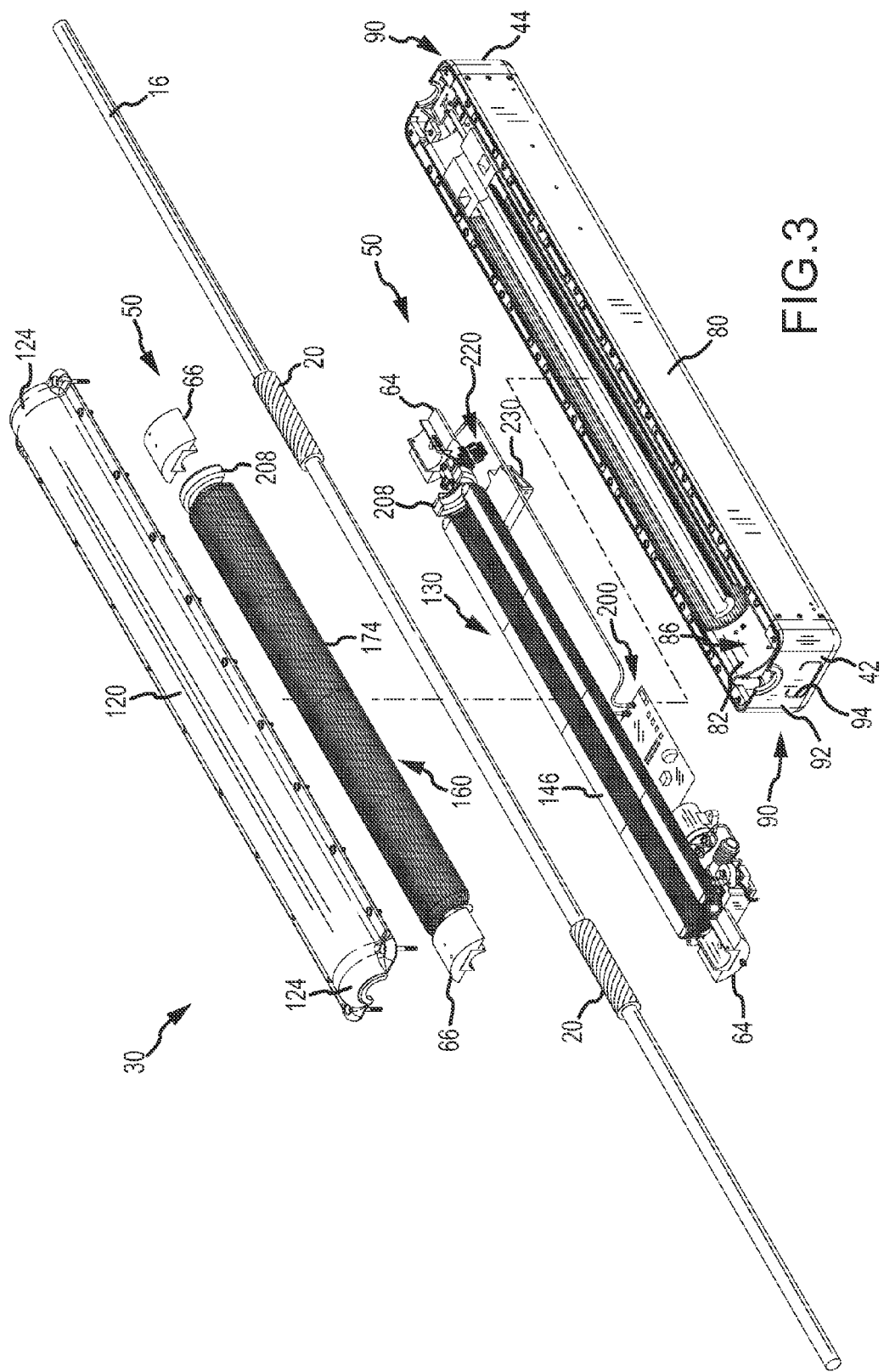
FIG. 3 is an exploded, perspective view of the reactance module of FIGS. 2A/2B.

FIGS. 2A, 2B, and 3 illustrate a representative configuration for the DSRs 24 presented in FIG. 1, and which is identified by reference numeral 30. Generally, the configuration of the DSR 30 presented herein is of the type that provides for the injection of inductance into a power line 16 on which it is mounted. However and as in the case of the DSR 24 discussed above, the DSR 30 could be configured so as to inject capacitance into the power line 16 on which it is mounted (not shown).

The DSR 30 of FIGS. 2A, 2B, and 3 is configured for installation on a power line 16 without requiring a break in the same. In this regard, a housing 40 of the DSR 30 includes a first or lower housing section 80 and a second or upper housing section 120 that are detachably connected in any appropriate fashion. A first or lower end cap 90 and a second or upper end cap 124 of the housing 40 are positioned on one end 42 (e.g., a power end) of the DSR 30, and another lower end cap 90 and upper end cap 124 are positioned at the opposite end 44 (e.g., a control end) of the housing 40. As will be discussed in more detail below, the DSR 30 uses a pair of cavity-backed slot antennas 100 (e.g., FIGS. 4E, 4F, and 4G), one being positioned at least generally at each end 42, 44 of the DSR 30. As such, a slot 94 for the antenna 100 extends through the wall thickness of the housing 40 at each of its ends 42, 44.

The housing 40 of the DSR 30 at least substantially encloses a core or core assembly 50 (e.g., in the form of a single turn transformer). A first or lower core assembly 130 (part of the core assembly 50) is disposed within the lower housing section 80 (e.g., within a compartment 86), while a second or upper core assembly 160 (part of the core assembly 50) is disposed within the upper housing section 120. The lower core assembly 130 includes a first or lower winding 144, while the upper core assembly 160 includes a second or upper winding 174. The windings 144, 174 may be electrically interconnected in any appropriate manner. The lower core assembly 130 and the upper core assembly 160 are collectively disposed about the power line 16 on which the DSR 30 is installed. When the core assembly 50 is installed on a power line 16, it collectively defines a single turn transformer, where the primary of this single turn transformer is the power line 16, and where the secondary of this single turn transformer is defined by the windings 144, 174 for the illustrated embodiment. However, the secondary of this single turn transformer could be comprised of only the lower winding 144 or only the upper winding 174. For example, the lower core assembly 130 may include the lower winding 144, and the upper core assembly 160 may not include the upper winding 174. Similarly, the lower core assembly 130 may not include the lower winding 144, and the upper core assembly 160 may include the upper winding 174. As such, the primary of the noted single turn transformer is the power line 16, and the secondary of this single turn transformer may be the lower winding 144 by itself, may be the upper winding 174 by itself, or collectively may be the lower winding 144 and the upper winding 174.

The housing 40 of the DSR 30 also at least substantially encloses electronics 200 for undertaking various operations of the DSR 30. The electronics 200 are disposed within the lower housing section 80, and are separated from the lower core assembly 130 by a partition or barrier 82. This partition 82 may provide shielding for the electronics 200, such as shielding against electromagnetic interference. Any appropriate shielding material may be utilized for the partition 82.

A pair of first or lower clamps 64 are associated with the lower core assembly 130, and may be anchored relative to the lower housing section 80 in any appropriate manner. A pair of second or upper clamps 66 are associated with the upper core assembly 160, and may be anchored relative to the upper housing section 120 in any appropriate manner. Although the clamps 64, 66 could directly engage the power line 16, in the illustrated embodiment a pair of line guards 20 are mounted on the power line 16 at locations that correspond with the position of each pair of clamps 64/66.

Figure 4B:
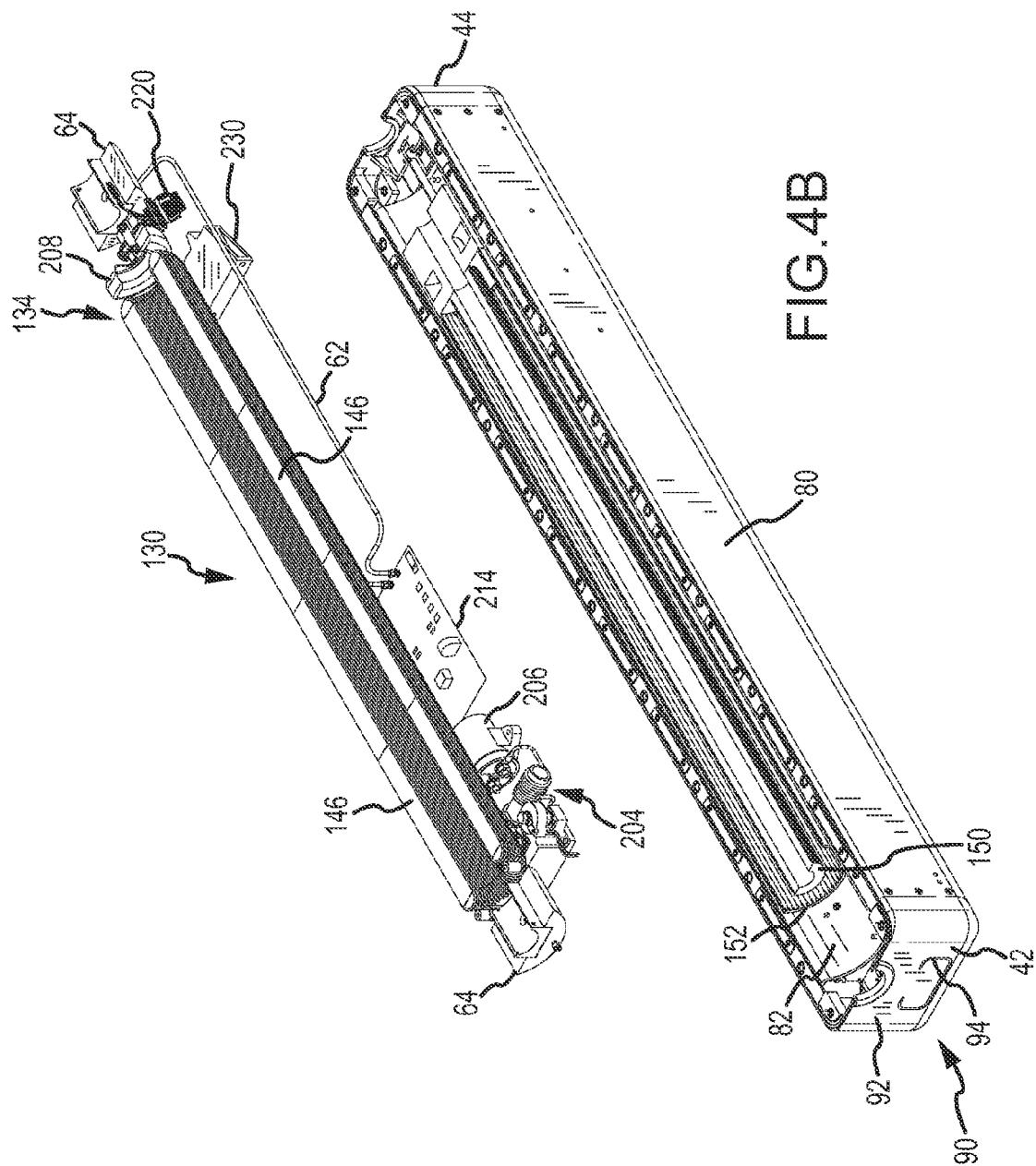
FIG. 4B is an exploded, perspective view of the lower core assembly and lower housing section from the reactance module of FIGS. 2A/2B.

Additional views of the lower housing section 80 and lower core assembly 130 are presented in FIGS. 4A-4G. FIG. 4A shows the lower core assembly 130 being positioned within the lower housing section 80, while FIG. 4B shows the lower core assembly 130 being exploded away from the lower housing section 80. A barrier or partition 82 is associated with the lower housing section 80, and defines a lower or electronics compartment 84 and an upper or core compartment 86 (e.g., FIG. 4C). In one embodiment, the electronics compartment 84 is at least substantially waterproof. Moreover and as noted, the electronics compartment 84 may be shielded from the core assembly 50, for instance by the above-noted barrier or partition 82. In any case, the electronics 200 are disposed within the electronics compartment 84, while the lower core assembly 130 is disposed within the core compartment 86.

Figure 4D:
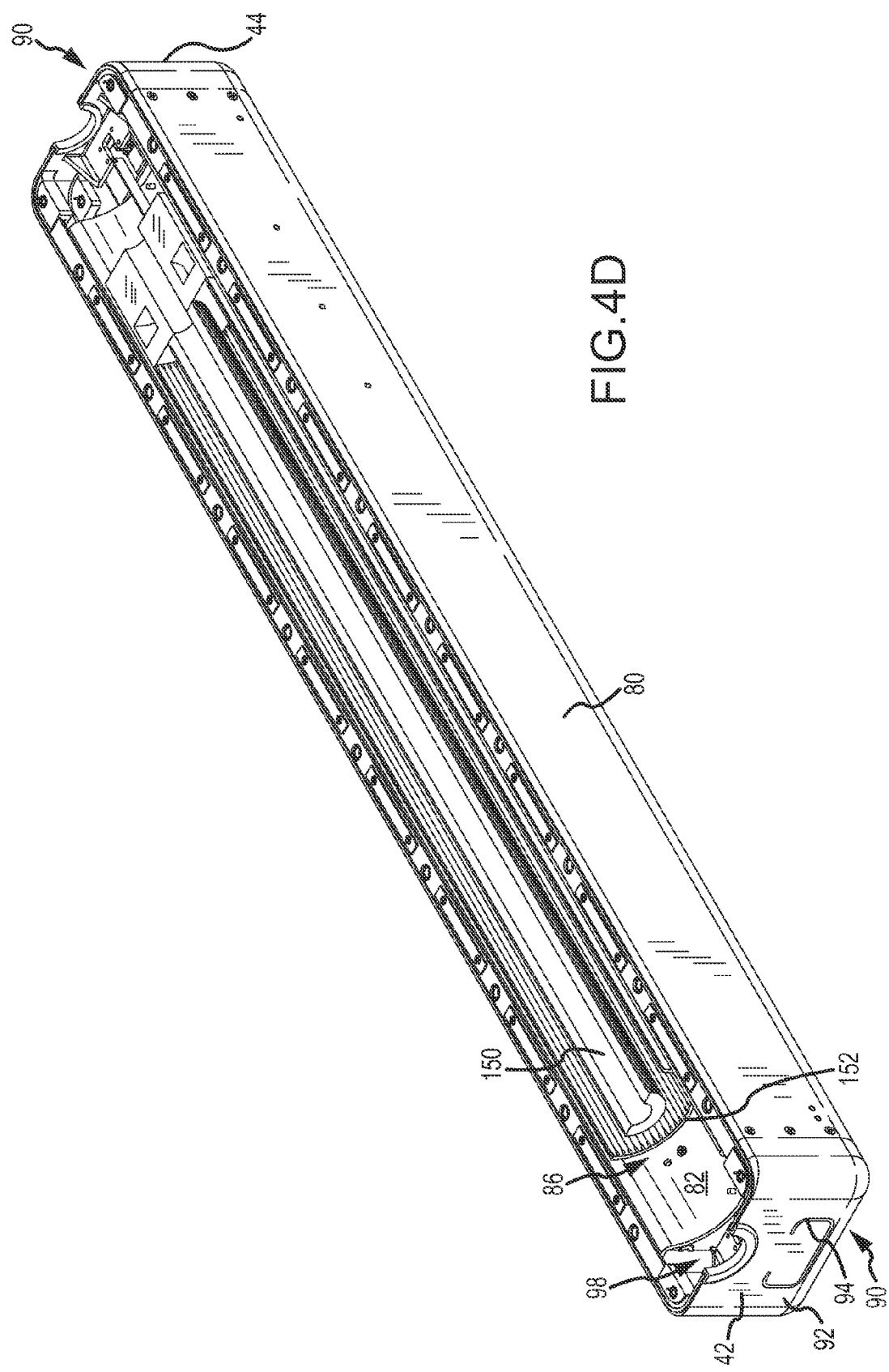
FIG. 4D is an enlarged, perspective view of the lower housing section from the reactance module of FIGS. 2A/2B, and illustrating the encapsulating sections for the lower core assembly.

The lower core assembly 130 is retained by encapsulating sections 150, 152 within the lower housing section 80 (e.g., FIGS. 4B, 4C, and 4D). In one embodiment, the encapsulating sections 150, 152 are each in the form of a silicone elastomer encapsulant such as Sylgard® available from Dow Corning (the Sylgard® for the encapsulating sections 150, 152 may be matched to the dielectric and operational performance rating of the DSR 30). The encapsulating section 152 is disposed between the lower core assembly 130 and the partition 82 of the lower housing section 80. The encapsulating section 150 is disposed between the lower core assembly 130 and the power line 16. A first or lower power line cavity 138 extends along the length of the lower core assembly 130 (within the encapsulating section 150) for receiving a lower portion of the corresponding power line 16. FIG. 4D shows the relative position of the encapsulating sections 150, 152, with the lower core assembly 130 being removed to show this relative position.

A pair of first or lower end caps 90 are disposed at each of the two ends 42, 44 of the DSR 30, and are each detachably connected in any appropriate manner to the lower housing section 80. Each lower end cap 90 includes an end wall 92. A slot 94 extends through the entire thickness of the end wall 92, may be of any appropriate shape, and is part of the associated antenna 100. The slot 94 may be characterized as having a "folded configuration" to provide for a desired length. An antenna compartment 98 is disposed within each lower end cap 90. An end plate 88 (FIG. 4F) separates this antenna compartment 98 from the electronics compartment 84. Generally, each antenna 100 utilizes an aperture that extends through the housing 40 of the DSR 30, and this aperture may be of any appropriate shape/size, and may be incorporated in any appropriate manner (e.g., such an aperture could actually project downwardly when the DSR 30 is installed on a power line 16).

Figure 4E:
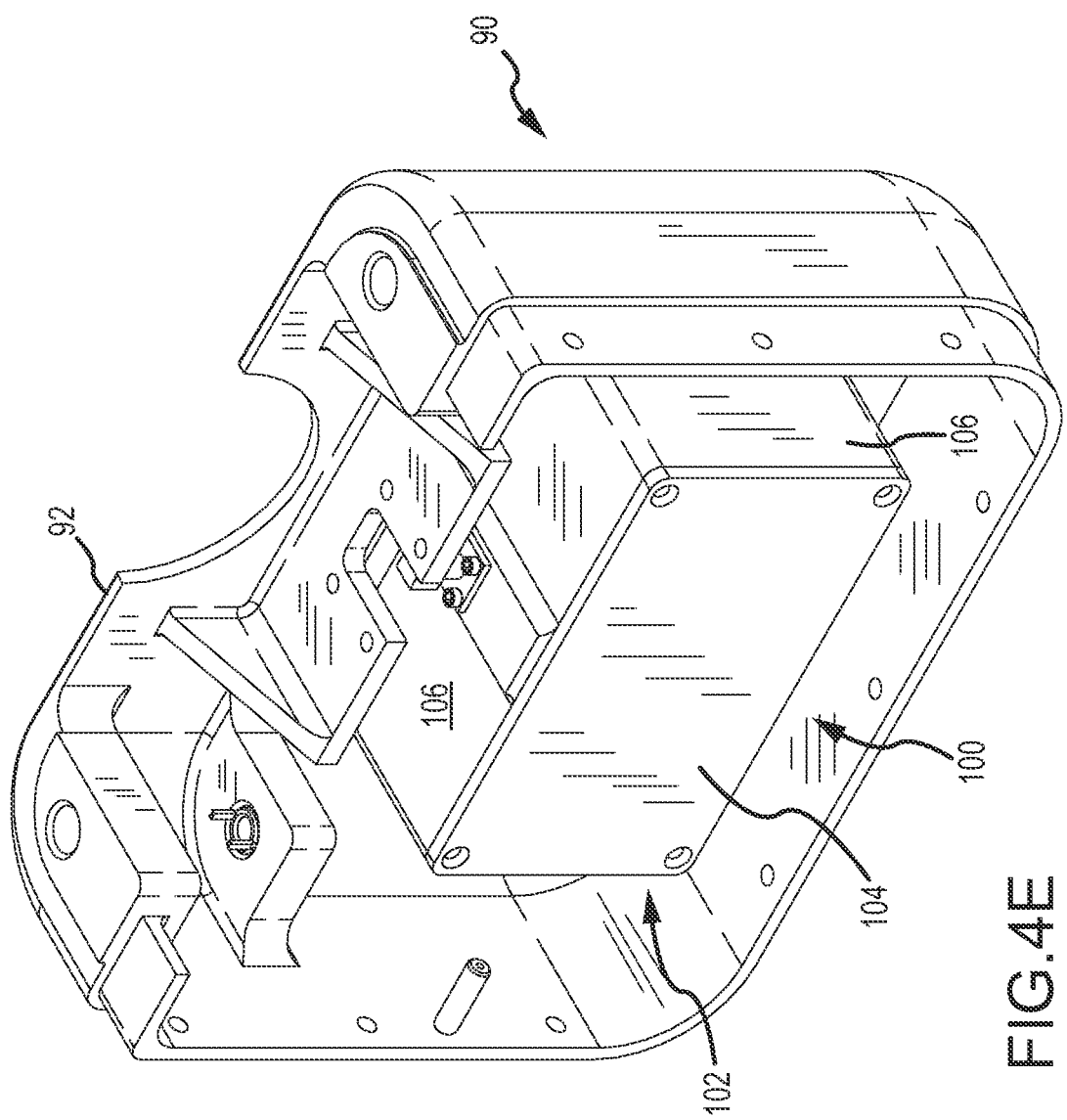
FIG. 4E is a perspective view of the interior of one of the lower end caps that is attached to the lower housing section, illustrating an antenna housing disposed therein.

Other components of the antenna 100 are illustrated in FIGS. 4E, 4F, and 4G. Again, an antenna 100 is located at least generally at the two ends 42, 44 of the DSR 30 in the illustrated embodiment, with each antenna 100 being located within its corresponding antenna compartment 98. Each antenna 100 includes an antenna housing 102 of any appropriate size/shape and which may be formed from any appropriate material or combination of materials. The antenna housing 102 includes a back section 104, along with a plurality of side sections 106 (four in the illustrated embodiment) that extend to the back side of the end wall 92 of the corresponding lower end cap 90. As such, the end wall 92 of the corresponding lower end cap 90 may be characterized as defining an end of the antenna housing 102 that is disposed opposite of the back section 104.

An insert 110 (FIG. 4F) may be disposed within the antenna housing 102. This insert 110 may be formed from any appropriate material, for instance Teflon®. An insert 110 may not be required in all instances. In any case, a projection 112 may be formed on an end of the insert 110, and extends into the slot 94 on the end wall 92 of its corresponding lower end cap 90. The antenna housing 102 defines an internal cavity 108 having an exciter or probe 114. The antenna 100 may be characterized as a slotted antenna or as a cavity-backed slot antenna. Notably, neither antenna 100 protrudes beyond an outer perimeter of the housing 40 for the DSR 30.

Figure 4H:
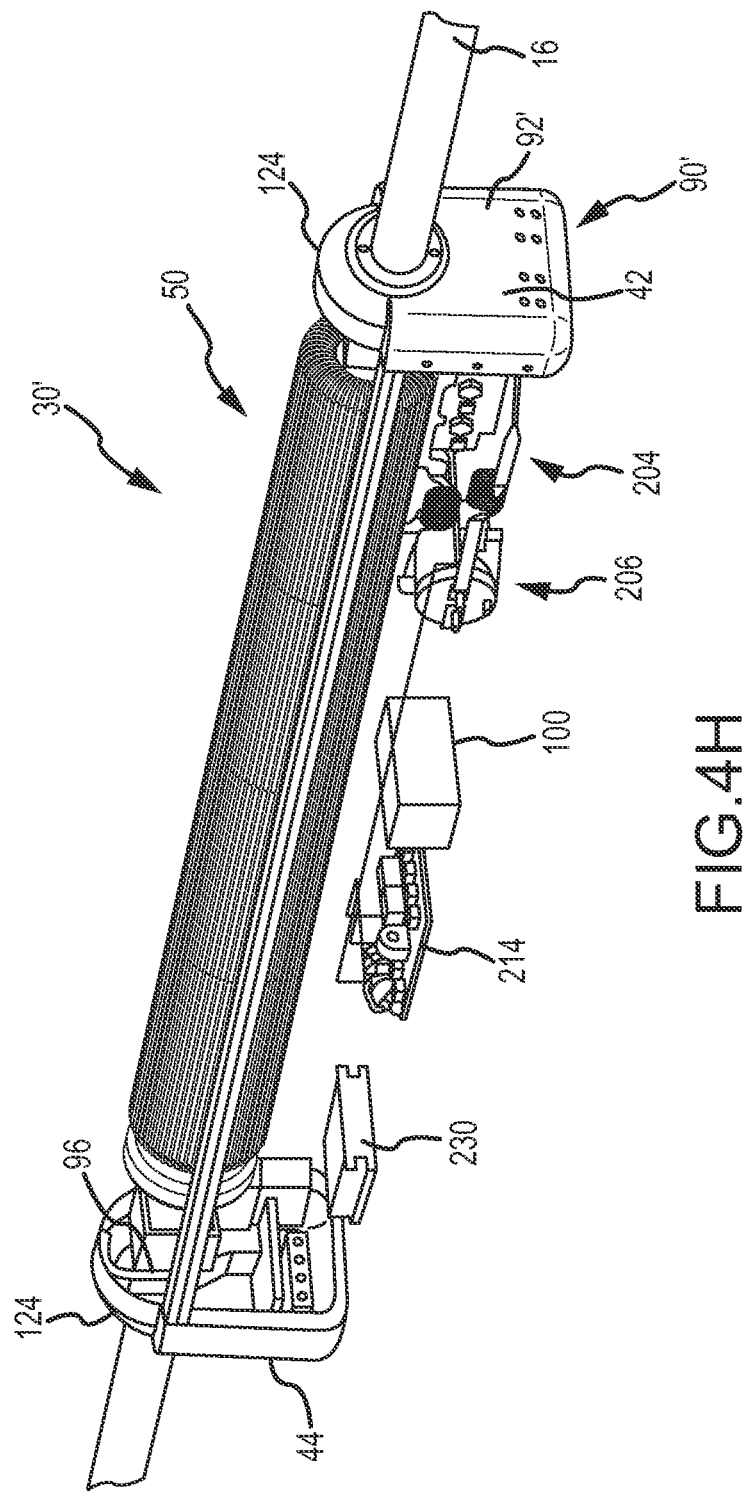
FIG. 4H is a perspective view of a variation of the lower housing section from the reactance module of FIGS. 2A/2B, and which incorporates installation hooks.

A variation of the DSR 30 is presented in FIG. 4H in the form of a DSR 30'. Corresponding components of these two embodiments are identified by the same reference numerals. Those corresponding components that differ are further identified by a "single prime" designation in FIG. 4H. Unless otherwise noted, the DSR 30' includes the same features as the DSR 30.

One difference between the DSR 30 and the DSR 30' is that there is a single antenna 100 in the case of the DSR 30' of FIG. 4H. This single antenna 100 may be disposed at an appropriate location between the ends 42, 44 of the DSR 30 (e.g., within the housing 40). In the illustrated embodiment, the antenna 100 is disposed at least generally midway between the ends 42, 44 of the DSR 30'. Relatedly, the end wall 92' of the two lower end caps 90' need not include a slot 94. Instead, a similar slot would be included on the bottom of the housing 40 to accommodate the antenna 100 for the DSR 30' (i.e., on the surface of the first housing section 80 that projects in a downward direction when the DSR 30' is installed on a power line 16).

Another difference between the DSR 30 and the DSR 30' of FIG. 4H is that the DSR 30' includes a pair of installation hooks 96. One installation hook 96 may be disposed within the lower end cap 90' at each of the ends 42, 44 of the DSR 30'. Each installation hook 96 may be anchored in any appropriate manner relative to the first housing section 80 of the DSR 30'. That is, the installation hooks 96 will move collectively with the lower housing section 80 during installation of the DSR 30' on a power line 16. It should be appreciated that the installation hooks 96 could also be integrated into the structure of the DSR 30 in any appropriate manner.

The installation hooks 96 facilitate installation of the DSR 30' on a power line 16. Generally, the first housing section 80 of the DSR 30' may be suspended from a power line 16 by disposing each of the installation hooks 96 on the power line 16 (the installation hooks 96 engaging the power line 16 at locations that are spaced along the length of the power line 16; the installation hooks 96 could be positioned directly on the power line 16, or on a corresponding line guard 20). The second housing section 120 may then be positioned over each of the power line 16 and the first housing section 80. At this time, the second housing section 120 may be supported by the power line 16 and/or the first housing section 80.

With the second housing section 120 being properly aligned with the first housing section 80, a plurality of fasteners may be used to secure the second housing section 120 to the first housing section 80. As the second housing section 120 is being connected to the first housing section 80, (e.g., as the various fasteners are rotated), the first housing section 80 may be lifted upwardly in the direction of the second housing section 120, which in turn will lift the installation hooks 96 (again, fixed relative to the first housing section 80) off of the power line 16. Ultimately, the installation hooks 96 are received within the hollow interior of the second or upper end caps 124 of the second housing section 120. Once the second housing section 120 and the first housing section 80 are appropriately secured together, both installation hooks 96 will be maintained in spaced relation to the power line 16.

Figure 5D:
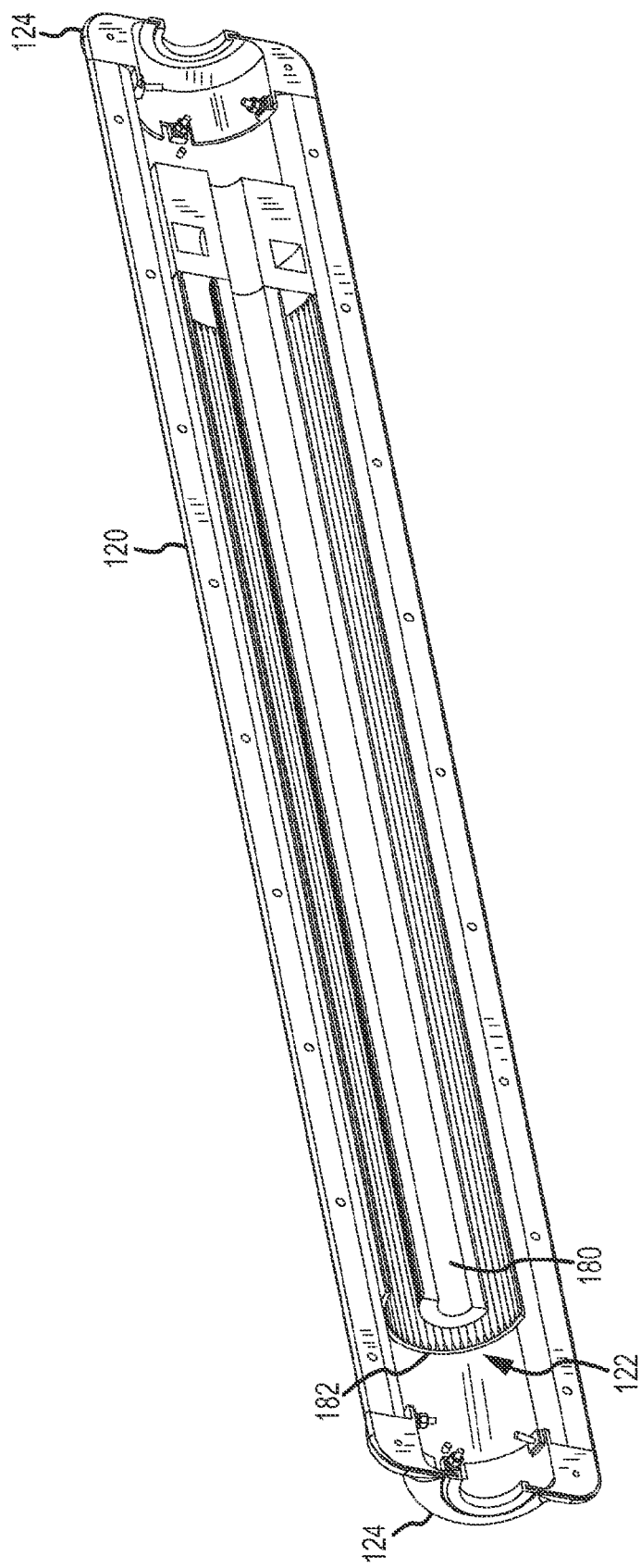
FIG. 5D is a perspective view of the interior of the upper housing section from the reactance module of FIGS. 2A/2B, and illustrating the encapsulating sections for the upper core assembly.

Additional views of the upper housing section 120 and upper core assembly 160 are presented in FIGS. 5A-5D. FIG. 5A shows the upper core assembly 160 being exploded away from the upper housing section 120 (the upper core assembly 160 being received within a core compartment 122 of the upper housing section 120), while FIG. 5B shows the upper core assembly 160 being positioned within the upper housing section 120 (more specifically within the core compartment 122). A pair of second or upper end caps 124 are detachably connected to opposite ends of the upper housing section 120 and define corresponding portions of the two ends 42, 44 of the DSR 30.

Referring now to FIG. 5C, the upper core assembly 160 is retained by encapsulating sections 180, 182 within the upper housing section 120. In one embodiment, the encapsulating sections 180, 182 are a silicone elastomer encapsulant such as the above-noted Sylgard®. The encapsulating section 182 is disposed between the upper core assembly 160 and the upper housing section 120. The encapsulating section 180 is disposed between the upper core assembly 160 and the power line 16. A second or upper power line cavity 168 extends along the length of the upper core assembly 160 (within the encapsulating section 180) for receiving an upper portion of the corresponding power line 16. FIG. 5D shows the relative position of the encapsulating sections 180, 182, with the upper core assembly 160 being removed to show this relative position.

Figure 6A:
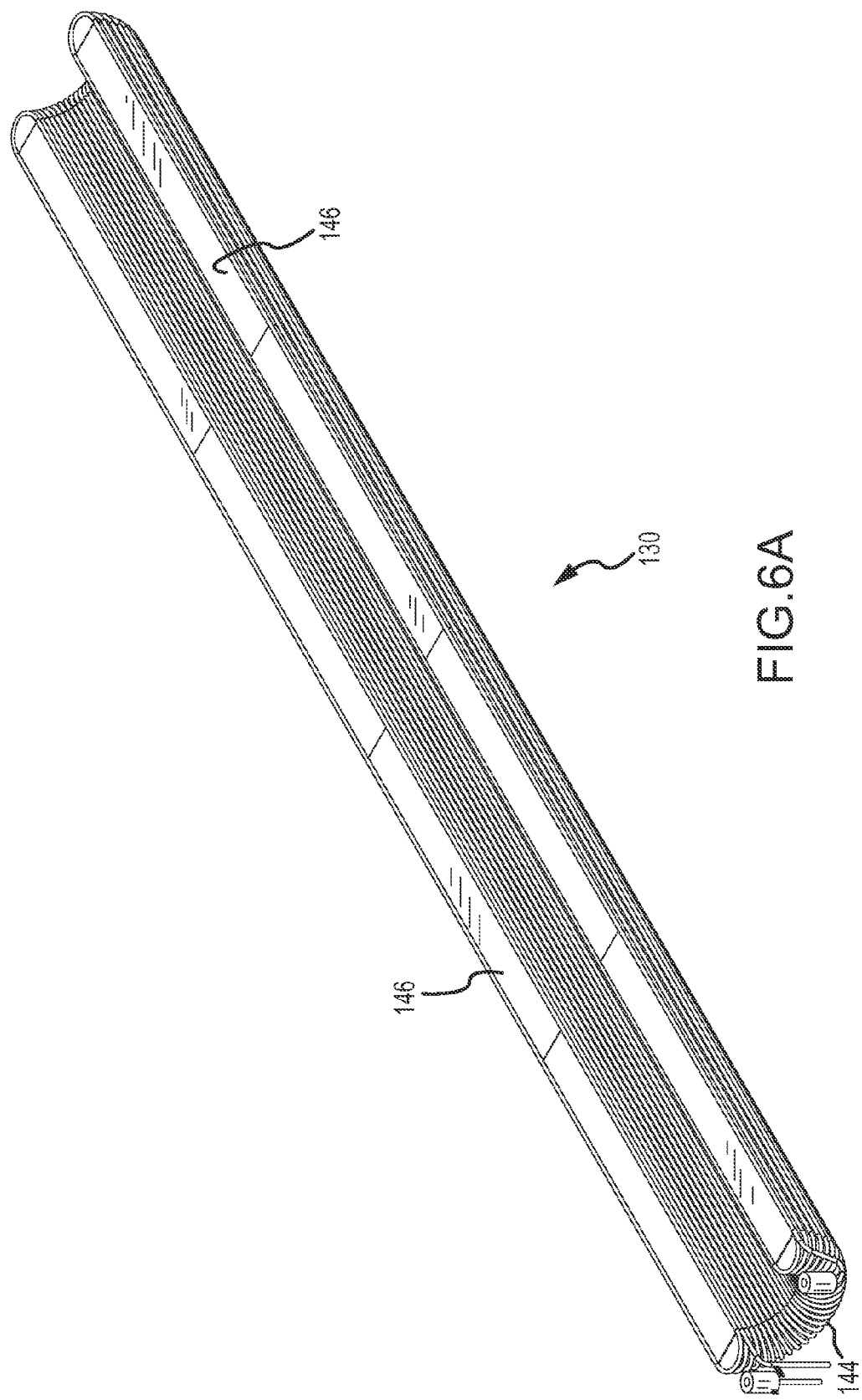
FIG. 6A is a perspective view of the lower core assembly from the reactance module of FIGS. 2A/2B.
Figure 6B:
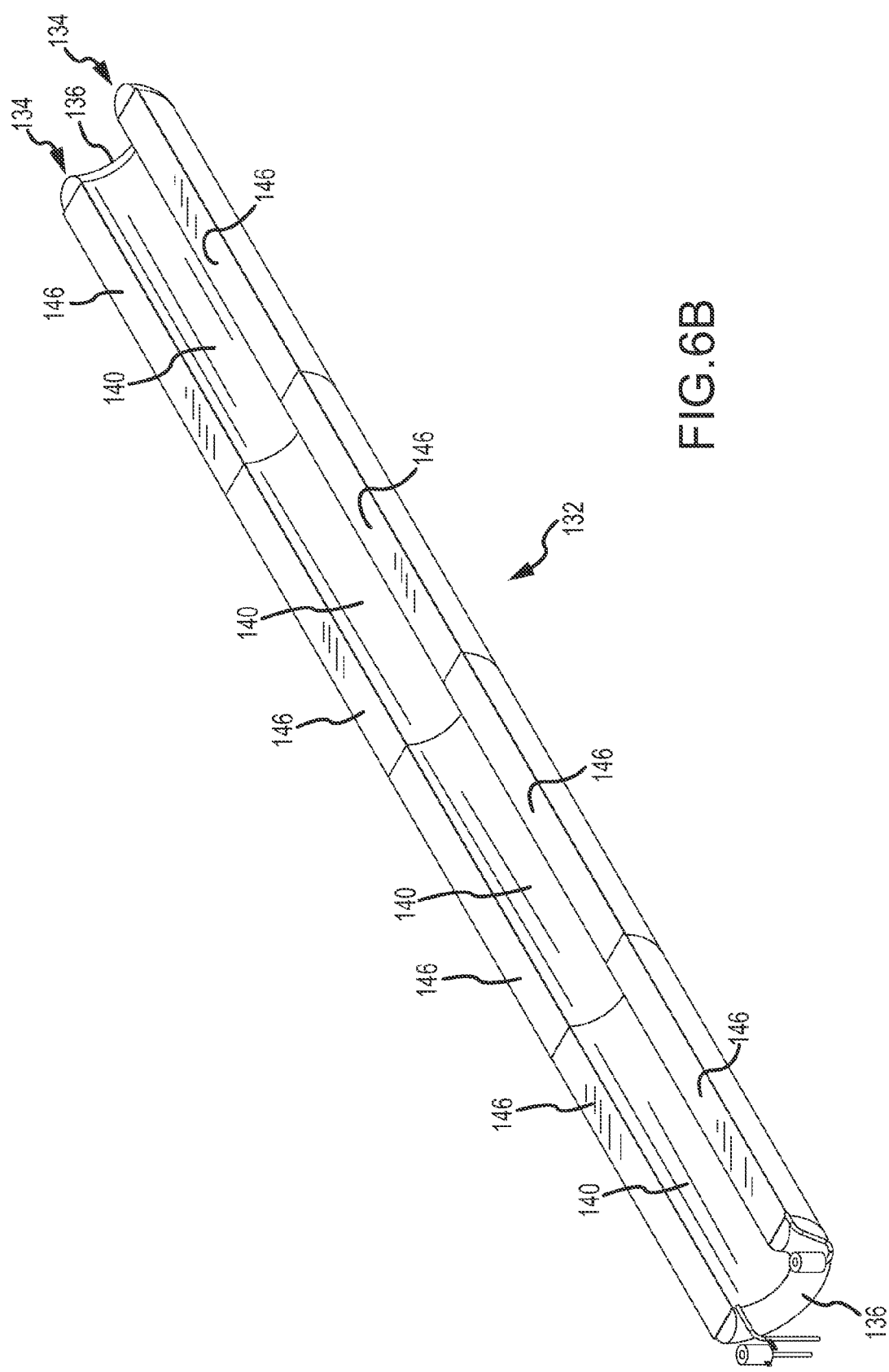
FIG. 6B is a perspective view of the lower core section for the lower core assembly from the reactance module of FIGS. 2A/2B, illustrating spacers installed on faces of the individual lower core segments that collectively define the lower core section.
Figure 7B:
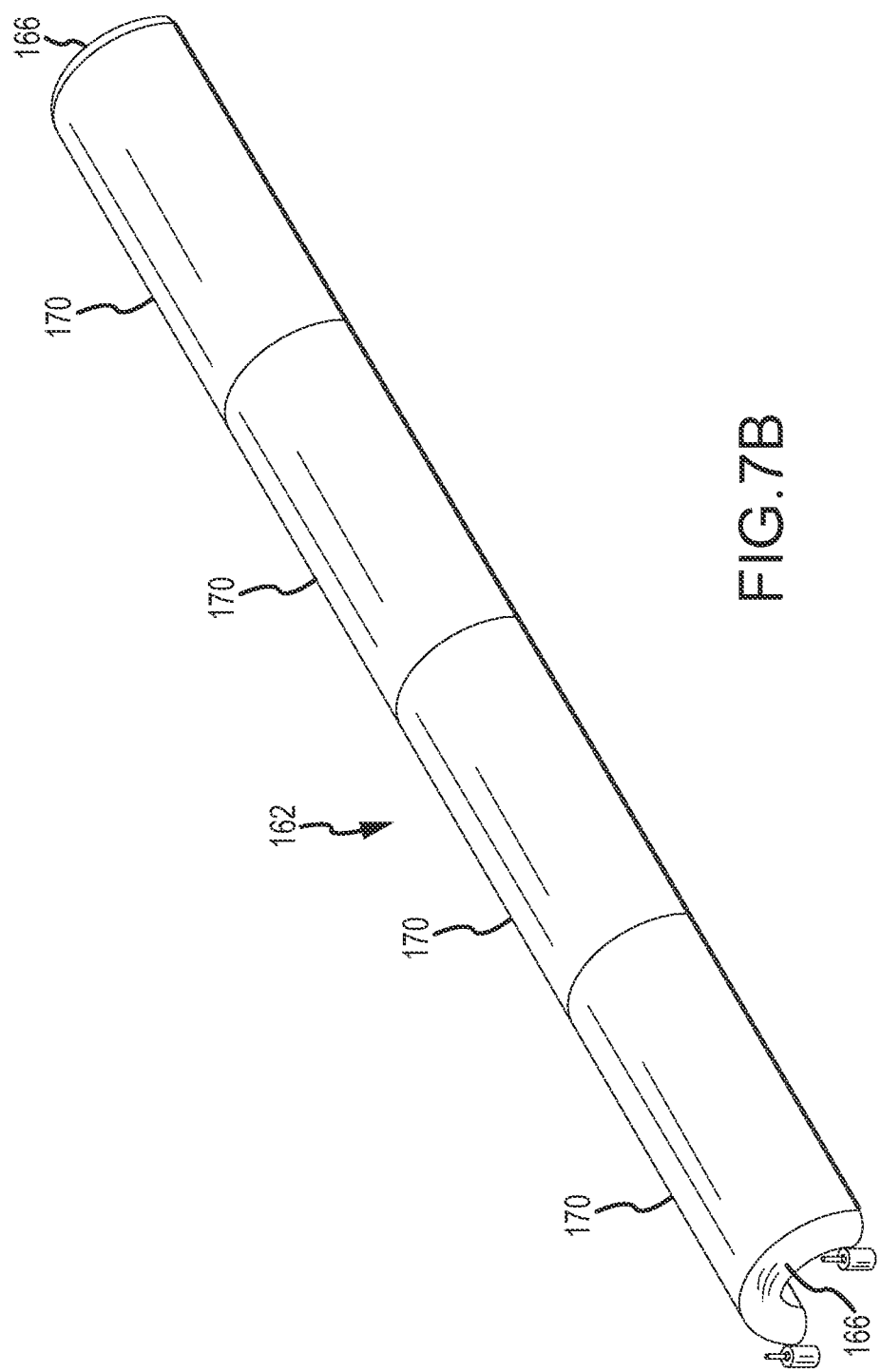
FIG. 7B is a top perspective view of the upper core section for the upper core assembly from the reactance module of FIGS. 2A/2B.
Figure 7C:
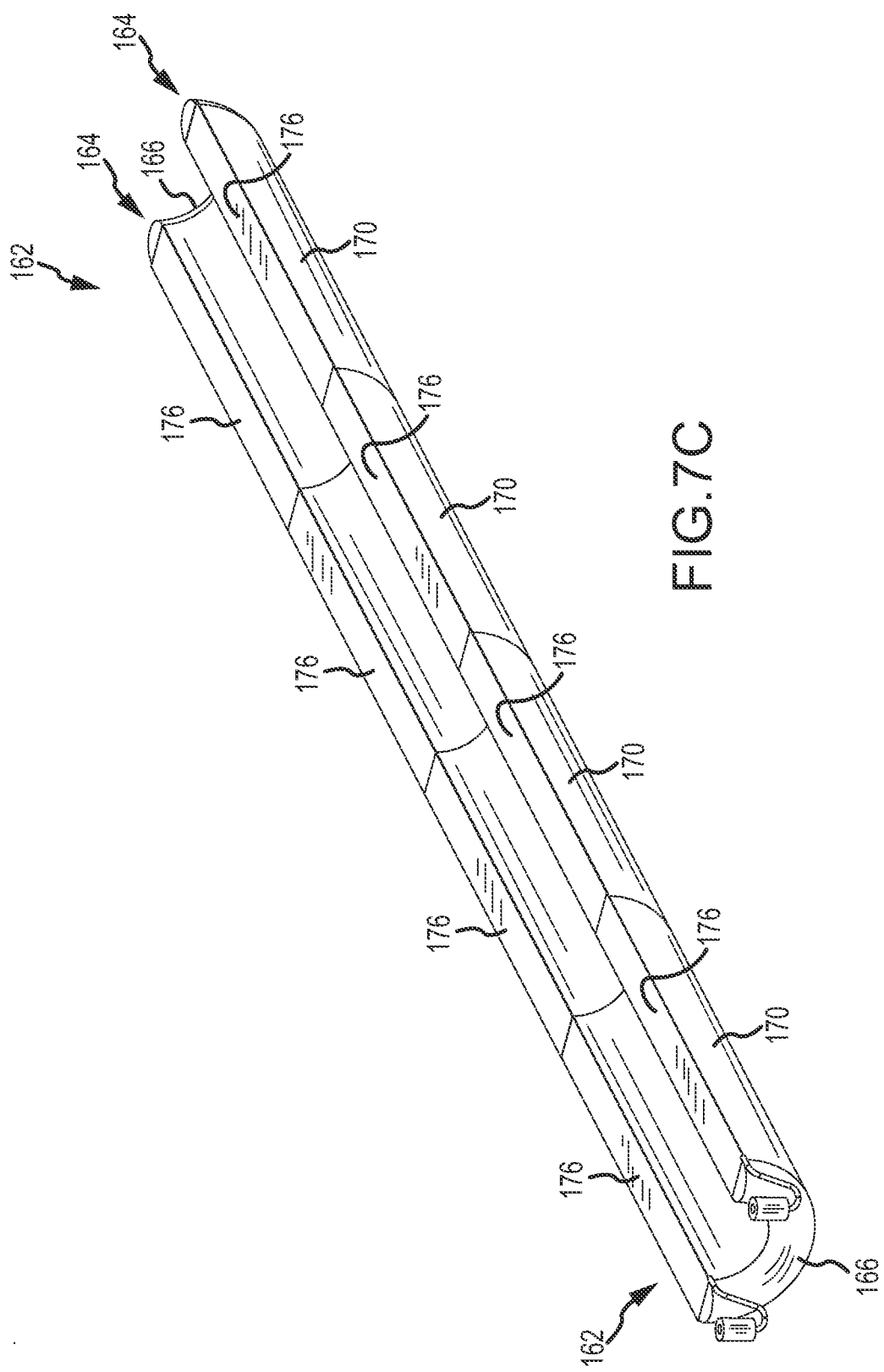
FIG. 7C is a bottom perspective view of the upper core section for the upper core assembly from the reactance module of FIGS. 2A/2B, illustrating spacers installed on faces of the individual lower core segments that collectively define the lower core section.
Figure 7D:
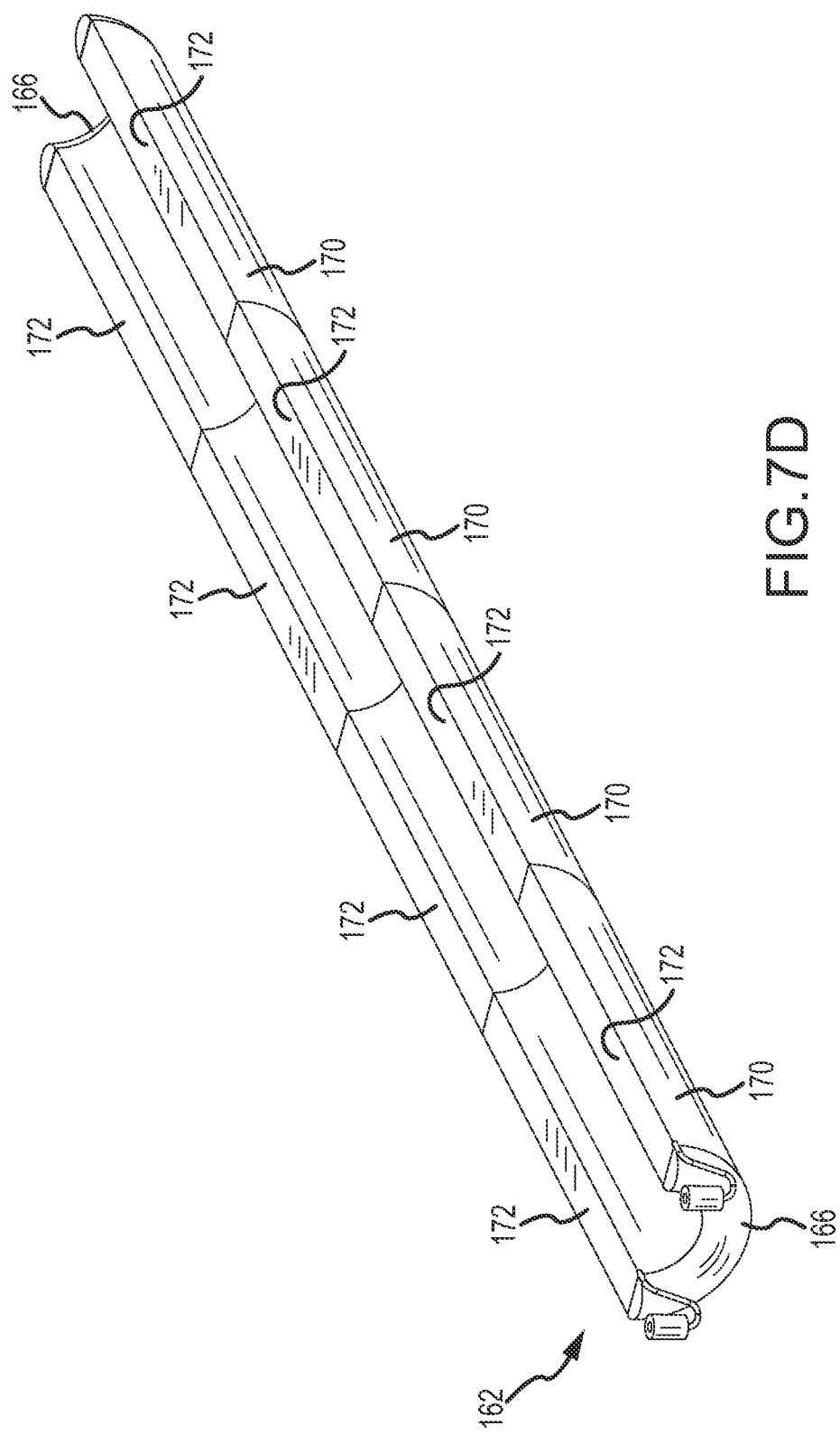
FIG. 7D is a bottom perspective view of the upper core section for the upper core assembly from the reactance module of FIGS. 2A/2B, illustrating the faces of the individual upper core segments that collectively define the upper core section (before installing the noted spacers).

FIGS. 6A-6C present various enlarged views pertaining to the lower core assembly 130. The lower core assembly 130 includes a first or lower core section 132 (FIG. 6B) having a pair of oppositely disposed ends 136. A first or lower winding 144 (FIG. 6A) wraps around the lower core section 132 between its two ends 136.

The lower core section 132 of the lower core assembly 130 is collectively defined by a plurality of first or lower core segments 140 that are disposed in end-to-end relation. Any appropriate number of individual lower core segments 140 may be utilized (four in the illustrated embodiment). Adjacent lower core segments 140 may be disposed in abutting relation, or adjacent lower core segments 140 may be separated from one another by an appropriate space (typically a small space, such as a space of no more than about ⅛ inches).

Each lower core segment 140 includes a pair of faces 142 (FIGS. 6C and 4C) that extend along opposite sides of the corresponding lower core segment 140 in its length dimension. The faces 142 on each of the two sides of the lower core section 132 may be characterized as collectively defining a face section (i.e., the lower core section 132 may be characterized as having two face sections, with each of the face sections being defined by the faces 142 of the lower core segments 140 on a common side of the lower core section 132). Each face 142 is in the form of an at least substantially planar or flat surface. The faces 142 of the various lower core segments 140 are disposed in at least substantially coplanar relation (e.g., the various faces 142 are at least substantially disposed within a common reference plane). A separate spacer 146 (e.g., FIGS. 6A, 6B, 4C) is appropriately secured (e.g., bonded; adhesively attached) to each face 142 of each lower core segment 140. A single spacer could collectively extend over those faces 142 of the various lower core segments 142 that are on a common side of the lower core segments 142 (not shown). In any case and in one embodiment, each spacer 146 is in the form of tape or a dielectric film, for instance a polyamide film (e.g., Kapton® tape available from DuPont Company). Kapton® tape dimensions for each spacer 146 (as well as spacers 176 addressed below) may be specific to the magnetization and loss performance ratings of the DSR 30.

The spacers 146 on a common side of the lower core section 132 may be characterized as collectively defining an interface 134. Therefore, the lower core section 132 includes a pair of laterally spaced interfaces 134 that each extend along the entire length of the lower core section 132 (e.g., between its opposing ends 136). One embodiment has each spacer 146 having a thickness within a range of about 0.07 inches to about 0.13 inches, although other thicknesses may be appropriate (e.g., to realize a desired amount of reactance to be injected into the power line 16 by the core assembly 50). Generally, the spacers 146 associated with the lower core section 132 contribute to providing and maintaining a desired and controlled physical and electric/magnetic spacing between the lower core assembly 130 and the upper core assembly 160.

FIGS. 7A-7D present various enlarged views pertaining to the upper core assembly 160. The upper core assembly 160 includes a second or upper core section 162 (FIG. 7B) having a pair of oppositely disposed ends 166. A second or upper winding 174 (FIG. 7A) wraps around the upper core section 162 between its two ends 166.

The upper core section 162 of the upper core assembly 160 is collectively defined by a plurality of second or upper core segments 170 that are disposed in end-to-end relation. Any appropriate number of individual upper core segments 170 may be utilized (four in the illustrated embodiment). Adjacent upper core segments 170 may be disposed in abutting relation, or adjacent upper core segments 170 may be separated from one another by an appropriate space (e.g., in accordance with the discussion presented above on the lower core section 132).

Each upper core segment 170 includes a pair of faces 172 (FIGS. 7D and 5C) that extend along opposite sides of the corresponding upper core segment 170 in its length dimension. The faces 172 on each of the two sides of the upper core section 162 may be characterized as collectively defining a face section (i.e., the upper core section 162 may be characterized as having two face sections, with each of the face sections being defined by the faces 172 of the upper core segments 170 on a common side of the upper core section 162). Each face 172 is in the form of an at least substantially planar or flat surface. The faces 172 of the various upper core segments 170 are disposed in at least substantially coplanar relation (e.g., the various faces 172 are at least substantially disposed within a common reference plane). A separate spacer 176 (e.g., FIGS. 7A, 7B, 5C) is appropriately secured (e.g., bonded; adhesively attached) to each face 172 of each upper core segment 170. A single spacer could collectively extend over those faces 172 of the various upper core segments 170 that are on a common side of the upper core segments 170. In any case and in one embodiment, each spacer 176 is in the form of tape or a dielectric film, for instance a polyamide film (e.g., Kapton® tape, noted above).

The spacers 176 on a common side of the upper core section 162 may be characterized as collectively defining an interface 164. Therefore, the upper core section 162 includes a pair of laterally spaced interfaces 164 that each extend along the entire length of the upper core section 162 (e.g., between its opposing ends 166). One embodiment has each spacer 176 having a thickness within a range of about 0.07 inches to about 0.13 inches, although other thicknesses may be appropriate (e.g., to realize a desired amount of reactance to be injected into the power line 16 by the core assembly 50). Generally, the spacers 176 associated with the upper core section 162 contribute to providing and maintaining a desired and controlled physical and electric/magnetic spacing between the lower core assembly 130 and the upper core assembly 160.

When the upper core assembly 160 is properly aligned with the lower core assembly 130, the interface 164 on one side of upper core assembly 160 will engage the interface 134 on the corresponding side of the lower core assembly 130. Similarly, the interface 164 on the opposite side of upper core assembly 160 will engage the interface 134 on the corresponding side of the lower core assembly 130. Having each spacer 176 on the upper core assembly 160 engage a corresponding spacer 146 on the lower core assembly 130 maintains a desired physical and electric/magnetic spacing between the upper core assembly 160 and the lower core assembly 130 (e.g., a spacing within a range of about 0.14 inches to about 0.26 inches at the corresponding interfaces 134/164, although other spacings may be appropriate).

FIGS. 8A and 8B present additional views of the lower core assembly 130 and the electronics 200. The electronics 200 includes a printed circuit, control board, or controller 214, a second electrical switch 206 (e.g., a contactor, bypass switch, or contact relay), a first electrical switch 204 (e.g., an SCR), an MOV (metal oxide varistor) 230, and a fault protection system 220 (again, these components are located within the electronics compartment 84 of the lower housing section 80, and are isolated from the core assembly 50 by the barrier or partition 82). A separate antenna cable 62 is also located within the electronics compartment 84 and extends from the controller 214 to each of the two antennas 100 for the DSR 30. The first electrical switch 204 (e.g., SCR) and the fault protection system 220 are utilized by the DSR 30 in fault current or surge conditions encountered in the power line 16 on which the DSR 30 is mounted. The MOV 230 is used by the DSR 30 for lightning protection. The controller 214 controls operation of the second electrical switch 206 (e.g., contactor), which in turn establishes the mode of the core assembly 50. The core assembly 50 may be disposed in either of first or second modes. In the second or injection mode, the core assembly 50 injects reactance into the power line 16 on which the DSR 30 is mounted (inductance for the illustrated configuration of the DSR 30, although the DSR 30 may be configured to instead inject capacitance as noted above). In the first or non-injection mode, the core assembly 50 injects little or no reactance into the power line 16 on which the DSR 30 is mounted.

Figure 9:
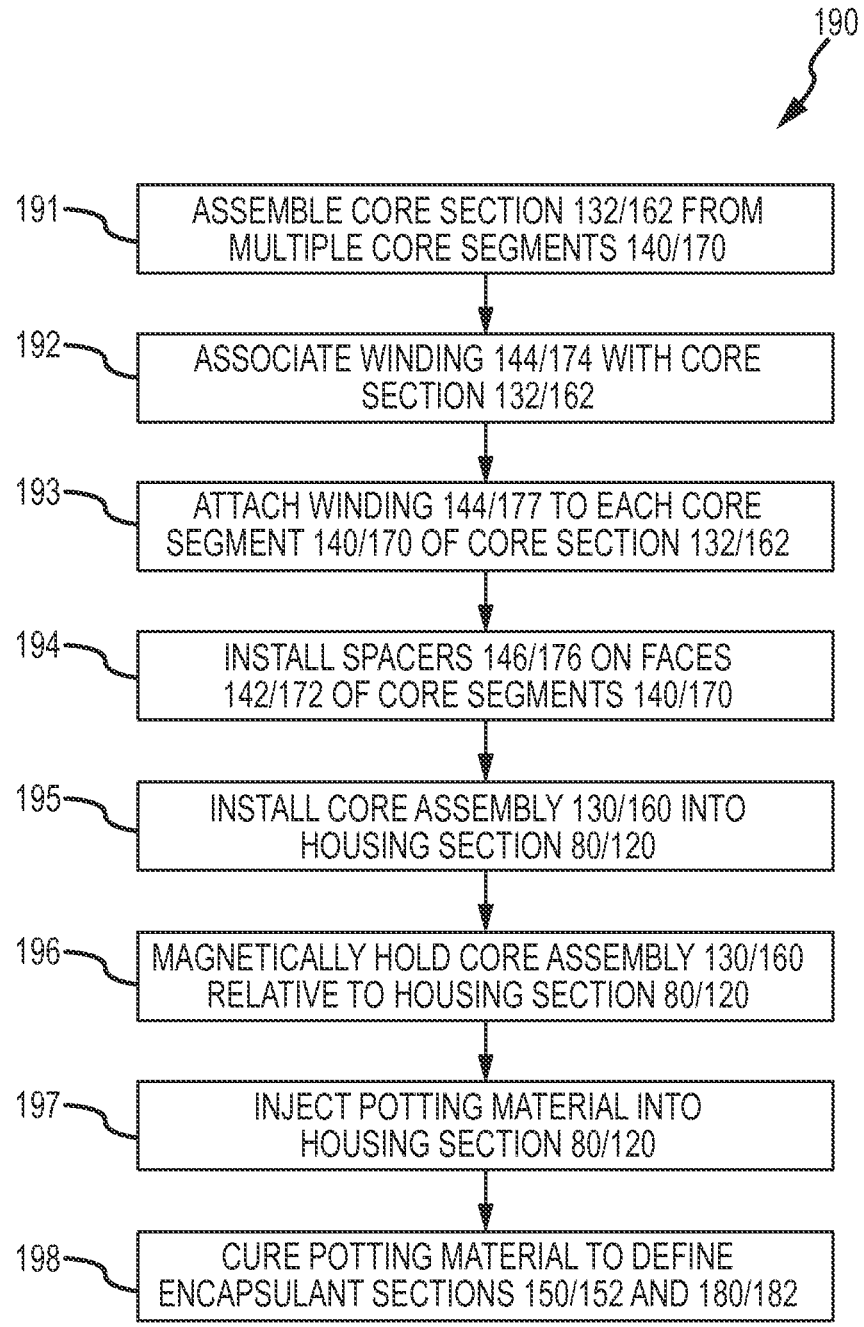
FIG. 9 is one embodiment of a protocol for assembling the reactance module of FIGS. 2A/2B.

One embodiment of a protocol for assembling the above-described DSR 30 is presented in FIG. 9 and is identified by reference 190. The protocol 190 is applicable to assembling the lower core assembly 130 within the lower housing section 80, as well as to assembling the upper core assembly 160 within the upper housing section 120 (including simultaneously (e.g., using different machine sets) or sequentially (e.g., using a common machine set). Hereafter, the protocol 190 will be described with regard to assembling the lower core assembly 130 within the lower housing section 80.

The lower core section 132 may be assembled by disposing the first core segments 140 in alignment (step 191). The ends of adjacent first core segments 140 may be disposed in abutting relation, or a small space may exist between each adjacent pair of first core segments 140. In one embodiment, the various first core segments 140 are positioned within an appropriate jig for purposes of step 191 of the protocol 190.

The first winding 144 may be associated with the assembled first core section 132 pursuant to step 192 of the protocol 190. The first winding 144 may be created/defined "off the first core section 132", and then separately positioned on the first core section 132 (so as to extend between its ends 136) for purposes of step 192. Another option would be to wind wire on the assembled first core section 132 (around its ends 136) to create/define the first winding 144 for purposes of step 192 of the protocol 190. In any case, the first winding 144 may be attached to the first core section 132 in any appropriate manner, for instance using an epoxy (step 193). In one embodiment, the first winding 144 is separately attached to each of the individual first core segments 140 that collectively define the first core section 132.

Spacers 146 may be installed on the various faces 142 of the first core segments 140 that collectively define the first core section 132 (step 194). Steps 192-194 may be executed in any appropriate order (e.g., step 194 could be executed prior to or after step 192; step 194 could be executed some time after completion of step 197, including after completion of step 198). In one embodiment, a separate spacer 146 is provided for each face 142 of each first core segment 140. Any appropriate adhesive and/or bonding technique may be used to attach the spacers 146 to the corresponding first core segment 140 (more specifically, to one of its faces 142).

The first core assembly 130 is positioned within the first housing section 80 (step 195). The lower core assembly 130 is magnetically held relative to the lower housing section 80 (step 196). An appropriate jig may be used for purposes of step 196. Step 196 may entail using one or more magnets to maintain the various faces 142 (of the lower core segments 140 that collectively define the lower core section 132) in at least substantially coplanar relation (e.g., to dispose the faces 142 in a common reference plane), to maintain a desired spacing between the lower core assembly 130 and the interior of the lower housing section 80 in a desired spaced relation (e.g., the partition 82), or both. In one embodiment, each face 142 of each lower core segment 140 (or a spacer 146 previously installed on such a face 142) is positioned against a flat or planar surface of a corresponding magnet (e.g., a separate magnet may be provided for each lower core segment 140). Thereafter, a potting material (e.g., Sylgard®) is injected to encapsulate all but the upper surfaces of the spacers 146 of the lower core assembly 130 within the lower housing section 80 (step 197), and this potting material is allowed to cure in any appropriate manner to define the encapsulating sections 150, 152 discussed above (step 198). As noted, the installation of one or more spacers 146 on the lower core section 132 (step 194) may be undertaken at some point in time after step 197 (and possibly after step 198). The magnetic holding provided by step 196 may be terminated after a sufficient degree of curing has occurred from execution of step 198.

Figure 10:
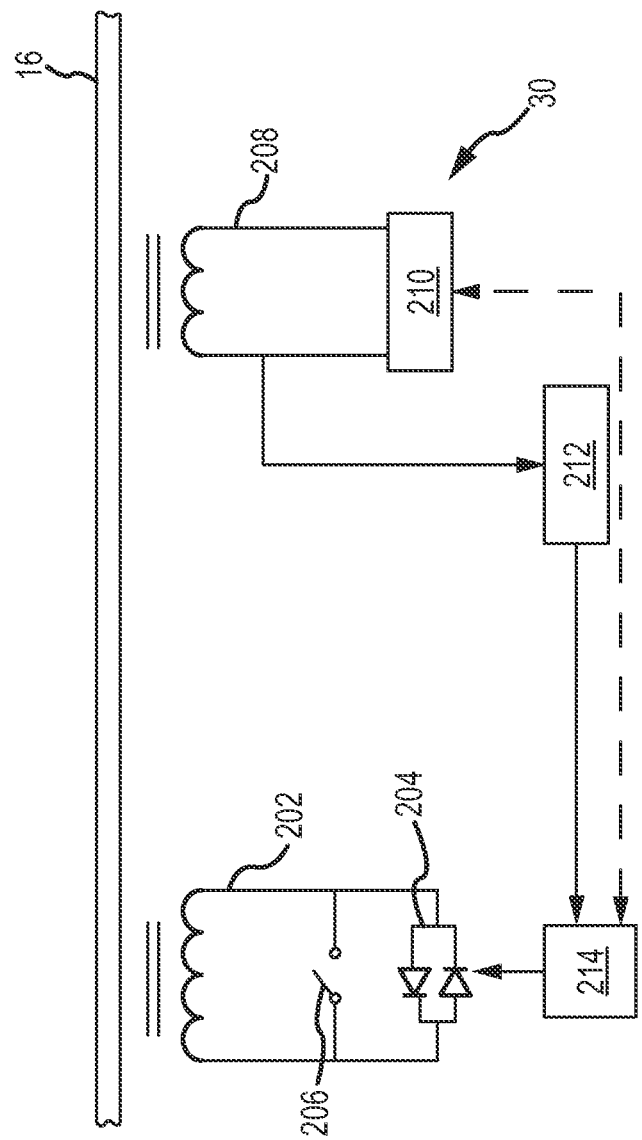
FIG. 10 is an electrical block diagram for an embodiment of the reactance module of FIGS. 2A/2B.

A representative electrical block diagram of the DSR 30 is presented in FIG. 10. The DSR 30 may be characterized as including a first device 202 (e.g., a transformer that includes the core assembly 50 of the DSR 30), the above-noted first electrical switch 204 (e.g., an SCR), the above-noted second electrical switch 206 (e.g., a contact relay), a current transformer 208, a power supply 210, a current monitor 212, and the above-noted controller 214. Again, the DSR 30 may be mounted on a power line 16 such that reactance may be injected into the power line 16. The first device 202 may be in the form of (or part of) a reactance injecting circuit, for instance a single turn transformer. The first device 202 may be disposable in each of first and second modes. For example, switching the first device 202 from the first mode to the second mode may increase the injected reactance being input to the power line 16 when the DSR 30 is mounted on the power line 16. The first device 202 may be operably connected to the controller 214 via the first electrical switch 204 (e.g., SCR) and/or the second electrical switch 206 (e.g., a contact relay). In other words, the first device 202 may be operably connected with the first electrical switch 204, the second electrical switch 206, and/or the controller 214.

In one embodiment, the first electrical switch 204 (e.g., an SCR) may be a solid-state semiconductor device, for instance a thyristor pair. The first electrical switch 204 may be operably connected to the first device 202 and/or the controller 214. In this regard, the first electrical switch 204 may be operable to control the injection of reactance into the power line 16. For example and when the first electrical switch 204 is closed, a minimum level of reactance, corresponding to the first device 202 leakage reactance, is injected into power line 16. In another example and when the first electrical switch 204 is open and the second electrical switch 206 (e.g., a contact relay) is open, reactance is injected into power line 16. As will be discussed in more detail below, the first electrical switch 204 also may be operable to pass an overcurrent.

The controller 214 may be any computerized device (e.g., a microcontroller) that is operable to manage the operation of multiple devices and/or communicate with multiple devices in order to implement one or more control objectives. For example, the controller 214 may be operable to switch the first device 202 from the first mode to the second mode and/or communicate with any device of the DSR 30. In this regard, the controller 214 may be operably connected to the first electrical switch 204 (e.g., an SCR), the second electrical switch 206 (e.g., a contact relay), the first device 202, the current monitor 212, and/or the power supply 210. The controller 214 may switch the first device 202 from the first mode to the second mode via the second electrical switch 206. The first mode for the DSR 30 may be characterized as a bypass mode and the second mode for the DSR 30 may be characterized as an injection mode. When the second electrical switch 206 is closed (i.e., is conducting), the first device 202 is in bypass mode (e.g., the first device 202 is shorted) and little or no reactance is injected into the power line 16 via the DSR 30. When the second electrical switch 206 is open (such that the first device 202 is an open circuit) the first device 202 is in injection mode where reactance is injected into the power line 16.

The controller 214 may switch the first device 202 from bypass mode to injection mode when the current monitor 212 determines that a current of the power line 16 satisfies a predetermined threshold. For example, the current monitor 212 may be operable to measure the current on the power line 16 (at the DSR 30) and communicate the measured current to the controller 214. If the measured current satisfies the predetermined threshold (e.g., if the current is greater than the threshold, or is equal to or greater than the threshold, as the case may be), the controller 214 may switch the first device 202 from bypass mode to injection mode by opening the second electrical switch 206 (e.g., contact relay) such that reactance is injected into the power line 16. Similarly, if the measured current thereafter no longer satisfies the predetermined threshold (e.g., if the measured current drops below the predetermined threshold), the controller 214 may switch the first device 202 from injection mode back to bypass mode by closing the second electrical switch 206 such that the first device 202 is shorted and such that no substantial reactance is injected into the power line 16. As such, the controller 214 may be operable to switch the first device 202 between the bypass and injection modes.

The current monitor 212 may measure the current on the power line 16 via the current transformer 208. In this regard, the current transformer 208 may be mounted on the power line 16 and may be a separate component from the first device 202. In one embodiment, the current transformer 208 may be operable to produce a reduced current that is proportional to the current of the power line 16 such that the current may be processed and/or measured by a measuring device (e.g., the current monitor 212) and/or the current may provide power to electronic components (e.g., the power supply 210). The power supply 210 may be operably connected with the current transformer 208 and/or the controller 214. In this regard, the power supply 210 may receive power from the current transformer 208 and provide power to the controller 214.

The DSR 30 may be mounted on the power line 16 such that an injected reactance may be input to the power line 16. In one embodiment, the injected reactance may be an inductive reactance (e.g., inductance). For example, when inductance is injected into the power line 16, the flow of current in the power line 16 may be reduced and diverted to underutilized power lines in interconnected and/or meshed power networks. In another embodiment, the injected reactance may be a capacitive reactance (e.g., capacitance). For example, when capacitance is injected into the power line 16, the flow of current in the power line 16 may be increased and diverted from power lines in interconnected and/or meshed power networks.

Figure 11A:
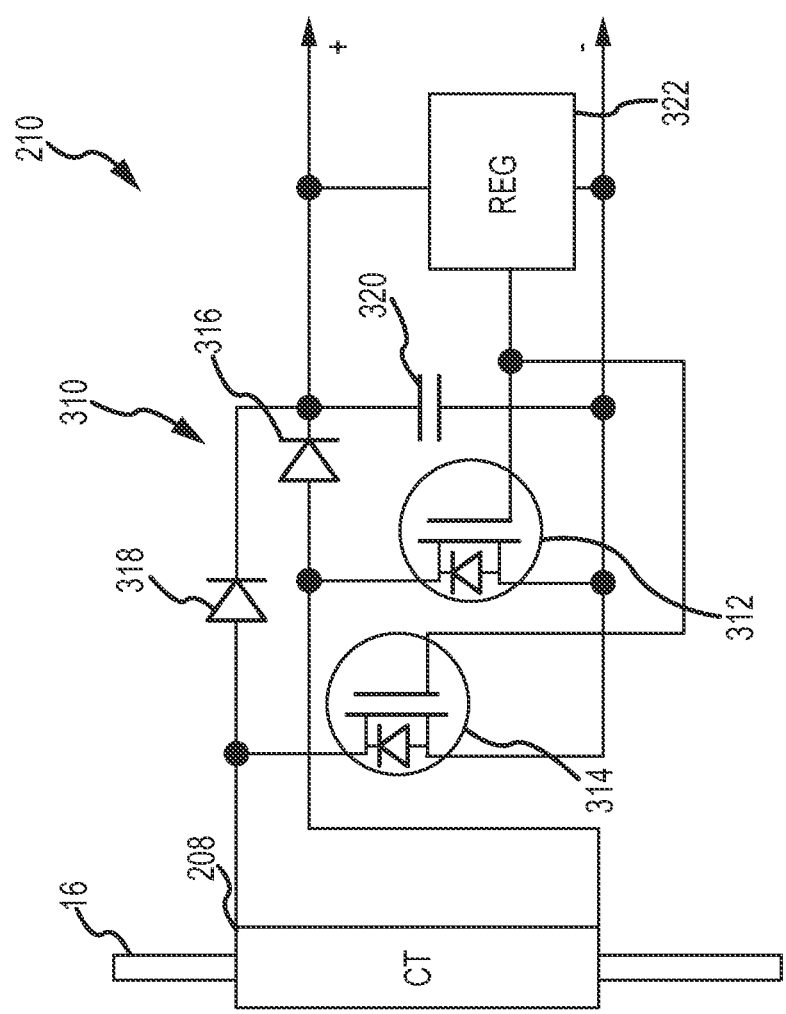
FIG. 11A is a schematic of an embodiment of a power supply from the electrical block diagram of FIG. 10.

FIG. 11A illustrates one embodiment that may be used as the power supply 210 for the DSR 30 addressed above in relation to FIG. 10. The power supply 210 of FIG. 11A includes a bridgeless power factor correction circuit or a bridgeless PFC 310 and a regulator 322. As discussed above, the power supply 210 may receive power from the current transformer 208 (where the power line 16 is the primary of the current transformer 208), and the current transformer 208 may be operable to produce a reduced current that is proportional to the current on the power line 16 such that the current transformer 208 may provide power to the power supply 210. In one embodiment, the current of the power line 16 may be characterized as a first current and the reduced current provided by the current transformer 208 may be characterized as a second current. In this regard, the current transformer 208 receives the first current and outputs the second current, the second current is different than the first current, and the second current is proportional to the first current.

The second current may be based at least on the number of turns of a secondary winding (not illustrated) of the current transformer 208. For example, the secondary winding of the current transformer 208 may comprise 100 turns. In this example, the second current would be $\frac{1}{100}$ of the first current (i.e., the first current is 100 times the second current). The current transformer 208 may be configured to provide any desired reduction of the current on the power line 16.

The bridgeless PFC 310 includes the current transformer 208, a first controllable switch 312, a second controllable switch 314, a first rectifier 316, a second rectifier 318, and a capacitor 320. The first rectifier 316 may be operably connected to the first controllable switch 312 and the second rectifier 318 may be operably connected to the second controllable switch 314. In this regard, the operation of the first and second rectifiers 316, 318 may be dependent on the operation of the first and second controllable switches 312, 314, respectively. For example, the first and second rectifiers 316, 318 may output a current to the capacitor 320 based on the state of the first and second controllable switches 312, 314, respectively. The first and second rectifiers 316, 318 may be any silicon-based semiconductor switch (e.g., diodes). The first and second controllable switches 312, 314 may be any semiconductor transistors (e.g., MOSFETs). The first and second controllable switches 312, 314 also may be operably connected to the regulator 322. In this regard, the regulator 322 may be configured to switch each of the first and second controllable switches 312, 314 between a conducting state and a non-conducting state.

As discussed above in relation to FIG. 10, the power supply 210 may provide power to the controller 214 of the DSR 30. The power supply 210 may be operable to output a regulated voltage (e.g., a 24 VDC output) to the controller 214. When the regulated voltage satisfies a predetermined threshold (e.g., if the regulated voltage is greater than the threshold, or is equal to or greater than the threshold), the regulator 322 may switch the first and second controllable switches 312, 314 to the conducting state. In one embodiment, the predetermined threshold may be within a range from about 23.9V to about 24.1V. This predetermined threshold may be a standard design power supply voltage for the system. When the first and second controllable switches 312, 314 are in the conducting state, the output current from the first and second rectifiers 316, 318 may be shunted. For example, the second current received from the current transformer 208 may flow through the first and second controllable switches 312, 314 such that the power supply 210 is shorted and no or very little current flows through the first and second rectifiers 316, 318. As discussed above, the capacitor 320 may receive current from the first and second rectifiers 316, 318. As such, when the output current from the first and second rectifiers 316, 318 is shunted, the capacitor 320 may begin to discharge.

When the regulated voltage no longer satisfies the predetermined threshold (e.g., if the regulated voltage drops below the predetermined threshold), the regulator 322 switches the first and second controllable switches 312, 314 to the non-conducting state. When the first and second controllable switches 312, 314 are in the non-conducting state, the second current from the current transformer 208 may flow through the first and second rectifiers 316, 318. As such, the capacitor 320 may receive the output current from the first and second rectifiers 316, 318 and may begin to charge. In turn, the output voltage of the power supply 210 is regulated. In one embodiment, the regulator 322 may have an operating frequency substantially higher than the current frequency on the power line 16.

Figure 11B:
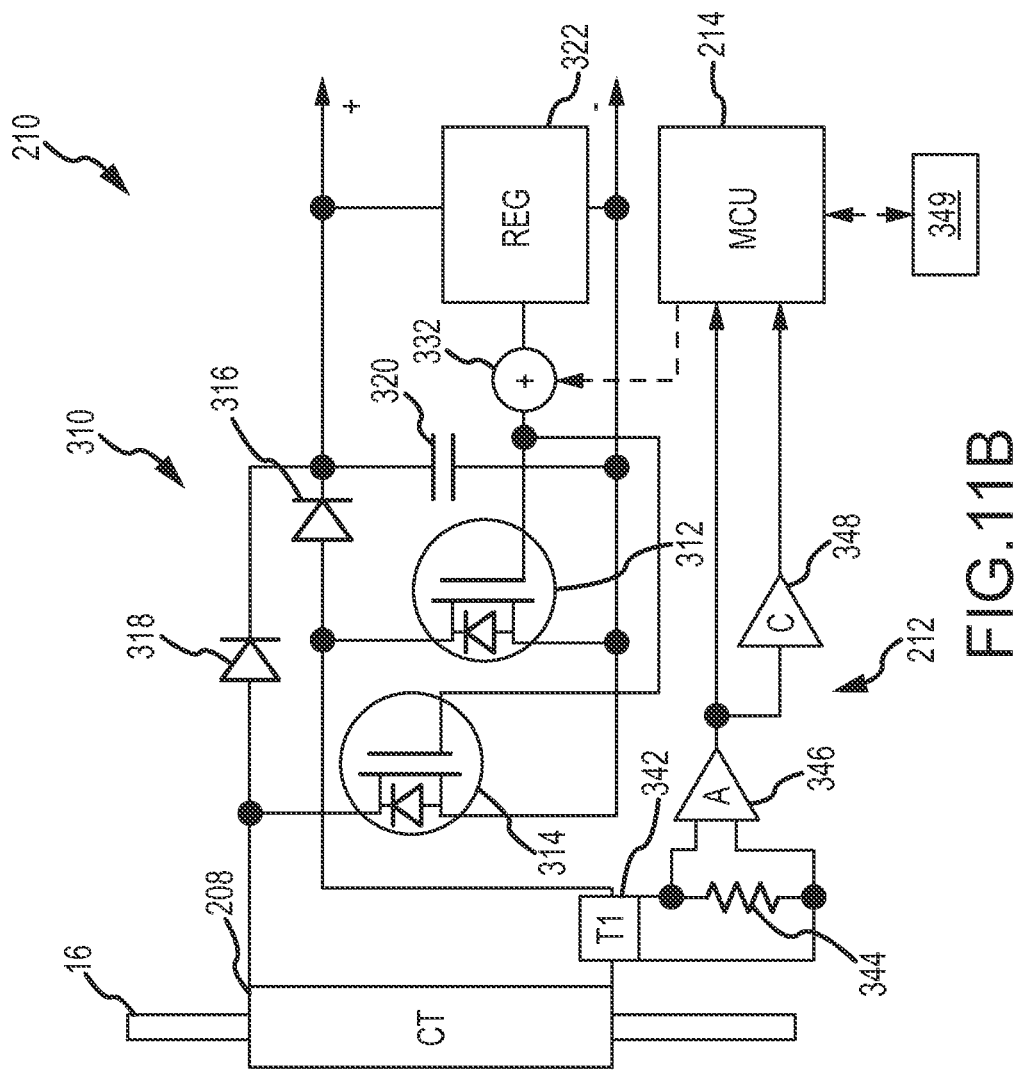
FIG. 11B is a schematic of an embodiment of a power supply and a current monitor from the electrical block diagram of FIG. 10.

As discussed above in relation to FIG. 10, the current monitor 212 may be operable to measure the current on the power line 16 (at the DSR 30) and communicate the measured current to the controller 214. One embodiment that may be used as the current monitor 212 is illustrated in FIG. 11B. The current monitor 212 of FIG. 11B may be operably connected to the current transformer 208, and furthermore may be configured to measure the second current from the current transformer 208. The current transformer 208 may be operable to output the second current to the power supply 210 through the current monitor 212. In this regard, the controller 214 may be configured to switch the current transformer 208 from a first state to a second state. The first state may include the current transformer 208 outputting the second current to the power supply 210. When the current transformer 208 is in the first state, the power supply 210 outputs the regulated voltage. The second state may include a measurement of the second current via the current monitor 212. When the current transformer 208 is in the second state, the first and second controllable switches 312, 314 are in the conducting state and the power supply 210 is shorted such that the second current flows through the first and second controllable switches 312, 314. Shunting the power supply 210 operation while the current transformer 208 is in the second state may remove any contribution of high-frequency switching noise, or other non-linearity associated with the power supply 210 operation from the measurement of the second current. As a result, the quality and signal-to-noise ratio of the current monitor 212 may be increased.

As illustrated in FIG. 11B, the controller 214 may include a logical summing device 332. The logical summing device 332 may be any simple logic element or programmable logic device such as a programmable logic array and a field-programmable gate array, to name a few. The logical summing device 332 may be configured to output a control signal. When the control signal is active, the current transformer 208 is in the second state and the first and second controllable switches 312, 314 are in the conducting state. This is true even if the regulated voltage no longer satisfies the predetermined threshold. In other words, when the power supply 210 is in normal operation, and the regulated voltage no longer satisfies the predetermined threshold, the first and second controllable switches 312, 314 are switched to the non-conducting state. However, if the control signal from the logical summing device 332 is active, the first and second controllable switches 312, 314 remain in the conducting state, resulting in the absence of influence of control pulses from the regulator 322 on the measurement of the second current. In this regard, the control signal from the logical summing device 332 may facilitate the measurement of the second current via the current monitor 212. When the current monitor 212 measures the second current, the second current may have a signal-to-noise ratio of at least about 48 dB.

The current monitor 212 may include an instrument or instrumental current transformer 342, a burden resistor 344, a differential amplifier 346, a comparator 348, and/or an analog-to-digital converter 349. The instrument current transformer 342 may be operably connected to the current transformer 208 and configured to reduce the second current from the current transformer 208 to a third current. This third current may be less than the second current and proportional to the second current. This third current may be less than the first current (i.e., the current of the power line 16), and is proportional to the first current. The burden resistor 344 may be operably connected to the output of the instrument current transformer 342 such that a voltage develops on the burden resistor 344. The voltage on the burden resistor 344 is proportional to the third current, and thus to the first and second currents. The differential amplifier 346 may be operably connected to the burden resistor 344 and may be configured to convert and/or amplify the voltage on the burden resistor 344. The analog-to-digital converter 349 may be operably connected to the differential amplifier 346 and the controller 214. As such, the differential amplifier 346 may send the analog-to-digital converter 349 an analog signal representative of the voltage on the burden resistor 344. In turn, the analog-to-digital converter 349 may be configured to determine the current on the power line 16. As will be discussed in more detail below, the comparator 348 may be operably connected to the differential amplifier 346 and the controller 214, and may be configured to send an interrupt signal to the controller 214.

Figure 12A:
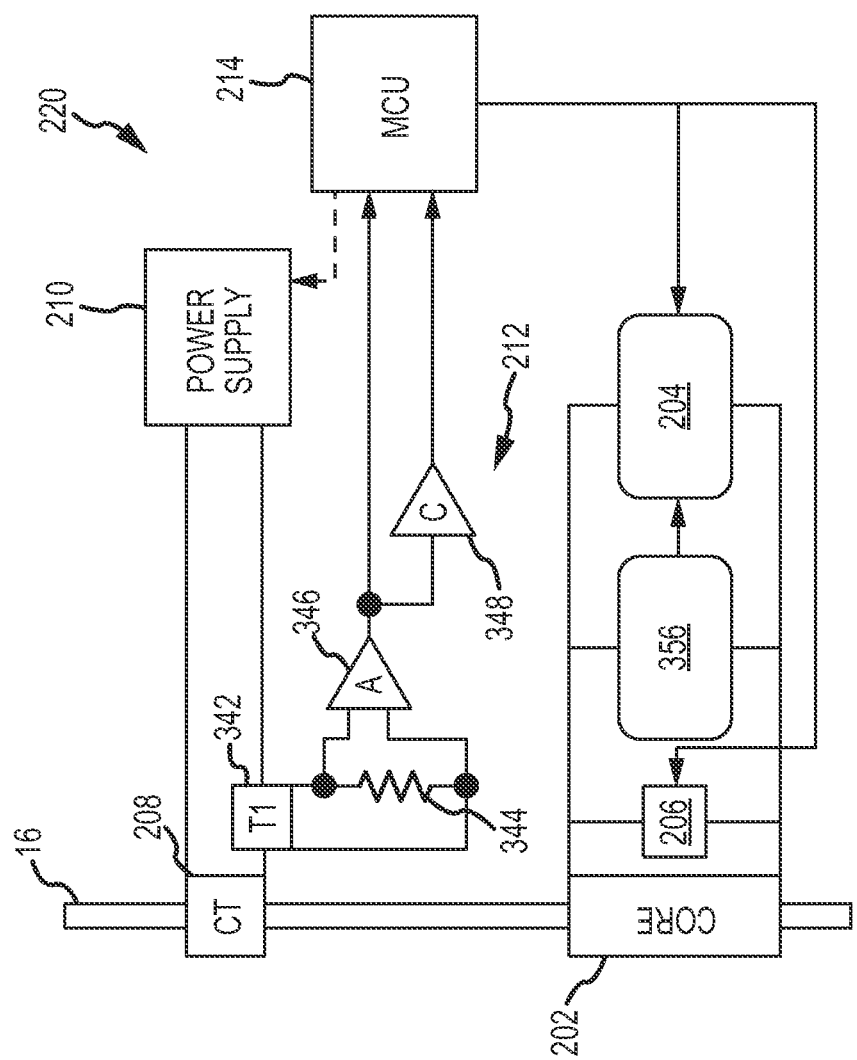
FIG. 12A is a schematic of an embodiment of a fault protection system for the reactance module of FIGS. 2A/2B.

FIG. 12A illustrates one embodiment for the above-noted fault protection system 220 of the DSR 30. The fault protection system 220 includes the power supply 210 (FIGS. 10 and 11A), the current monitor 212 (FIGS. 10 and 11B), a voltage detection circuit 356, the first device 202 (e.g., a transformer that uses the core assembly 50) addressed above (FIG. 10), and the first electrical switch 204 (e.g., an SCR; FIG. 10). The fault protection system 220 may include a plurality of different bypass sequences that are separately executable. The plurality of different bypass sequences may be executed to activate the first electrical switch 204 to short the first device 202. As discussed above, the first electrical switch 204 may be operable to pass an overcurrent. When the first electrical switch 204 is activated, the first electrical switch 204 may pass the overcurrent. In this regard, the plurality of different bypass sequences may be separately executed to protect the DSR 30 from overcurrent and/or fault conditions. The plurality of different bypass sequences may include first, second, and third bypass sequences.

The first bypass sequence may include the controller 214 activating the first electrical switch 204 (e.g., an SCR) to short the first device 202 (e.g., a transformer that uses the core assembly 50) based upon the controller 214 determining that an output from the current monitor 212 satisfies a first predetermined threshold (e.g., if the output is greater than the threshold, or is equal to or greater than the threshold). For example and as discussed above, the current monitor 212 may be one of the differential amplifier 346 or the analog-to-digital converter 349. As such, the output from the differential amplifier 346 may be an analog signal (e.g., a voltage signal) that gets sent to the analog-to-digital converter 349, where it is determined if the analog signal satisfies the first predetermined threshold. In this case, if the analog signal satisfies the first predetermined threshold, the controller 214 may activate the first electrical switch 204 to short the first device 202.

The second bypass sequence may include the comparator 348 sending a communication (e.g., an interrupt signal) to the controller 214, indicating that the output from the current monitor 212 satisfies a second predetermined threshold. For example and as discussed above, the comparator 348 may be operably connected with the differential amplifier 346 and the controller 214. As such, the output from the current monitor 212 may be the analog signal from the differential amplifier 346. The comparator 348 may receive the analog signal (e.g., a voltage signal) at its input, and determine if the voltage signal satisfies the second predetermined threshold. If the voltage signal satisfies the second predetermined threshold, the comparator 348 may send the interrupt signal to the controller 214. In this case, the controller 214 may activate the first electrical switch 204 (e.g., an SCR) to short the first device 202 (e.g., a transformer that uses the core assembly 50), in response to receiving the interrupt signal from the comparator 348. In other words, the interrupt signal may prompt the controller 214 to activate the first electrical switch 204. In order to activate the first electrical switch 204, the controller 214 may send a series of electrical pulses to the first electrical switch 204 such that the first electrical switch 204 begins conducting.

The output, i.e., the analog signal, may be representative of the current on the power line 16. For example, when the analog signal satisfies the first predetermined threshold, this may indicate that the current on the power line 16 is at least about 1100 Amps. In another example, when the analog signal satisfies the second-predetermined threshold, this may indicate that the current on the power line 16 is at least about 1800 Amps. In other examples, the first and second predetermined thresholds may be selected based on specific applications of the fault protection system 220 of the DSR 30 relative to a given installation. The first and second predetermined thresholds may be selected to be above expected normal operating current limits on the power line 16. In other words, the first and second predetermined thresholds may be any value suitable to enable execution of the first and second bypass sequences to protect the DSR 30 from overcurrent and/or fault conditions.

The third bypass sequence may include the voltage detection circuit 356 (e.g., a crowbar circuit) activating the first electrical switch 204 (e.g., an SCR) to short the first device 202 when a detected voltage satisfies a third predetermined threshold. The detected voltage may be a voltage of the first device 202. For example and as discussed above, the first device 202 may be a single turn transformer including windings 144, 174 on the core assembly 50 (e.g., the secondary of a single turn transformer). As such, the detected voltage may be a voltage present on the secondary windings 144, 174 of the core assembly 50. In one embodiment, the third predetermined threshold may be at least about 1800 volts. The third predetermined threshold may be selected based on specific applications of the fault protection system 220 of the DSR 30 relative to a given installation. The third predetermined threshold may be selected based on the operational limits of the electronic components within the fault protection system 220 of the DSR 30 and/or the number of secondary windings 144, 174 of the core assembly 50. In other words, the third predetermined threshold may be any value suitable to enable execution of the third bypass sequence to protect the DSR 30 from overcurrent and/or fault conditions.

A secondary function of the fault protection system 220 may include protection of the second electrical switch 206 addressed above (e.g., a contact relay; FIG. 10). The second electrical switch 206 may be operably connected to the controller 214 and the first device 202. The controller 214 may be configured to switch the second electrical switch 206 between an open position and a closed position in order to switch the DSR 30 between bypass and injection modes of operation as discussed above. During such a change of position, the second electric switch 206 may be vulnerable to damage from electric arc and/or excessive currents through its contact surfaces. This damage may be minimized by externally shunting the contacts of the second electrical switch 206 during any such change of position, where the duration of the change of position may be within a range from about one millisecond to about one second. The secondary function of the fault protection system 220 may be activated by the controller 214 issuing a series of electrical pulses to the first electric switch 204 during the period when the second electric switch 206 is changing positions. In turn, the first electrical switch 204 may enter a conducting state, thereby shunting the contacts of the second electric switch 206.

For the same purpose, when the first electrical switch 204 is activated (e.g., when any of the first, second, or third bypass sequences is executed), the second electrical switch 206 remains in either the open position or the closed position. For example, if the second electrical switch 206 is in the open position (e.g., the DSR 30 is in injection mode)

when the first electrical switch 204 (e.g., an SCR) is activated, the second electrical switch 206 remains in the open position during the execution of any of the first, second, or third bypass sequences. In another example, if the second electrical switch 206 is in the closed position (e.g., the DSR 30 is in bypass mode) when the first electrical switch 204 is activated, the second electrical switch 206 remains in the closed position during the execution of any of the first, second, or third bypass sequences.

The first bypass sequence may have a first response time, the second bypass sequence may have a second response time, and the third bypass sequence may have a third response time. The first response time may be the amount of time it takes for the controller 214 to determine that the output from the current monitor 212 satisfies the first predetermined threshold. For example, the analog-to-digital converter 349 may receive the output from the current monitor 212 while the controller 214 is performing another function, which may result in a first response time. In another example, the controller 214 may process the output from the current monitor 212 immediately upon receiving it, which may result in a first response time that is different than the first response time in the first example. The second response time may be the amount of time it takes for the comparator 348 to determine that the output from the differential amplifier 346 satisfies the second predetermined threshold. The third response time may be the amount of time it takes for the voltage detection circuit 356 to determine that the detected voltage satisfies the third predetermined threshold.

The first response time may be faster than the second response time and the third response time, and the second response time may be faster than the third response time. For example, the controller 214 may determine that the output from the current monitor 212 satisfies the first predetermined threshold before the comparator 348 determines that the output from the differential amplifier 346 satisfies the second predetermined threshold and before the voltage detection circuit 356 determines that the detected voltage satisfies the third predetermined threshold. As another example, the comparator 348 may determine that the output from the differential amplifier 346 satisfies the second predetermined threshold before the voltage detection circuit 356 determines that the detected voltage satisfies the third predetermined threshold. The second response time may be faster than the first response time and the third response time. For example, the comparator 348 may determine that the output from the differential amplifier 346 satisfies the second predetermined threshold before the controller 214 determines that the output from the current monitor 212 satisfies the first predetermined threshold and before the voltage detection circuit 356 determines that the detected voltage satisfies the third predetermined threshold. The third response time may be faster than the first response time and the second response time. For example, the voltage detection circuit 356 may determine that the detected voltage satisfies the third predetermined threshold before either the controller 214 or the comparator 348 determine that the output from the current monitor 212 satisfies the first or the second predetermined thresholds.

If the first bypass sequence is executed, the second and third bypass sequences may not be executed. Similarly, the second bypass sequence may be executed if the first bypass sequence has not been executed. The first bypass sequence may not be executed when the output from the current monitor 212 is not processed by the controller 214 and/or if the second response time is faster than the first response time. The third bypass sequence may be executed if the first and second bypass sequences have not been executed and/or if the third response time is faster than the first and second response times.

Figure 12B:
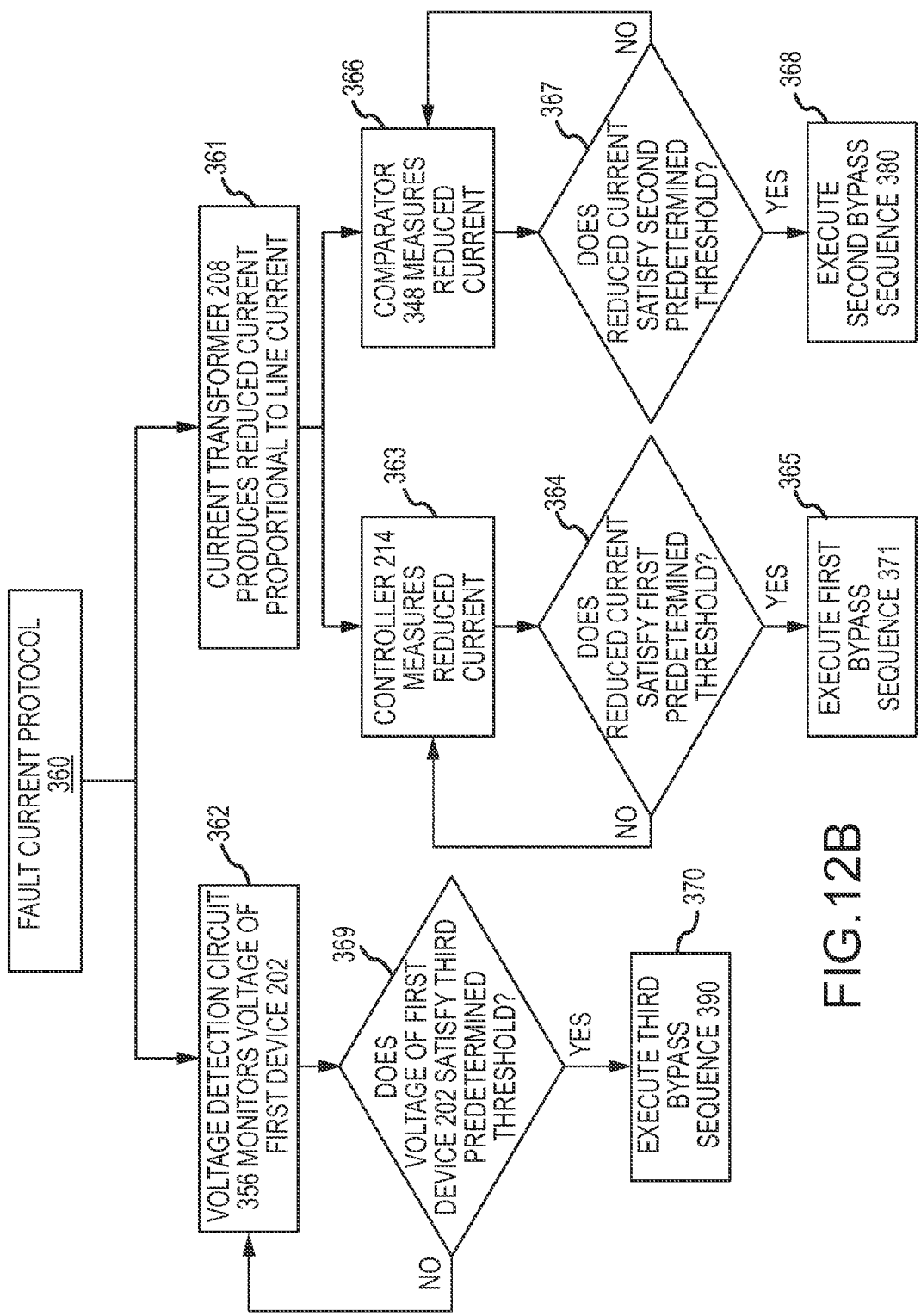
FIG. 12B is an embodiment of a fault current protocol that may be used by the fault protection system of FIG. 12A to execute a plurality of bypass sequences.

One embodiment of a protocol for protecting the DSR 30 is presented in FIG. 12B and is identified by reference numeral 360. The protocol 360 generally includes the steps for detecting a fault current and executing a plurality of different bypass sequences to protect the DSR 30 from damage. As current flows through the power line 16, the current transformer 208 produces a reduced current that is proportional to the current of the power line 16 (step 361) and the voltage detection circuit 356 monitors the voltage of the first device 202 (step 362). The reduced current produced by the current transformer 208 may be measured by the controller 214 (step 363) or the comparator 348 (step 366). Step 363 includes the controller 214 determining if the reduced current satisfies the first predetermined threshold (step 364). If the reduced current does not satisfy the first predetermined threshold, step 363 is repeated, i.e., the controller 214 continues measuring the reduced current produced by the current transformer 208. If the reduced current does satisfy the first predetermined threshold, the first bypass sequence 371 (FIG. 12C) is executed (step 365).

In step 366 of the protocol 360 of FIG. 12B, the comparator 348 measures the reduced current produced by the current transformer 208. Step 366 includes the comparator 348 determining if the reduced current satisfies the second predetermined threshold (step 367). If the reduced current does not satisfy the second predetermined threshold, step 366 is repeated, i.e., the comparator 348 continues measuring the reduced current produced by the current transformer 208. If the reduced current does satisfy the second predetermined threshold, the second bypass sequence 380 (FIG. 12D) is executed (step 368).

In step 362 of the protocol 360 of FIG. 12B, the voltage detection circuit 356 monitors the voltage of the first device 202. Step 362 includes the voltage detection circuit 356 determining if the voltage of the first device 202 satisfies the third predetermined threshold (step 369). If the voltage does not satisfy the third predetermined threshold, step 362 is repeated, i.e., the voltage detection circuit 356 continues to monitor the voltage of the first device 202. If the voltage does satisfy the third predetermined threshold, the third bypass sequence 390 (FIG. 12E) is executed (step 370).

Figure 12C:
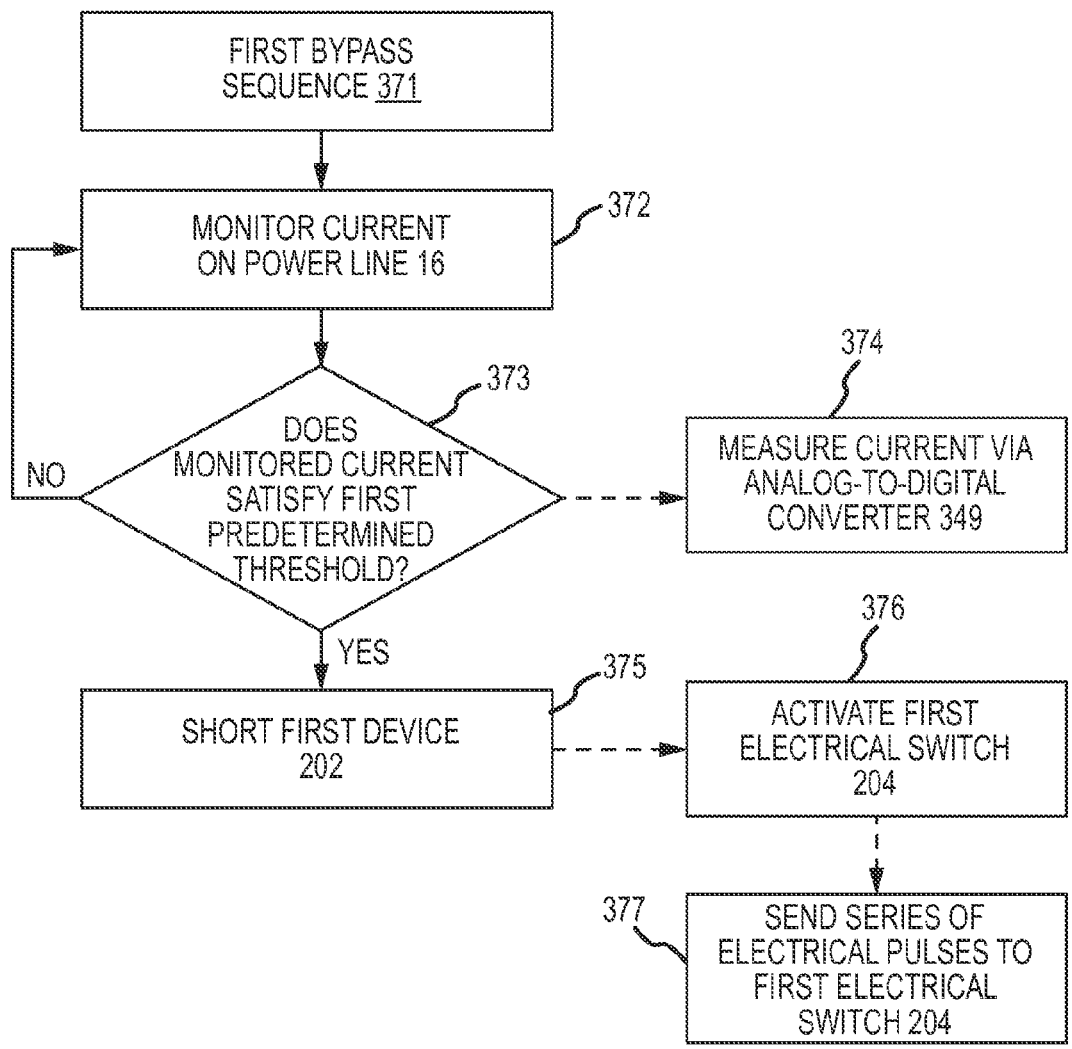
FIG. 12C is a flow chart illustrating one embodiment of a first bypass sequence that may be executed by the fault protection system of FIG. 12A.

With reference now to FIG. 12C, one embodiment of the first bypass sequence 371 is presented. The first bypass sequence 371 may include the steps of monitoring the current of the power line 16 (step 372), assessing whether the line current on the power line 16 satisfies the first predetermined threshold (step 373), and shorting the first device 202 in response to identification of satisfaction of the first predetermined threshold (step 375). Step 373 may include the step of measuring the current via the analog-to-digital converter 349 (step 374). Step 375 may include the step of activating the first electrical switch 204 (step 376). Step 376 may include the step of sending a series of electrical pulses to the first electrical switch 204 such that the first electrical switch 204 begins conducting (step 377).

Figure 12D:
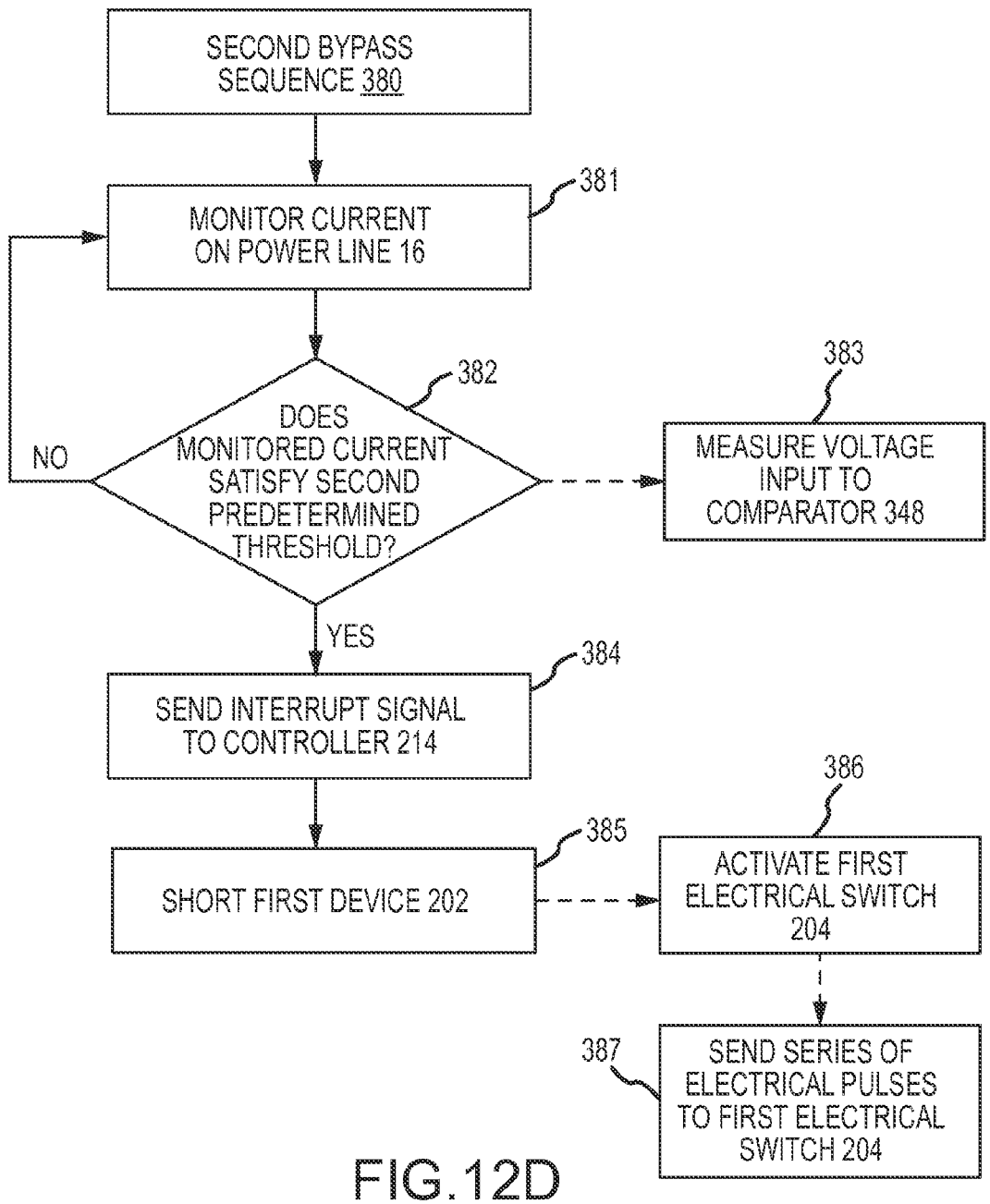
FIG. 12D is a flow chart illustrating one embodiment of a second bypass sequence that may be executed by the fault protection system of FIG. 12A.

FIG. 12D illustrates one embodiment of the second bypass sequence 380. The second bypass sequence 380 may include the steps of monitoring the current of the power line 16 (step 381), assessing whether the line current on the power line 16 satisfies the second predetermined threshold (step 382), sending an interrupt signal to the controller 214 in response to identification of satisfaction of the second predetermined threshold (step 384), and shorting the first device 202 in response to identification of satisfaction of the second predetermined threshold (step 385). Step 382 may include the step of measuring the voltage input to the comparator 348 (step 383). Step 385 may include the step of activating the first electrical switch 204 (step 386). Step 376 may include the step of sending a series of electrical pulses to the first electrical switch 204 such that the first electrical switch 204 begins conducting (step 387).

Figure 12E:
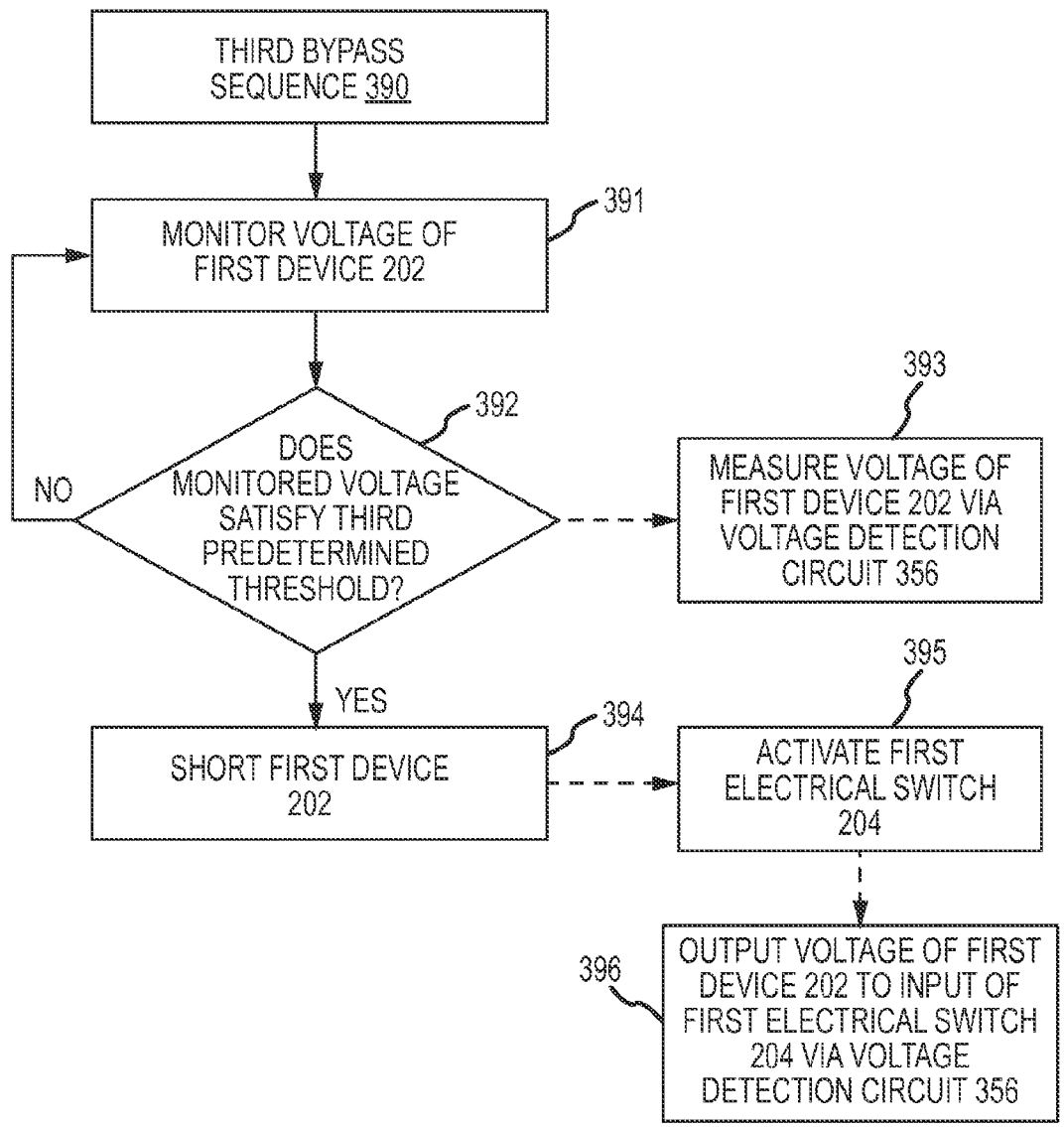
FIG. 12E is a flow chart illustrating one embodiment of a third bypass sequence that may be executed by the fault protection system of FIG. 12A.

With reference now to FIG. 12E, one embodiment of the third bypass sequence 390 is presented. The third bypass sequence 390 may include the steps of monitoring the voltage of the first device 202 (step 391), assessing whether the voltage satisfies the third predetermined threshold (step 392), and shorting the first device 202 in response to identification of satisfaction of the third predetermined threshold (step 394). Step 392 may include the step of measuring the voltage of the first device 202 via the voltage detection circuit 356 (step 393). Step 394 may include the step of activating the first electrical switch 204 (step 395). Step 395 may include the step of outputting the voltage of the first device 202 to the input of the first electrical switch 204 via the voltage detection circuit 356 (step 396). In one embodiment, the second bypass sequence 380 (FIG. 12D) is executed when the first bypass sequence 371 (FIG. 12C) has not been executed. The first bypass sequence 371 (FIG. 12C) may not be executed when the current from the power line 16 is not measured by the analog-to-digital converter 349. In one embodiment, the third bypass sequence 390 is executed if neither the first bypass sequence 371 (FIG. 12C) nor the second bypass sequence 380 (FIG. 12D) has been executed.

FIG. 13A illustrates one embodiment of a power transmission system 400, or more generally a distributed control architecture for use by such a power transmission system. The power transmission system 400 includes at least one power line 16 (three shown in the illustrated embodiment). One or more power lines 16 may be supported by a plurality of towers 14 that are spaced along the length of the power line(s) 16. As in the case of FIG. 1, the power transmission system 400 of FIG. 13A may include one or more electrical power sources 12 (not shown) and one or more electrical loads 22 (not shown).

A plurality of DSRs 30 are installed on a given power line 16—multiple power lines 16 each may have multiple DSRs 30 installed thereon. One or more DSR array controllers 440 may be mounted on each power line 16 that incorporates DSRs 30. Alternatively, a given DSR array controller 440 could be mounted on a tower 14. In any case, each DSR array controller 440 may be associated with a dedicated power line section 18 of the power line 16. A given power line section 18 could have a single DSR array controller 440, or a given power line section 18 could have a primary DSR array controller 400, along with one or more backup DSR array controllers 440.

Any number of DSR array controllers 440 may be associated with a given power line 16. A given power line 16 may be defined by one or more power line sections 18 of the same length, by one or more power line sections 18 of different lengths, or both (e.g., a power line section 18 is not limited to a portion of a given power line 16 that spans between adjacent towers 14 as shown in FIG. 13A; a given power line 16 may be divided up in any appropriate manner into multiple power line sections 18, each of which may have one or more DSR array controllers 440 that are dedicated to such a power line section 18).

One or more DSRs 30 are mounted on each power line section 18 of a given power line 16. Any appropriate number of DSRs 30 may be mounted on each power line section 18.

The various DSRs 30 that are mounted on a given power line section 18 define what may be referred to as a DSR array 410. Each DSR array 410 may have one or more DSR array controllers 440 that are dedicated to such a DSR array 410 (e.g., multiple controllers 440 may be used for any given DSR array 410 to provide redundancy). In one embodiment, a given DSR array controller 440 is only associated with one DSR array 410. As such, one or more DSR array controllers 440 and each DSR 30 of their dedicated DSR array 410 may be associated with the same power line section 18. It should be appreciated that DSRs 30 need not be placed along the entire length of a given power line 16 (although such could be the case), and as such there may be a gap between one or more adjacent pairs of power line sections 18 that each have an associated DSR array 410.

Each DSR 30 in a given DSR array 410 only communicates (directly or indirectly) with one or more DSR array controllers 440 that are assigned to the DSR array 410 (e.g., the primary DSR array controller 440 for the DSR array 410 and any redundant or backup DSR array controllers 440). A given DSR array controller 440 could communicate directly with each DSR 30 in its associated DSR array 410. Another option would be to utilize a relay-type communication architecture, where a DSR array controller 440 could communicate with the adjacent-most DSR 30 on each side of the DSR array controller 440, and where the DSRs 30 could then relay this communication throughout the remainder of the DSR array 410 on the same side of the DSR array controller 440 (e.g., DSRs 30 in a given DSR array 410 could relay a communication, from DSR 30-to-DSR 30, toward and/or away from the associated DSR array controller 440).

DSR array controllers 440 associated with multiple DSR arrays 410 communicate with a common DSR server 420 of the power transmission system 400. Each of these DSR array controllers 440 could communicate directly with this DSR server 420. Alternatively, the DSR server 420 could directly communicate with one or more DSR array controllers 440, and these DSR array controllers 440 could then relay the communication to one or more other DSR array controllers 440 in the power transmission system 400. It should also be appreciated that the power transmission system 400 could incorporate one or more backup DSR servers (not shown), for instance to accommodate a given DSR server 420 going "off-line" for any reason. In any case, the DSR server 420 in turn communicates with what may be characterized a utility-side control system 430. Representative forms of the utility-side control system 430 include without limitation an energy management system (EMS), a supervisory control and data acquisition system (SCADA system), or market management system (MMS).

The power transmission system 400 could utilize any appropriate number of DSR servers 420. A single DSR server 420 could communicate with a given utility-side control system 430. Another option would be to have multiple DSR servers 420 that each communicate with a common utility-side control system 430. The power transmission system 400 could also utilize any appropriate number of utility-side control systems 430, where each utility-side control system 430 communicates with one or more DSR servers 420.

A given DSR server 420 may be characterized as providing an interface between a utility-side control system 430 and a plurality of DSR array controllers 440 for multiple DSR arrays 410. A DSR server 420 may receive a communication from a utility-side control system 430. This communication may be in any appropriate form and of any appropriate type. For instance, this communication could be in the form of a system objective, a command, a request for information, or the like (e.g., to change the inductance on one or more power lines 16 by a stated amount; to limit the current on one or more power lines 16 to a stated amount; to limit the power flow on one or more power lines 16 to a stated amount; to set a temperature limit for one or more power lines 16).

The DSR array controllers 440 may send information on their corresponding power line section 18 to a DSR server 420. The DSR server 420 in this case may consolidate this information and transmit the same to the utility-side control system 430 on any appropriate basis (e.g., using a push-type communication architecture; using a pull-type communication architecture; using a push/pull type communication architecture). The DSR server 420 may also store information received from the various DSR array controllers 440, including information from the DSR array controllers 440 that has been consolidated by the DSR server 420 and at some point in time transmitted to an utility-side control system 430.

Each DSR array controller 440 may be characterized as a "bridge" between a DSR server 420 (and ultimately a utility-side control system 430) and its corresponding DSR array 410. For instance, one communication scheme may be used for communications between a DSR array controller 410 and the DSRs 30 of its DSR array 410, and another communication scheme may be used for communications between this same DSR array controller 410 and the DSR server 420. In this case, a DSR array controller 410 may require two different interfaces—one interface/communication module for communicating with the DSRs 30 of its DSR array 410, and another interface/communication module for communicating with a DSR server 420.

As noted, FIG. 13A may be characterized as a distributed control architecture for a power transmission system (or as a power transmission system with a distributed control architecture). In this regard, consider the case where the utility-side control system 430 sends a communication to a DSR server 420. The DSR server 420 may repackage/translate/reformat this communication, but in any case sends a corresponding communication to one or more DSR array controllers 440. Each such DSR array controller 440 that receives such a communication makes a determination as to the modal configuration for each DSR 30 in its corresponding DSR array 410 (i.e., determines whether a given DSR 30 should be in a first or bypass mode, or whether this DSR 30 should be in a second or injection mode, and this may be undertaken for each DSR 30 in its corresponding DSR array 410). Notably, the communication that is received by the DSR array controller 440 does not itself indicate as to what the modal configuration should be for each DSR 30 in the DSR array 410 for the recipient DSR array controller 440. As such, each DSR array controller 440 must have sufficient intelligence so as to be able to be able to make this determination on its own.

Figure 13B:
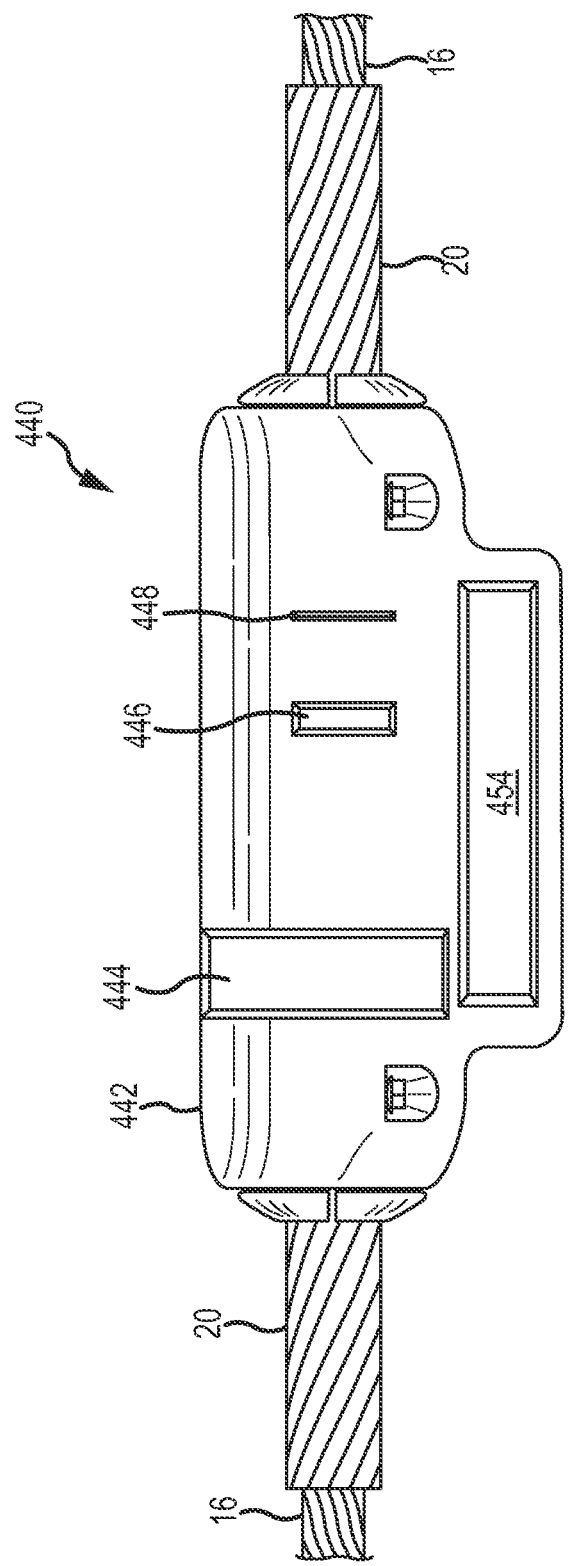
FIG. 13B is a schematic of a DSR array controller used to provide distributed control for the power transmission system of FIG. 13A.

FIG. 13B presents a representative configuration for a DSR array controller 440 that may be utilized by the power transmission system 400 of FIG. 13A. The DSR array controller 440 includes a housing 442. Preferably, the housing 442 allows the DSR array controller 440 to be mounted on a power line 16 without having to break the power line 16 (e.g., by using detachably connectable housing sections at least generally of the type discussed above in relation to the DSR 30). Moreover, preferably the housing 442 is configured to reduce the potential for Corona discharges.

The DSR array controller 440 includes a current transformer 444 that is disposed within the housing 442 and that derives power from the power line 16 to power electrical components of the DSR array controller 440. Various sensors may be utilized by the DSR array controller 440, such as a fault current sensor 446 and a temperature sensor 448. Moreover, the DSR array controller 440 utilizes a processing unit 454 (e.g., defined by one or more processors of any appropriate type, and utilizing any appropriate processing architecture).

Figure 13C:
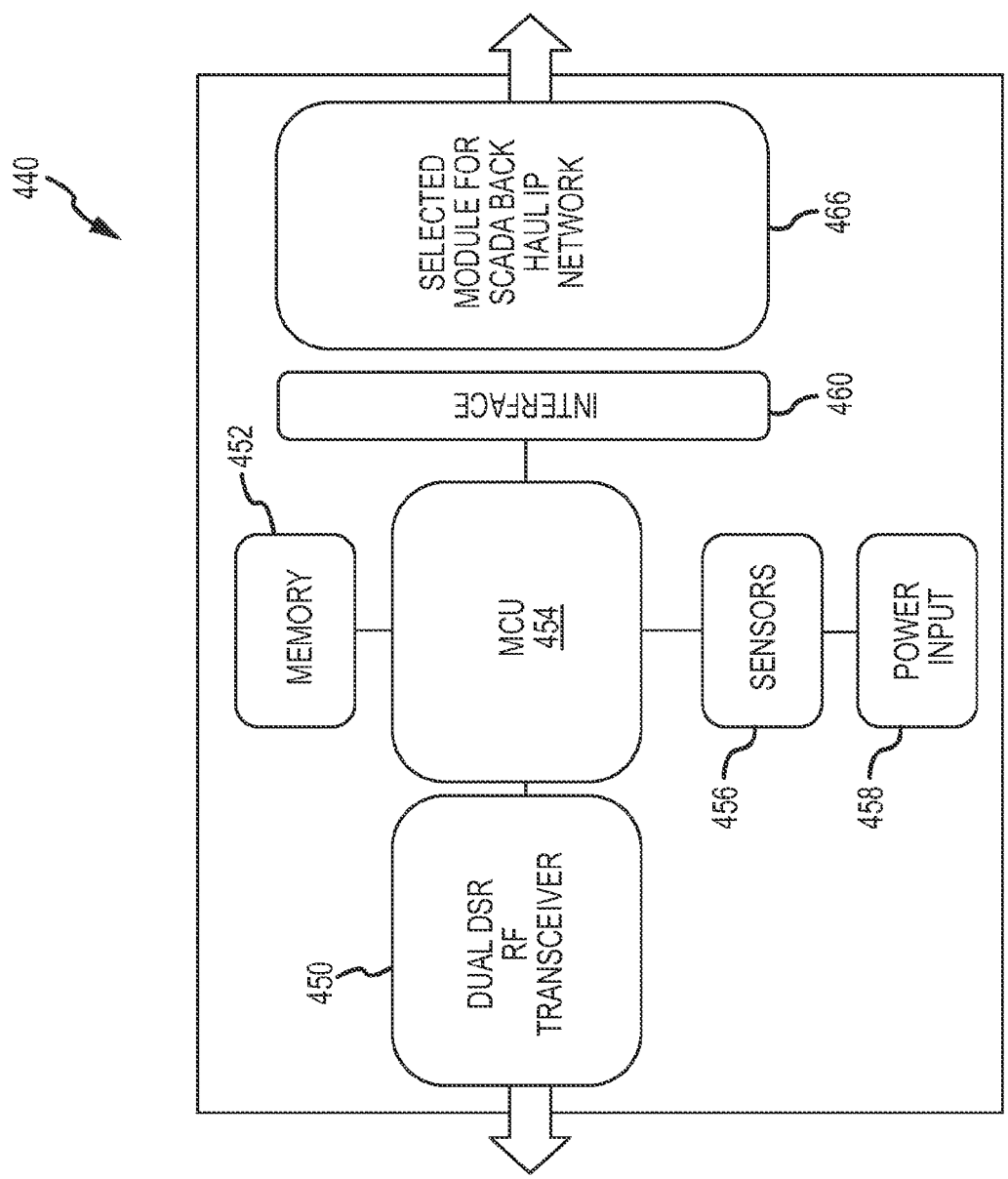
FIG. 13C is an electrical block diagram that may be utilized by DSR array controllers from the power transmission system of FIG. 13A.

FIG. 13C presents a functional schematic that may be implemented by a DSR array controller 440. The DSR array controller 440 includes the above-noted processing unit 454. Memory 452 (e.g., any appropriate computer readable storage medium) may be operatively interconnected with the processing unit 454. The memory 452 may be of any appropriate type or types, and may utilize any appropriate data storage architecture(s). One or more sensors 456 (e.g. the above-noted fault current sensor 446; the above-noted temperature sensor 448) may also be operatively interconnected with the processing unit 454.

One or more antennas 450 may be utilized by the DSR array controller 440 for communicating with the DSRs 30 in its corresponding DSR array 410. Any appropriate type of antenna 450 may be utilized by the DSR array controller 440, including a cavity-backed slot antenna of the type utilized by the DSRs 30. Multiple antennas 450 could also be used to communicate with the DSRs 30 in its corresponding DSR array 410, including where two antennas 450 are incorporated by the DSR array controller 440 in the same manner as discussed above with regard to the DSRs 30 (e.g., an antenna 450 may be provided on each end of the DSR array controller 440). As noted, the DSR array controller 440 may use one communication scheme (e.g., a first communication scheme) for communicating with the DSRs 30 of its DSR array 410.

The DSR array controller 440 also communicates with the utility-side control system 430 through the DSR server 420 in the embodiment of FIG. 13A. In this regard, the DSR array controller 440 may include a communications module 466 of any appropriate type and an interface 460. If the communications module 466 provides for wireless communications with the DSR server 420, the DSR array controller 440 may require one or more antennas of any appropriate type. For example, the communications module may be at least one of an Ethernet adapter, a cellular modem, and a satellite modem, to name a few. In another example, the interface 460 may be part of the processing unit 454 and may include at least one of a SPI bus, UART, and a 12C serial bus, to name a few. In any case, the DSR array controller 440 may use another communication scheme (e.g., a second communication scheme) for communicating with the DSR server 420. In one embodiment, the DSR array controller 440 uses different communication schemes for communications with the DSR array 410 and the DSR server 420. It could be appreciated that a dedicated antenna(s) may be required for communications with the DSRs 30 of the corresponding DSR array 410, and that a dedicated antenna(s) may be required for communications with the DSR server 420. However, it may be possible that a common antenna(s) may be used to communicate with both the DSRs 30 of the corresponding DSR array 410 and with the DSR server 420.

The DSR array controller 440 may also incorporate a power supply 458 of any appropriate type, and that is operatively interconnected with the above-noted current transformer 444 (FIG. 13B). The power supply 458 may receive a current flow from the current transformer 444, and may provide power to one or more of the processing unit 454, the memory 452, the antenna(s) 450, one or more antennas associated with the communication module 466 (for communicating with the DSR server 420), one or more sensors 456, or any combination thereof.

FIG. 13D presents one embodiment of a first data structure 480 (e.g., a lookup table) that may be stored/reside in the memory 452 of a given DSR array controller 440. The first data structure 480 may utilize any appropriate data storage architecture. Generally, for each of a plurality of system contingencies or conditions 482, the first data structure 480 includes a corresponding model configuration for at least one control objective for each DSR 30 associated with the DSR array controller 440. Again, there are two "model configurations" for the DSRs 30. One modal configuration (e.g., a first modal configuration or first mode) for each DSR 30 is where the DSR is disposed in a non-injection or bypass mode (e.g., where little or no reactance is being injected into the corresponding power line 16 by the DSR 30, or more specifically into the corresponding power line section 18 on which the DSR 30 is mounted). The other modal configuration (e.g., a second modal configuration or second mode) for each DSR 30 is where it is configured to inject reactance into the corresponding power line 16 (e.g., an injection mode). The amount of reactance injected by a given DSR 30 when in its second modal configuration (or when in its second mode) is substantially greater than the amount of reactance, if any, that is injected by a given DSR 30 when in its first modal configuration (or when in its first mode).

The first data structure 480 includes a modal configuration for two different control objectives for each DSR 30 that is associated with the DSR array controller 440 (three representative DSRs 30 being shown for purposes of the first data structure 480 of FIG. 13D; each DSR 30 within the corresponding DSR array 410 would of course be included in the first data structure 480). The first data structure 480 presents both a power factor control modal configuration 484 (one control objective) and a low-frequency oscillation control modal configuration 486 (a different control objective) for each DSR 30 associated with the DSR array controller 440, and for each system condition or contingency 482. Any number of control objectives may be stored in the first data structure 480, including a single control objective or any appropriate number of multiple control objectives.

The system conditions or contingencies that are loaded into the first data structure 480 may represent at least some or all of the permutations for a power transmission system in relation to each power source utilized by the power transmission system (whether on line or off line), the load level presently imposed on the system, the operating status of the transmission lines forming the interconnected grid, the operating status of the transformers and substation equipment supporting the operation of the transmission lines forming the interconnected grid, or any combination of the above that combine to create a normal, abnormal or emergency operating condition for the grid. The same system conditions or contingencies may be loaded into the memory 452 of one or more DSR array controllers 440. In one embodiment, a set of DSR array controllers 440 will have the same system conditions or contingencies loaded into their corresponding memory 452. However, each DSR array controller 440 will have its own modal configuration for each of its DSRs 30, and for each control objective. It should be appreciated that the first data structure 480 for each DSR array controller 440 may be updated without having to dismount the DSR array controller 440 from its corresponding power line 16 (e.g., using the built-in communication capabilities of the DSR array controllers 440)

Figure 13E:
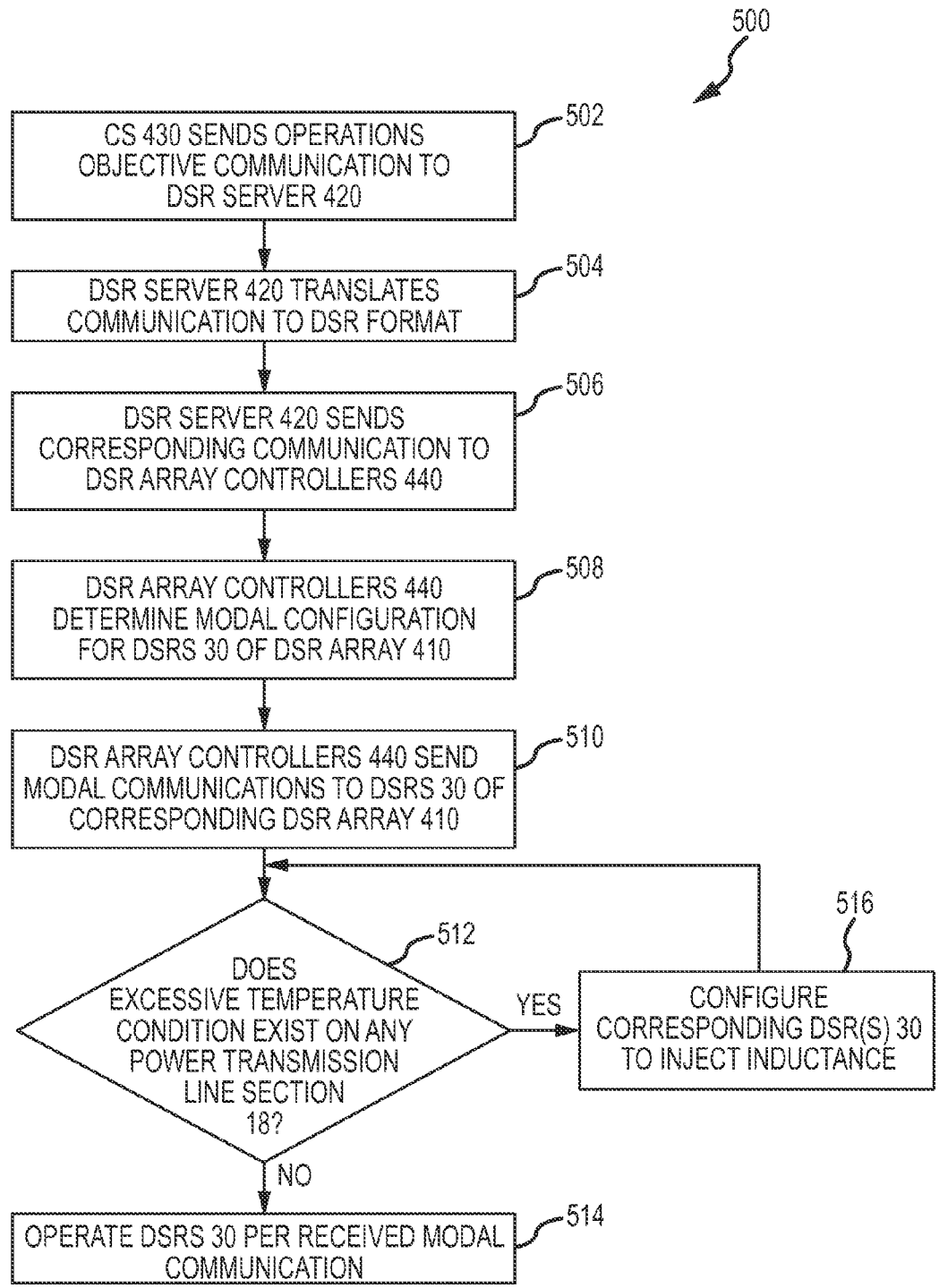
FIG. 13E is an embodiment of an operations protocol that may be used by the power transmission system of FIG. 13A to control operation of individual reactance modules.

One embodiment of an operations protocol for the power transmission system 400 of FIG. 13A is presented in FIG. 13E and is identified by reference numeral 500. The utility-side control system 430 sends an operations objective communication to the DSR server 420 (step 502). This operations objective communication may be of any appropriate type. The DSR server 420 may translate this communication from the utility-side control system 430 into an appropriate DSR format (step 504). In any case, the DSR server 420 sends a corresponding communication to the relevant DSR array controllers 440 (step 506). Each of the DSR array controllers 440 will independently determine the modal configuration for the DSRs 30 in its corresponding DSR array 410 based upon receipt of this communication (step 508). The communication associated with step 506 does not itself indicate the modal configurations that are determined by step 508. Thereafter, the DSR array controllers 440 may send a modal communication to one or more of the DSRs 30 in its corresponding DSR array 410 (step 510), and the DSRs 30 may be operated in accordance with any modal communication that has been received (step 514). It should be appreciated that the protocol 500 could be configured such that a modal communication is sent by a given DSR array controller 440 to each of its corresponding DSRs 30 (step 510), or a given DSR array controller 440 could be configured to send a modal communication (step 510) only to those associated DSRs 30 that have been determined to be in need of a modal change in accordance with step 508.

The operations protocol 500 of FIG. 13E may include what may be characterized as an optional "temperature override" feature. In this regard, step 512 of the protocol 500 is directed to determining if an excessive temperature condition exists on any given power line section 18 (e.g., determining whether an operating temperature meets or exceeds a predetermined temperature threshold, and which may be undertaken in any appropriate manner). Each power line section 18 may be monitored for the existence of an excessive temperature condition. An excessive temperature condition may be triggered in any appropriate manner, such as based upon the current flow through the power line section 18, the temperature of the power line section 18, and/or the angle of sag of the power line section 18. This monitoring for an excessive temperature condition may be undertaken by the DSR array controller(s) 440 and/or the DSRs 30 for such a power line section 18. In any case and in the event that such an excessive temperature condition has been determined to exist, the protocol 500 may be configured to execute step 516. Step 516 is directed to configuring one or more of the DSRs 30 on the subject power line section 18 (with an excessive temperature condition) to inject inductance into this power line section 18. Injecting inductance into a given power line section 18 that is experiencing an excessive temperature condition should reduce the current flow through such a power line section 18, which in turn should reduce its operating temperature. It should be appreciated that steps 512 and 516 on the noted temperature override feature may be implemented at any appropriate location within the protocol 500. Moreover, it should be appreciated that the temperature override logic could be incorporated by the DSR array controllers 440 (which would then send an appropriate communication to the DSRs 30 of their corresponding DSR array 410, such that step 516 would be executed by the individual DSRS 30 upon receiving such a communication from their corresponding DSR array controller(s) 440), that the temperature override logic could be incorporated by the individual DSRs 30 of each DSR array 410 (e.g., such that each individual DSR 30 could independently determine when step 516 should be executed), or both.

Figure 13F:
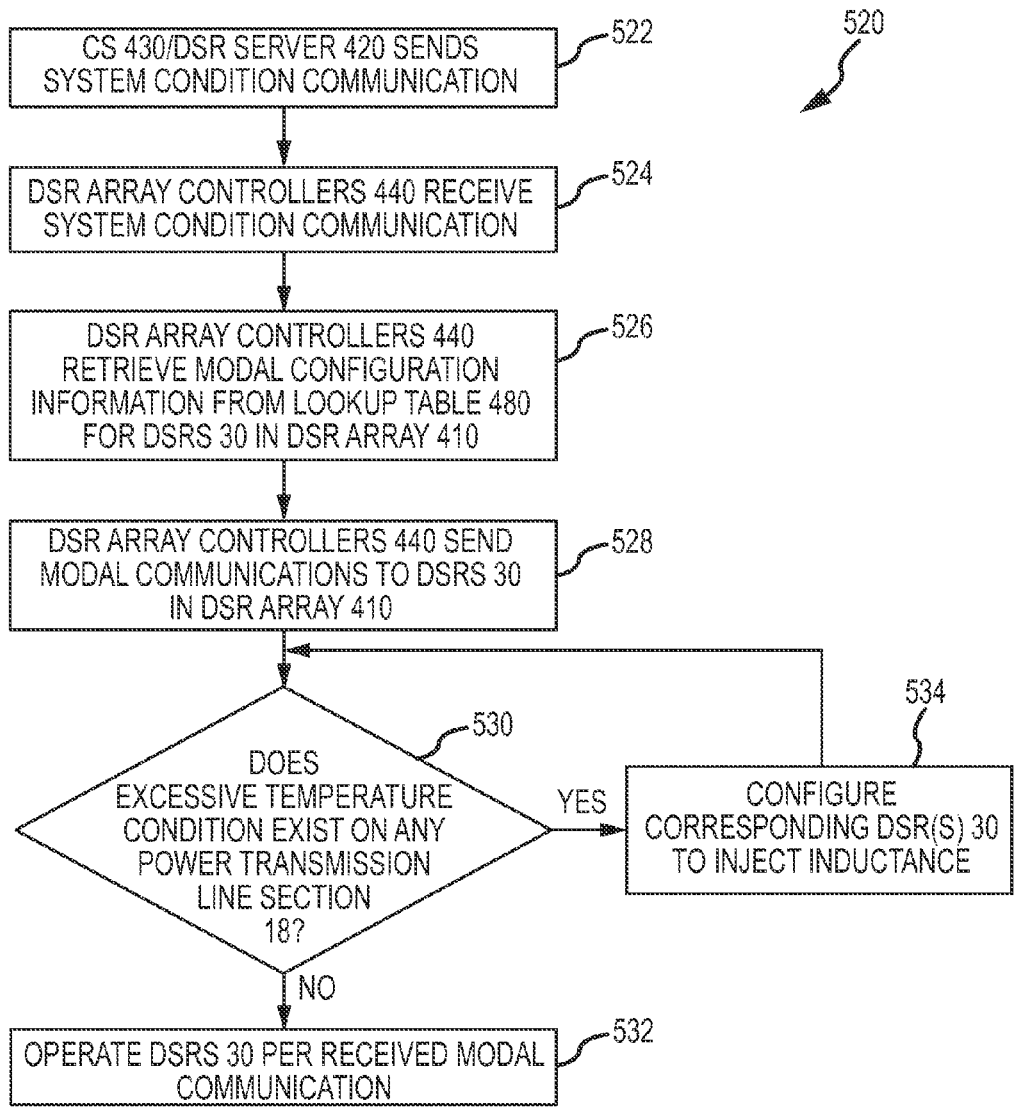
FIG. 13F is an embodiment of a system condition/contingency-based protocol that may be used by the power transmission system of FIG. 13A to control operation of individual reactance modules.

One embodiment of an operations protocol for addressing system conditions or contingencies is illustrated in FIG. 13F and is identified by reference numeral 520. Step 522 of the protocol 520 is directed to sending or transmitting a system condition or system contingency communication to one or more DSR array controllers 440 of the power transmission system 400. This system condition/contingency communication may come directly from the utility-side control system 430 or through the DSR server 420. In any case, one or more DSR array controllers 440 may receive the system condition/contingency communication (step 524). Each DSR array controller 440 will then retrieve the modal configuration information from the first data structure 480 for all DSRs 30 in its corresponding DSR array 410 (step 526). That is, each DSR array controller 440 will locate the system condition/contingency within its first data structure 480, and will then retrieve the associated modal configuration for each DSR 30 in its DSR array 410 for the associated control objective. Each DSR array controller 440 may then send a modal communication to each DSR 30 in its corresponding DSR array 410 (step 528) to specify whether a given DSR 30 should be in its first or bypass mode, or whether this DSR 30 should be in its second or injection mode. The controller 214 of a DSR 30 that receives such a modal communication from its corresponding DSR array controller 440 will then dispose the DSR 30 in the communicated mode pursuant to step 532 (either by switching the mode of the DSR 30, or maintaining the DSR 30 in its then current mode). It should be appreciated that the protocol 520 could be configured such that a modal communication is sent by a given DSR array controller 440 to each of its corresponding DSRs 30 (step 528), or a given DSR array controller 440 could be configured to send a modal communication (step 528) only to those associated DSRs 30 that have been determined to be in need of a modal change based upon step 526.

The operations protocol 520 of FIG. 13F may include what may be characterized as an optional "temperature override" feature. In this regard, step 530 of the protocol 520 is directed to determining if an excessive temperature condition exists on any given power line section 18 (e.g., determining whether an operating temperature meets or exceeds a predetermined temperature threshold, and which may be undertaken in any appropriate manner). Each power line section 18 may be monitored for the existence of an excessive temperature condition. An excessive temperature condition may be triggered in any appropriate manner, such as based upon the current flow through the power line section 18, the temperature of the power line section 18, and/or the angle of sag of the power line section 18. This monitoring for an excessive temperature condition may be undertaken by the DSR array controller(s) 440 and/or the DSRs 30 for such a power line section 18. In any case and in the event that such an excessive temperature condition has been determined to exist, the protocol 520 may be configured to execute step 534. Step 534 is directed to configuring one or more of the DSRs 30 on the subject power line section 18 (with an excessive temperature condition) to inject inductance into this power line section 18. Injecting inductance into a given power line section 18 that is experiencing an excessive temperature condition should reduce the current flow through such a power line section 18, which in turn should reduce its operating temperature. It should be appreciated that steps 530 and 534 on the noted temperature override feature may be implemented at any appropriate location within the protocol 520. Moreover, it should be appreciated that the temperature override logic could be incorporated by the DSR array controllers 440 (which would then send an appropriate communication to the DSRs 30 of their corresponding DSR array 410, such that step 534 would be executed by the individual DSRS 30 upon receiving such a communication from their corresponding DSR array controller(s) 440), that the temperature override logic could be incorporated by the individual DSRs 30 of each DSR array 410 (e.g., such that each individual DSR 30 could independently determine when step 534 should be executed), or both.

The operations protocol 520 of FIG. 13F assumes that the various DSR array controllers 440 are able to receive system condition/contingency communications from the utility-side control system 430 and/or the DSR server 420. That may not always be the case, and is accommodated by the operations protocol that is set forth in FIG. 13G and that is identified by reference numeral 540. Step 542 of the protocol 540 is directed to assessing receipt of system condition/contingency communications. In the event a predetermined number of DSR array controllers 440 are not receiving system condition/contingency communications, the protocol 540 proceeds from step 544 to step 546. Step 546 of the protocol 540 is directed to the DSR array controllers 440 communicating with one another and sharing information regarding their corresponding power line section 18. From this information, the present state system condition/contingency is derived (step 548). A derived system condition/contingency communication is then sent to the various DSR array controllers 440 pursuant to step 550 of the protocol 540. Each DSR array controller 440 will then retrieve the modal configuration information from the first data structure 480 for all DSRs 30 in its corresponding DSR array 410 (step 552). That is, each DSR array controller 440 will locate the system condition/contingency within its first data structure 480 that corresponds to the derived system condition/contingency communication, and will then retrieve the associated modal configuration for each DSR 30 in its DSR array 410 (and for the associated control objective). Each DSR array controller 440 may then send a modal communication to each DSR 30 in its corresponding DSR array 410 (step 556) to specify whether a given DSR 30 should be in its first or bypass mode, or whether this DSR 30 should be in its second or injection mode. The controller 214 of a DSR 30 that receives such a modal communication from its corresponding DSR array controller 440 will then dispose the DSR 30 in the communicated mode pursuant to step 560 (either by switching the mode of the DSR 30, or maintaining the DSR 30 in its then current mode). It should be appreciated that the protocol 540 could be configured such that a modal communication is sent by a given DSR array controller 440 to each of its corresponding DSRs 30 (step 556), or a given DSR array controller 440 could be configured to send a modal communication (step 556) only to those associated DSRs 30 that have been determined to be in need of a modal change based upon step 552.

Figure 13G:
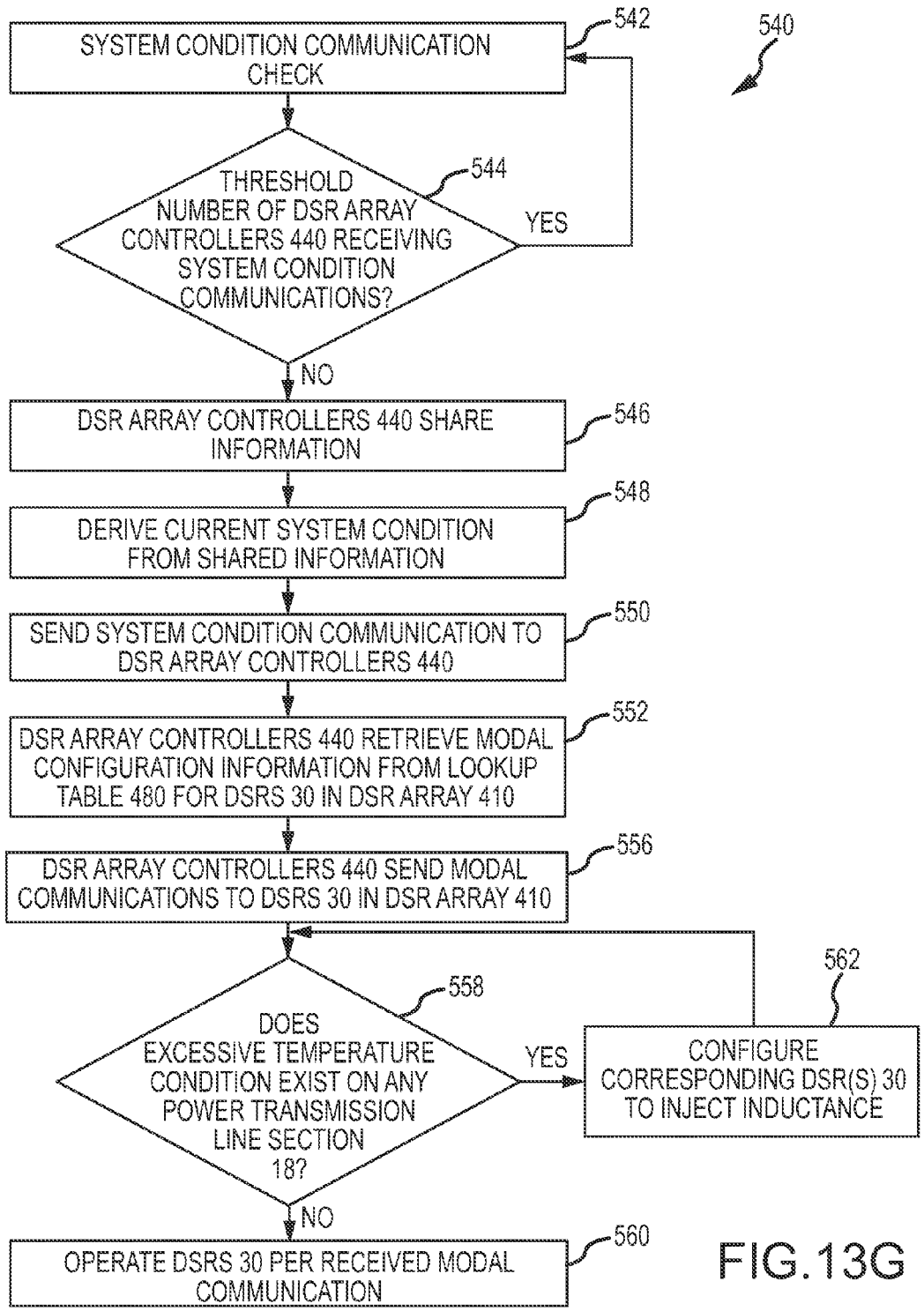
FIG. 13G is another embodiment of a system condition/contingency-based protocol that may be used by the power transmission system of FIG. 13A to control operation of individual reactance modules.

The operations protocol 540 of FIG. 13G may include what may be characterized as an optional "temperature override" feature. In this regard, step 558 of the protocol 540 is directed to determining if an excessive temperature condition exists on any given power line section 18 (e.g., determining whether an operating temperature meets or exceeds a predetermined temperature threshold, and which may be undertaken in any appropriate manner). Each power line section 18 may be monitored for the existence of an excessive temperature condition. An excessive temperature condition may be triggered in any appropriate manner, such as based upon the current flow through the power line section 18, the temperature of the power line section 18, and/or the angle of sag of the power line section 18. This monitoring for an excessive temperature condition may be undertaken by the DSR array controller(s) 440 and/or the DSRs 30 for such a power line section 18. In any case and in the event that such an excessive temperature condition has been determined to exist, the protocol 540 may be configured to execute step 562. Step 562 is directed to configuring one or more of the DSRs 30 on the subject power line section 18 (with an excessive temperature condition) to inject inductance into this power line section 18. Injecting inductance into a given power line section 18 that is experiencing an excessive temperature condition should reduce the current flow through such a power line section 18, which in turn should reduce its operating temperature. It should be appreciated that steps 558 and 562 on the noted temperature override feature may be implemented at any appropriate location within the protocol 540. Moreover, it should be appreciated that the temperature override logic could be incorporated by the DSR array controllers 440 (which would then send an appropriate communication to the DSRs 30 of their corresponding DSR array 410, such that step 562 would be executed by the individual DSRS 30 upon receiving such a communication from their corresponding DSR array controller(s) 440), that the temperature override logic could be incorporated by the individual DSRs 30 of each DSR array 410 (e.g., such that each individual DSR 30 could independently determine when step 562 should be executed), or both.

Each DSR array controller 440 may incorporate any one of the protocols 500, 520, and 540, or may incorporate any two or more of these protocols. For instance, each DSR array controller 440 could incorporate both the protocol 500 of FIG. 13E and the protocol 520 of FIG. 13F. Each DSR array controller 440 could then determine the modal configuration for each DSR 30 in its corresponding DSR array 410 based upon the type of communication that is received. Another option would be for each DSR array controller 440 to incorporate both the protocol 520 of FIG. 13F and the protocol 540 of FIG. 13G. Each DSR array controller 440 could be configured to operate simultaneously in accordance with the protocol 520 of FIG. 13F and the protocol 540 of FIG. 13G. That is, the protocol 520 would be used to control a given DSR array control 440 until step 546 of the protocol 540 of FIG. 13G was reached, in which case the protocol 540 would then be used to control a given DSR array controller 440.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A power transmission system, comprising:
   a power line section comprising a length of a power line;
   a reactance module array that is mounted on said power line section and that comprises a plurality of reactance modules, wherein each said reactance module of said reactance module array is mounted on said power line at a different position along the length of said power line from each other said reactance module of said reactance module array, wherein each said reactance module is switchably disposable in one of first and second modes, and wherein switching a given said reactance module into its said second mode increases a reactance being injected into said power line section; and
   a reactance module array controller configured to communicate with and control each said reactance module of said reactance module array, wherein said reactance module array controller comprises a first data structure, wherein said first data structure comprises a plurality of system conditions, wherein said first data structure comprises a modal configuration for each of said plurality of reactance modules of said reactance module array for each of said plurality of system conditions, and wherein said modal configuration for each said reactance module of said reactance module array comprises being in either said first mode or said second mode.

2. The power transmission system of claim 1, wherein said first data structure comprises at least one control objective for each of said plurality of system conditions, and wherein said first data structure comprises said modal configuration for each of said plurality of reactance modules of said reactance module array, for each of said plurality of system conditions, and for each said control objective.

3. The power transmission system of claim 2, wherein said at least one control objective is selected from the group consisting of power flow control and control of low frequency oscillations in power delivered through the power transmission system.

4. The power transmission system of claim 2, wherein said at least one control objective comprises control of low frequency oscillations in power delivered through the power transmission system, and wherein said control of low frequency oscillations comprises damping frequency variations of the power delivered within a range of about 0.1 Hz to about 5 Hz.

5. The power transmission system of claim 1, wherein said reactance module array controller is configured to receive a system condition communication, wherein said reactance module array controller is configured to identify the corresponding said system condition in said first data structure from said system condition communication, and wherein said reactance module array controller is configured to issue a modal communication to at least one said reactance module of said reactance module array in accordance with the corresponding said modal configuration from said first data structure.

6. The power transmission system of claim 5, further comprising:
   a utility-side control system, wherein said utility-side control system generates said system condition communication.

7. The power transmission system of claim 1, wherein said reactance module array controller is configured to receive a first communication, to thereafter determine the modal configuration for each said reactance module of said reactance module array, and to thereafter send a modal communication to at least one said reactance module of said reactance module array.

8. The power transmission system of claim 7, wherein said first communication for said reactance module array controller comprises a target operating condition for said power line section.

9. The power transmission system of claim 7, wherein said first communication for said reactance module array controller is selected from the group consisting of a target current, a target power, a maximum line temperature, and any combination thereof.

10. The power transmission system of claim 7, wherein said first communication for said reactance module array controller does not identify said modal configuration for each said reactance module of said reactance module array.

11. The power transmission system of claim 7, wherein said reactance module array controller comprises at least one microprocessor configured to determine said modal configuration, for each said reactance module of said reactance module array, based upon said first communication.

12. The power transmission system of claim 7, wherein said reactance module array controller sends said modal communication to each said reactance module of said reactance module array in response to said first communication.

13. The power transmission system of claim 7, wherein said reactance module array controller is configured to receive a system condition communication that is different from said first communication, and wherein said reactance module array controller is able to determine said modal configuration for each of said plurality of reactance modules of said reactance module array both based upon receipt of said system condition communication and based upon receipt of said first communication.

14. The power transmission system of claim 1, wherein each said reactance module of said reactance module array comprises a temperature override function that disposes said reactance module in its said second mode in response to identification of an excessive temperature condition on said power line section.

15. The power transmission system of claim 1, wherein said reactance module array controller comprises a temperature override function that is configured to dispose at least some of said reactance modules in said second mode in response to identification of an excessive temperature condition on said power line section.

16. The power transmission system of claim 1, wherein each said reactance module is configured to inject one of inductance and capacitance into said power line section.

17. A power transmission system, comprising:
a plurality of power line sections;
a separate reactance module array that is mounted on each of said plurality of power line sections, wherein each said reactance module array comprises a plurality of reactance modules that are spaced from one another along the corresponding said power line section, wherein each said reactance module is switchably disposable in each of first and second modes, and wherein switching a given said reactance module into its said second mode increases a reactance being injected into its corresponding said power line section; and
a separate reactance module array controller for each said reactance module array, wherein each said reactance module array controller is configured to communicate with and control each said reactance module of its corresponding said reactance module array, wherein each said reactance module array controller comprises a first data structure, wherein said first data structure comprises a plurality of system conditions, and wherein said first data structure for each said reactance module array controller comprises a modal configuration for each of said plurality of reactance modules of its corresponding said reactance module array for each of said plurality of system conditions.

18. The power transmission system of claim 17, wherein each pair of said plurality of power line sections are either different portions of a common power line or are associated with two different power lines.

19. The power transmission system of claim 17, further comprising:
a reactance module server operable to communicate with each said reactance module array controller; and
a utility-side control system in communication with said reactance module server.

20. The power transmission system of claim 19, wherein said reactance module server provides an interface between said utility-side control system and each said reactance module array controller.

21. The power transmission system of claim 19, wherein said reactance module server is configured to provide at least one of the following functions: receive status information from each said reactance module array controller regarding its corresponding said reactance modules; receive line condition data from each said reactance module array controller; issue a command to each said reactance module controller; and any combination thereof.

22. The power transmission system of claim 19, wherein said utility-side control system is selected from the group consisting of an energy management system, a supervisory control and data acquisition system, a market management system, or any combination thereof.

23. The power transmission system of claim 19, wherein at least some of said reactance module array controllers are configured to share information.

24. The power transmission system of claim 17, wherein each said reactance module array controller is configured to receive a present state system condition communication, wherein if a predetermined number of said reactance module array controllers fail to receive said present state system condition communication, said reactance module array controllers are configured to communicate with one another to share information, to determine a present state system condition from said shared information, and to determine said modal configuration for each said reactance module of their corresponding said reactance module array from said determined present state system condition.

25. The power transmission system of claim 17, wherein each said reactance module of each said reactance module array comprises a temperature override function that disposes said reactance module in its said second mode in response to identification of an excessive temperature condition on the corresponding said power line section.

26. The power transmission system of claim 17, wherein each said reactance module array controller comprises a temperature override function that is configured to dispose at least some of said reactance modules, of its corresponding said reactance module array, in said second mode in response to identification of an excessive temperature condition on the corresponding said power line section.

27. The power transmission system of claim 17, wherein each said reactance module is configured to inject one of inductance and capacitance into its corresponding said power line section.

* * * * *